US006460883B1

United States Patent
Nakashima et al.

(10) Patent No.: US 6,460,883 B1
(45) Date of Patent: *Oct. 8, 2002

(54) AIR BAG GAS GENERATOR AND AIR BAG APPARATUS

(75) Inventors: Yoshihiro Nakashima; Nobuyuki Ohji, both of Himeji; Yasunori Iwai, Shijonawate; Nobuyuki Katsuda, Himeji, all of (JP)

(73) Assignee: Daicel Chemical Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/620,914

(22) Filed: Jul. 20, 2000

Related U.S. Application Data

(62) Division of application No. 09/554,740, filed as application No. PCT/JP99/05295 on Sep. 28, 1999.

(30) Foreign Application Priority Data

| Sep. 28, 1998 | (JP) | 10-273478 |
| Nov. 30, 1998 | (JP) | 10-339934 |
| Mar. 4, 1999 | (JP) | 11-57127 |
| Mar. 23, 1999 | (JP) | 11-078306 |
| Sep. 20, 1999 | (JP) | 11-265995 |
| Sep. 20, 1999 | (JP) | 11-265996 |
| Sep. 20, 1999 | (JP) | 11-265997 |
| Sep. 20, 1999 | (JP) | 11-265998 |
| Sep. 20, 1999 | (JP) | 11-265999 |

(51) Int. Cl.[7] .......................... B60R 21/26; B60R 21/28
(52) U.S. Cl. ...................... 280/736; 280/741
(58) Field of Search .............................. 280/736, 741, 280/737; 102/530, 531

(56) References Cited

U.S. PATENT DOCUMENTS

| 3,877,882 A | 4/1975 | Lette et al. |
| 3,972,545 A | 8/1976 | Kirchoff et al. |

(List continued on next page.)

FOREIGN PATENT DOCUMENTS

| DE | 135005 C | 1/1902 |
| DE | 4019677 A1 | 1/1992 |
| DE | 4141620 A | 7/1992 |

(List continued on next page.)

OTHER PUBLICATIONS

"Variable Output Pyrotechnic Air Bag Inflator," Research Disclosure, GB, Nov. 1995, No. 379, pp. 743–745.
"Dual Connector for Two–Stage Air Bag Inflator," Research Disclosure, GB, Apr. 1998, No. 408, pp. 320–321.
"Variable Output Initiator," Research Disclosure, GB, Industrial Opportunities Ltd. Havant, No. 384, Apr. 1, 1996, pp. 239–240.

*Primary Examiner*—Paul N. Dickson
*Assistant Examiner*—Joselynn Y Sliteris

(57) ABSTRACT

A gas generator for an air bag system has, in a housing provided with a gas discharge port, ignition means activated upon an impact, and gas generating means ignited and burnt by the ignition means and generate a combustion gas for inflating an air bag, and two combustion chambers storing the gas generating means. The combustion chambers are concentrically provided so as to be adjacent to each other in the radial direction of the housing, and a communicating hole which allows communication between the combustion chambers is provided, in the housing. The gas generator also has two igniters, two different gas generating means, a connector having a lead wire, a combustion chamber, ignition means provided in an inner cylindrical member, and an automatic ignition member, which can effectively restrain an occupant.

14 Claims, 22 Drawing Sheets

U.S. PATENT DOCUMENTS

| | | | |
|---|---|---|---|
| 4,950,458 A | | 8/1990 | Cunningham |
| 4,998,751 A | | 3/1991 | Paxton et al. |
| 5,009,855 A | | 4/1991 | Nilsson |
| 5,017,147 A | | 5/1991 | Sugiyama et al. |
| 5,104,466 A | * | 4/1992 | Allard et al. |
| 5,200,574 A | * | 4/1993 | Cunningham et al. ... 102/202.2 |
| 5,219,178 A | | 6/1993 | Kobari et al. |
| 5,221,107 A | | 6/1993 | O'Loughlin |
| 5,221,109 A | * | 6/1993 | Marchant .................... 280/736 |
| 5,320,382 A | | 6/1994 | Goldstein et al. |
| 5,340,339 A | | 8/1994 | Desai et al. |
| 5,346,254 A | * | 9/1994 | Esterberg .................... 280/741 |
| 5,387,007 A | | 2/1995 | Ogawa et al. |
| 5,464,249 A | | 11/1995 | Lauritzen et al. |
| 5,468,017 A | | 11/1995 | Kirsch et al. |
| 5,513,879 A | | 5/1996 | Patel et al. |
| 5,564,743 A | | 10/1996 | Marchant |
| 5,582,428 A | | 12/1996 | Buchanen et al. |
| 5,613,705 A | | 3/1997 | Hock et al. |
| 5,630,619 A | | 5/1997 | Buchanan et al. |
| 5,643,345 A | | 7/1997 | Cox et al. |
| 5,685,558 A | | 11/1997 | Cuevas |
| 5,690,357 A | * | 11/1997 | Cuevas ...................... 280/737 |
| 5,743,556 A | | 4/1998 | Lindsey et al. |
| 5,756,928 A | | 5/1998 | Ito et al. |
| 5,799,973 A | | 9/1998 | Bauer et al. |
| 5,839,754 A | * | 11/1998 | Schluter et al. |
| 5,847,310 A | | 12/1998 | Nagahashi et al. |
| 5,951,041 A | | 9/1999 | Iwai et al. |
| 6,019,389 A | | 2/2000 | Burgi et al. |
| 6,032,979 A | | 3/2000 | Mossi et al. |
| 6,050,599 A | | 4/2000 | Marsaud et al. |
| 6,095,560 A | | 8/2000 | Perotto |

FOREIGN PATENT DOCUMENTS

| | | |
|---|---|---|
| DE | 19520847 A | 12/1996 |
| DE | 9117212 U | 3/1997 |
| DE | 19611102 A | 9/1997 |
| DE | 29708380 U | 9/1997 |
| DE | 19620758 A1 | 11/1997 |
| DE | 29801477 U | 6/1998 |
| DE | 19725452 A | 12/1998 |
| DE | 19732825 A | 2/1999 |
| DE | 19816216 A | 10/1999 |
| EP | 0012627 A | 6/1980 |
| EP | 0359408 A | 3/1990 |
| EP | 0365739 A1 | 5/1990 |
| EP | 0382552 A | 8/1990 |
| EP | 0405962 A | 1/1991 |
| EP | 0544918 A1 | 6/1993 |
| EP | 0609981 A | 8/1994 |
| EP | 0665138 A2 | 8/1995 |
| EP | 0708003 A1 | 4/1996 |
| EP | 0733519 A2 | 9/1996 |
| EP | 0733520 A1 | 9/1996 |
| EP | 0773145 A2 | 5/1997 |
| EP | 0787630 A1 | 8/1997 |
| EP | 0788945 A2 | 8/1997 |
| EP | 0800964 A2 | 10/1997 |
| EP | 0841225 A1 | 5/1998 |
| EP | 0857627 A1 | 8/1998 |
| EP | 0870651 A1 | 10/1998 |
| EP | 0879739 A1 | 11/1998 |
| EP | 0901946 A | 3/1999 |
| EP | 0943502 A | 9/1999 |
| JP | 2169347 A | 6/1990 |
| JP | 5024498 A | 2/1993 |
| JP | 5053169 U | 7/1993 |
| JP | 582713 U | 11/1993 |
| JP | 5319199 A | 12/1993 |
| JP | 7232613 A | 9/1995 |
| JP | 8090259 A | 4/1996 |
| JP | 2532786 B2 | 6/1996 |
| JP | 8198048 A | 8/1996 |
| JP | 8207696 A | 8/1996 |
| JP | 3029326 U | 9/1996 |
| JP | 8332911 A | 12/1996 |
| JP | 9183359 A | 7/1997 |
| JP | 3040049 U | 8/1997 |
| JP | 9207705 A | 8/1997 |
| JP | 9213417 A | 8/1997 |
| JP | 10006912 A | 1/1998 |
| JP | 10129400 A | 5/1998 |
| JP | 10181516 A | 7/1998 |
| JP | 10217899 A | 8/1998 |
| JP | 10241785 A | 9/1998 |
| JP | 10297416 A | 11/1998 |
| JP | 10315901 A | 12/1998 |
| JP | 10324219 A | 12/1998 |
| JP | 11048905 A | 2/1999 |
| JP | 1159318 A | 3/1999 |
| JP | 1191494 A | 4/1999 |
| JP | 11096868 A | 4/1999 |
| JP | 11217055 A | 8/1999 |
| WO | 9734784 A1 | 9/1997 |
| WO | 98/09355 A | 3/1998 |
| WO | 9908062 A1 | 2/1999 |
| WO | 9942339 A | 8/1999 |

\* cited by examiner (a=b=c)

AIR BAG GAS GENERATOR AND AIR BAG APPARATUS

This application is a divisional of co-pending application Ser. No. 09/554,740, filed on May 19, 2000, application Ser. No. 09/554,740 is the national phase of PCT International Apllication No. PCT/JP99/05295 filed on Sep. 28, 1999 under 35 U.S.C. §371. The entire contents of each of the above-identified applications are hereby incorporated by reference.

FIELD OF THE INVENTION

The present invention relates to an air bag system which can effectively restrain an occupant, and more particularly to a gas generator including two or more combustion chambers, two igniters, two different gas generating means, an igniter having a lead wire, a combustion chamber, ignition means provided in an inner cylindrical member, and an automatic ignition material.

BACKGROUND OF THE INVENTION

An air bag system, which is mounted on various kinds of vehicles and the like including automobiles, aims to hold an occupant of the vehicle by means of an air bag (a bag body). The air bag is rapidly inflated by a gas when the vehicle collides at a high speed so as to prevent the occupant from crashing into a hard object inside the vehicle, such as a steering wheel and windscreen, due to an inertia and from being injured. This kind of air bag system generally comprises a gas generator actuated according to a collision of the vehicle and discharge a gas, in order to introduce the gas into the air bag to inflate the air bag.

It is desired that the air bag system of this type can safely restrain the occupant even when frame of the occupant (for example, whether a sitting height of the occupant is long or short, whether the occupant is an adult or a child, and the like), a sitting attitude (for example, an attitude of the occupant holding the steering wheel) and the like are different. Then, there has been conventionally suggested an air bag system which actuates by applying as small as possible impact to the occupant at the initial stage of the actuation. Gas generators in such a system are disclosed in JP-A 8-207696, U.S. Pat. Nos. 4,998,751, and 4,950,458. JP-A 8-207696 suggests a gas generator, in which one igniter ignites two kinds of gas generating agent capsules so as to generate the gas in two stages. U.S. Pat. No. 4,998,751 and 4,950,458 suggest a gas generator, in which two combustion chambers are provided for controlling actuation of the gas generator so as to generate the gas in two stages due to an expanded flame of the gas generating agent.

However, these gas generators have drawbacks in that an internal structure thereof is complicated, a size of a container is large, and a cost therefor becomes expensive.

Further, in JP-A 9-183359 and DE-B 19620758, there is disclosed a gas generator, in which two combustion chambers, each storing a gas generating agent, are provided in a housing and an igniter is arranged in each combustion chamber, so as to adjust an activation timing of each of the igniters, thereby adjusting an output of the gas generator. However, in the above gas generators, since the igniters arranged in the respective combustion chambers are independently arranged, it becomes difficult to assemble (manufacture), the structure itself of the gas generator becomes complicated and a volume thereof becomes large.

SUMMARY OF THE INVENTION

In order to solve the above-problems, the present invention provides a gas generator which actuates while applying as small an impact as possible to an occupant at the initial stage of an operation and can widely and selectively adjust an output and timing of an output increase of the gas generator so as to safely restrain the occupant even when frame of the occupant (for example, whether a sitting height of the occupant is long or short, whether the occupant is an adult or a child, and the like), a sitting attitude (for example, an attitude of the occupant holding the steering wheel) and the like are different, as well as restricting the total size of a container, providing a simple structure and that can be easily manufactured.

A gas generator for an air bag according to the present invention corresponds to a gas generator, in which two combustion chambers are provided in a housing, and is characterized by a structure of arranging two combustion chambers. In particular, it is also possible to independently ignite and burn gas generating means accommodated in each combustion chamber by a different ignition means.

Namely, according to the present invention, there is provided a gas generator for an air bag, which includes, in the housing having a gas discharge port or gas discharge ports, ignition means activated upon an impact, and gas generating means ignited and burnt by the ignition means and generate a combustion gas for inflating an air bag, wherein, in the housing, two combustion chambers for storing the gas generating means are concentrically provided so as to be adjacent to each other in the radial direction of the housing, and a communicating hole to allow communication between the combustion chambers is provided.

Further, according to the present invention, there is provided a gas generator for an air bag, which includes ignition means activated upon an impact, and gas generating means ignited and burnt by the ignition means and generate a combustion gas for inflating an air bag in a housing formed in a cylindrical shape having an axial core length longer than an outermost diameter, having a plurality of gas discharge ports on a peripheral wall thereof, wherein, in the housing, two combustion chambers for storing the gas generating means are concentrically provided so as to be adjacent to each other in the axial direction and/or the radial direction of the housing, and a communicating hole to allow communication between the combustion chambers is provided.

It is possible to provide two combustion chambers concentrically to be adjacent to each other in the axial direction and/or the radial direction of the housing. The two combustion chambers are formed in a cylindrical shape and an annular shape.

As mentioned above, by forming two combustion chambers in the housing, it is possible to make an inner structure of the gas generator simple and independently burn the gas generating agents in the respective combustion chambers.

The gas generating means mentioned above is provided to inflate the air bag for restraining the occupant by the combustion gas generated by the combustion thereof. Accordingly, when the ignition means includes a transfer charge which is ignited and burnt by the igniter to burn the gas generating means, the combustion gas generated by the combustion of the transfer charge is used for burning the gas generating means and is not directly used for inflating the air bag. In this respect, both can be definitely distinguished from each other. Further, two combustion chambers provided in the housing is exclusively used for storing the gas generating means. In this respect, even when the ignition means is composed to include the transfer charge and the transfer charge is installed in a defined space (hereinafter, refer to as "an accommodating chamber"), this accommodating chamber of the transfer charge and the combustion chamber storing the gas generating means can be definitely distinguished from each other.

When the ignition means for igniting and burning the gas generating means includes two or more igniters to be actuated upon an impact, it is preferable that, in order to make the mounting thereof easy, the igniters are provided in a single initiator collar aligned to each other in the axial direction. Further, when the ignition means also includes the transfer charge which is ignited and burned in response to an activation of the igniters, it is preferable that the transfer charge is partitioned for each igniter, and independently ignited and burned by each igniter, and therefore is formed such that a flame of the transfer charge for one of the igniters does not directly ignite the transfer charge in any other igniters. As this type of structure, for example, it is possible to arrange the igniters in the respectively independent igniter accommodating chambers and then arrange the transfer charges in the igniter accommodating chambers, or to arrange the transfer charges in a place inside the independent combustion chambers where the transfer charges can be ignited and burnt in response to the activation of the igniter.

As mentioned above, in the case of dividing the transfer charge for each igniter, the gas generating means stored in two combustion chambers are ignited and burnt by the flame generated by burning the transfer charges arranged separately in the respective sections. That is, since the transfer charge in each section burns in response to the activation timing of the igniter, and the gas generating means in each combustion chamber can separately burn, an actuation performance of the gas generator can be optionally controlled.

Therefore, by adopting the structure of the gas generator according to the present invention, the transfer charge partitioned for each igniter can be independently burnt by changing the respective ignition timing of each igniter and accordingly, the ignition and combustion timing of the gas generating means in each combustion chamber can be staggered, therefore, the output of the gas generator can be optionally adjusted.

With respect to the two combustion chambers provided in the housing, either of the combustion chambers may be provided in the axial direction of the igniter and the other combustion chamber may be provided in the radial direction of the ignition means. Further, in the case of characteristically adjusting the actuation performance of the gas generator, particularly a change with the passage of time in the gas discharge amount, the two combustion chambers are charged with the gas generating means which are different in at least one of a burning rate, composition, composition ratio, and an amount from each other, respectively, and the respective gas generating means can be independently ignited and burnt at an optional timing. Further, at each combustion chamber, the gas generating means having a different gas amount generated at a unit time may be stored.

As the gas generating means, in addition to an azide gas generating agent based on inorganic azide which has been widely used, for example, sodium azide, non-azide gas generating agent not based on inorganic azide may be used. However, from the view of safety, non-azide gas generating agent is preferable, and as the non-azide gas generating composition, for example, a composition containing nitrogen containing organic compound such as tetrazole, triazole or metallic salt thereof and an oxygen containing oxidant such as alkali metal nitrate, a composition using triaminoguanidine nitrate, carbohydroazide, nitroguanidine, and the like as fuel and nitrogen source and using nitrate, chlorate, perchlorate or the like of an alkali metal or an alkaline earth metal as an oxidant, and the like may be employed. In addition, the gas generating means can be suitably selected according to requirements such as a burning rate, non-toxicity, combustion temperature, and decomposition starting temperature. In the case of using the gas generating means having different burning rates in the respective combustion chambers, the gas generating means having the different composition or composition ratio itself may be used, such that, for example, the inorganic azide such as the sodium azide or the non-azide such as the nitroguanidine is used as the fuel and the nitrogen source. Alternatively, the gas generating means obtained by changing the shape of the composition to a pellet shape, wafer shape, hollow cylindrical shape, disc shape, single hole body shape or a porous body shape, or the gas generating means obtained by changing a surface area according to the size of a formed body may be used. In particular, when the gas generating means is formed into the porous body with a plurality of through holes, an arrangement of the holes is not particularly limited, however, in order to stabilize the performance of the gas generator, an arrangement structure such a distance between an outer end portion of the formed body and the center of the hole and a distance between each center of the holes are substantially equal to each other is preferable. Concretely, in the cylindrical body having a circular cross section, for example, a preferred structure is such that one hole is arranged at the center and six holes are formed around the hole so that the center of each hole is the apex of regular triangles of the equal distances between the holes. Further, in the same manner, an arrangement such that eighteen holes are formed around one hole at the center may be also suggested. However, the number of the holes and the arrangement structure are determined in connection with easiness of manufacturing the gas generating agent, manufacture cost, and performance, and are not particularly limited.

Among the two combustion chambers mentioned above, the combustion chamber provided outside in the radial direction may contain coolant means for cooling the combustion gas generated due to combustion of the gas generating means on the side of a peripheral wall of the housing thereof. The coolant means is provided in the housing for the purpose of cooling and/or purifying the combustion gas generated due to the combustion of the gas generating means. For example, in addition to a filter for purifying the combustion gas and/or a coolant for cooling the generated combustion gas which have been conventionally used, a layered wire mesh filter obtained by forming a wire mesh made of a suitable material into an annular layered body and compress-molding, and the like can be used. The layered wire mesh coolant can be preferably obtained by forming a plain stitch stainless steel wire mesh in a cylindrical body, folding one end portion of the cylindrical body repeatedly and outwardly so as to form an annular layered body and then compress-molding the layered body in a die, or by forming a plain stitch stainless steel wire mesh in a cylindrical body, pressing the cylindrical body in the radial direction so as to form a plate body, rolling the plate body in a cylindrical shape at many times so as to form the layered body and then compress-molding it in the die. Further, the coolant with a double structure with different layered wire mesh bodies at an inner side and an outer side thereof, which has a function for protecting the coolant means in the inner side and a function for suppressing expansion of the coolant means in the outer side, may be used. In this case, it is possible to restrict expansion by supporting an outer periphery of the coolant means with an outer layer such as the layered wire mesh body, the porous cylindrical body, the annular belt body.

In the case of the gas generator, in which combustion gas generated due to combustion of the gas generating means stored in two combustion chamber reaches the gas discharge port via a different flow paths in each combustion chamber so that the gas generating means stored in one combustion chamber is not directly ignited due to the combustion gas generated in the other combustion chambers, the gas generating means in the combustion chambers burns in each chamber in a completely independent manner, and therefore, the gas generating means in each combustion chamber is ignited and burnt in more secure manner. As a result, even when activation timings of two igniters are staggered significantly, the flame of the gas generating means in the first combustion chamber, ignited by the firstly actuated igniter, does not burn the gas generating means in the other combustion chambers, so that a stable output can be obtained. This kind of gas generator can be achieved, for example, by arranging a flow passage forming member in the housing so as to form the flow passage and introducing the combustion gas generated in the first combustion chamber to the coolant means directly.

The housing, mentioned above, can be obtained by forming a diffuser shell, having a gas discharge port or gas discharge ports, and a closure shell, which forms a storing space together with the diffuser shell, by casting, forging, press-molding or the like, and joining both shells. The joining of both shells can be performed by various kinds of welding methods, for example, electron beam welding, laser welding, TIG arc welding, projection welding, or the like. Forming the diffuser shell and the closure shell by press-molding various kinds of steel plates, such as stainless steel plate, makes manufacture easy and reduces manufacturing cost. Further, forming both shells into a simple shape, such as a cylindrical shape, makes the press-molding of the shells easy. With respect to the material of the diffuser shell and the closure shell, stainless steel is preferable, and the material obtained by applying nickel plating to the steel plate may be also acceptable.

In the housing mentioned above, the ignition means actuated upon detection of an impact and ignites and burns the gas generating means is further installed. In the gas generator according to present invention, as the ignition means, electric ignition type ignition means activated by an electric signal (or an activating signal) transmitted from an impact sensor or the like which detects the impact is used. The electric ignition type ignition means comprises an igniter activated by the electric signal transmitted from the electric sensor which exclusively detects the impact by means of an electric mechanism, such as a semiconductor type acceleration sensor or the like, and a transfer charge ignited and burnt by the activation of the igniter as required.

The gas generator for the air bag mentioned above is accommodated in a module case together with an air bag (bag body) to introduce the gas generated in the gas generator and inflate, so as to form the air bag apparatus. In this air bag apparatus, the gas generator is actuated when an impact is detected by the impact sensor, and the combustion gas is discharged from the gas discharge port in the housing. The combustion gas flows into the air bag, whereby the air bag breaks the module cover to inflate, and forms a cushion for absorbing the impact between a hard member in the vehicle and an occupant.

The other aspects of the present invention will be described below. The parts and combination mentioned above can be utilized in the respective aspects. Only features of the respective aspects will be described below.

Next, a description will be given below of a gas generator including two or more combustion chambers.

There is provided a gas generator for an air bag which can burn the gas generating means in each combustion chamber at a different timing and/or power, in addition to igniting and burning the gas generating means stored in each combustion chamber at a different timing.

Namely, according to the present invention, a gas generator for an air bag which installs, within a housing, gas discharge port, ignition means activated upon an impact, and gas generating means ignited and burnt by the ignition means and generate combustion gas for inflating an air bag, is characterized in that in the housing, two or more combustion chambers for storing the gas generating means are defined, the gas generating means stored in each combustion chamber is independently ignited and burnt by the ignition means provided at each combustion chamber, and the gas generating mean stored in each combustion chamber is different from the ones in the other chambers in at least one of a burning rate, shape, composition, composition ratio, and amount.

The combustion chambers provided in the housing, for example, in the case of two chambers, can be arranged such that they are concentrically provided so as to be adjacent to each other in the radial direction of the housing and a communication hole, which allows communication between the combustion chambers, is provided.

As mentioned above, the gas generating means, which is different from the ones in the other chambers in at least one of the burning rate, shape, composition, composition ratio, and amount, are stored in a plurality of combustion chambers defined in the housing, and therefore the actuation performance of the gas generator, in particular, the change in the volume of the discharged gas with the passage of time can be characteristically adjusted by independently igniting and burning the gas generating means at an optional timing. The combustion chambers are charged by the gas generating means to provide different gas amounts generated at a unit time from each other, respectively. That is, in the case of the gas generator for the air bag using the same kind of gas generating means for the respective combustion chambers, the actuation performance thereof is definitely determined according to the actuation timing of the ignition means provided in each combustion chamber. However, when the combustion chambers are charged with the gas generating means to provide the different combustion characteristics (for example, the burning rate, shape, composition, composition ratio, and amount) from each other, respectively, according to the present invention, the operation performance of the gas generator can be adjusted freely even though the actuation timings of the ignition means are the same. Accordingly, when adjusting the actuation timing of the igniter as well as the gas generating means stored in each combustion chamber, it is possible to adjust widely and finely the operation performance of the gas generator. In particular, in the case of changing the shape of the gas generating means in each combustion chamber, the shape can be varied by changing a thickness or surface area of the gas generating agent, and in the case of changing the amount of the gas generating means in each combustion chamber, the weight of the gas generating means stored in each chamber can be different from the others.

In the gas generator mentioned above, in the case that a plurality of combustion chambers are defined in the housing and charged with the gas generating means to provide different burning rates from each other in the respective combustion chambers, with respect to a burning rate (Vs) of the gas generating means with a small burning rate stored in any combustion chamber, a value (Vl/Vs) of a burning rate (Vl) of the gas generating means with a large burning rate stored in another combustion chamber can be adjusted to a range of between larger than 1 and smaller than 14. For example, in the case of partitioning the housing into two chambers (that is, first and second combustion chambers) and respectively arranging a first gas generating means and a second gas generating means in the first combustion chamber and the second combustion chamber, it is possible to adjust a burning rate of the first gas generating means to a burning rate of the second gas generating means (mm/sec) in a range of between 3:40 and 40:3.

Further, when a plurality of combustion chambers are charged with the gas generating means having different shapes from each other, respectively, the gas generating means stored in one combustion chamber and the gas generating means stored in another combustion chamber can be different from each other in thickness and/or surface area thereof. For example, if the gas generating means having a different thickness for each combustion chamber are used, with respect to a thickness (Ts) of the gas generating means with a small thickness stored in one combustion chamber, a value (Tl/Ts) of a thickness (Tl) of the gas generating means with a large thickness stored in another combustion chamber is adjusted in a range of between larger than 1 and not larger than 100. More concretely, in the case of defining first and second combustion chambers in the housing and respectively arranging the first gas generating means and the second gas generating means in the first combustion chamber and the second combustion chamber, a thickness of the first gas generating means to a thickness of the second gas generating means (mm) is adjusted to a range of between 0.1:10 and 10:0.1. In the porous cylindrical gas generating means, the thickness of the gas generating means can be measured by a method shown in an embodiment mentioned below.

When a plurality of combustion chambers are charged with the gas generating means having different surface areas per a unit weight from each other respectively, with respect to a surface area (Ss) of the gas generating means with a small surface area stored in one combustion chamber, a value (Sl/Ss) of a surface area (Sl) of the gas generating means with a large surface area stored in another combustion chamber can be suitably selected in a range of between larger than 1 and smaller than 50.

As mentioned above, in the gas generator storing the gas generating means being different in the shape and/or the amount in each of a plurality of combustion chambers, a ratio (TS1:TS2) of a total surface area (TS1) of the gas generating means stored in one combustion chamber to a total surface area (TS2) of the gas generating means stored in another combustion chamber can be adjusted in a range of between 1:50 and 50:1 in the case of a gas generator which is shorter in the axial direction than in the radial direction (for example, a gas generator for a driver side), and can be adjusted to a range of between 1:300 and 300:1 in the case of a gas generator which is longer in the axial direction than the radial direction (for example, a gas generator for passenger sides).

When changing an amount of the gas generating means in at each combustion chamber, a ratio (TW1:TW2) of a total weight (g) (TW1) of the gas generating means stored in one combustion chamber to a total weight (g) (TW2) of the gas generating means stored in another combustion chamber can be adjusted in a range of between 1:50 and 50:1 with a gas generator which is shorter in the axial direction than in the radial direction (for example, a gas generator for a driver side), and can be adjusted to a range of between 1:300 and 300:1 with a gas generator which is longer in the axial direction rather than the radial direction (for example, a gas generator for passenger sides).

In the gas generating means formed of a porous body, when using different one at each combustion chamber, it is possible to store a gas generating means formed in a porous cylindrical shape (for example, a seven-hole cylindrical body) in one combustion chamber and store a gas generating means formed in a single-hole cylindrical shape in another combustion chamber.

In the gas generator having the gas generating means stored in a plurality of combustion chambers, one of which is never ignited directly by combustion gas generated in the other combustion chambers, the gas generating means in each combustion chamber can be completely independently burnt in each combustion chamber. Accordingly, in this case, it is possible to independently ignite and burn the gas generating means stored in each combustion chamber in a more secure manner. As a result, even in the case of significantly staggering the activation timings of the ignition means provided in the respective combustion chambers, the flame of the gas generating means in one combustion chamber ignited by the firstly actuated ignition means does not burn the gas generating means in the rest of the combustion chambers, therefore, a stable operating output can be obtained.

Further, according to the present invention, in the gas generator mentioned above, there is provided a gas generator for an air bag, wherein two or more ignition means are disposed in the housing, and a combination of a gas discharge port formed in the housing and sealing means, such as a seal tape closing the gas discharge port, is characterized.

Namely, there is provided a gas generator for an air bag, having two or more ignition means to be ignited upon an impact, the gas generating means which is ignited and burnt by the ignition means and generate combustion gas for inflating an air bag, and the housing with a plurality of gas discharge ports formed thereon which forms an outer shell container, wherein the gas discharge ports are closed by sealing means for maintaining an internal pressure of the housing to a predetermined pressure, a rupturing pressure for breaking the sealing means is adjusted at multiple stages by controlling the gas discharge ports and/or the sealing means so as to suppress a difference of a maximum internal pressure of the housing at the time when each ignition means is activated, each of the two or more combustion chambers is charged with the gas generating means which is respectively different in at least one of a burning rate, shape, composition, composition ratio, and amount, and the gas generating means in each combustion chamber can be independently ignited and burnt at an optional timing.

The present invention provides a gas generator for an air bag comprising, in the housing having gas discharge ports, ignition means activated upon an impact and gas generating means ignited and burnt by the ignition means and generate combustion gas for inflating the air bag, characterized in that, in the housing, two combustion chambers for storing the gas generating means are provided concentrically so as to be adjacent to each other in the radial direction of the housing, and the communication hole which allows communication between the combustion chambers is provided, and the two combustion chambers are charged with the gas generating means respectively which are different from each other in at least one of a burning rate, shape, composition, composition ratio, and amount.

The present invention also provides a gas generator for an air bag comprising, in the housing having a gas discharge port, ignition means to be activated upon an impact and gas generating means ignited and burnt by the ignition means and generate a combustion gas for inflating the air bag, wherein, in the housing, the combustion chambers for storing the gas generating means are defined by partitioning into two or more chambers, and the gas generating means stored in each chamber is ignited and burnt independently by the igniter provided in each chamber and then generates a different amount of a gas per a unit time from each other in each chambers.

As mentioned above, when a plurality of combustion chambers are provided in the housing and charged with different gas generating means from each other, respectively, the gas generating means stored in each combustion chamber is independently ignited and burnt by the different ignition means at the same time or at intervals. By controlling an opening diameter (an opening area) of the gas discharge port and/or the thickness of the seal tape for closing the gas discharge port, the pressure (hereinafter, refer to as "a combustion internal pressure") in the housing at the time when the gas generating means burns can be unified and the combustion performance can be stabilized. In this gas generator, each of two or more combustion chambers is charged with the gas generating means to provide different amounts of the generated gas at a unit time from each other respectively. The adjustment of the rupturing pressure mentioned above can be performed by arranging two or more kinds of opening diameters and/or opening areas of the gas discharge ports. Accordingly, with respect to two kinds of openings being next to each other with respect to diameters thereof among two or more kinds of gas discharge ports formed in the housing, it is preferable that a ratio between the large diameter gas discharge port and the small diameter gas discharge port is 4/1 to 1.1/1, and an opening area ratio is 97/3 to 3/97.Further, the adjustment of the rupturing pressure is performed by arranging two or more kinds of the thickness of the sealing means. Accordingly, with respect to two kinds of sealing means being next to each other with respect to the thickness thereof, among two or more kinds of the sealing means, it is preferable that a ratio between them is 1.1/1 and 12/1.

Further, in the gas generator, according to the present invention, where a plurality of combustion chambers are charged with the different gas generating means from each other, respectively, the gas discharge port may be arranged to have two or more opening diameters and/or opening areas, and the sealing means may be arranged to have two of more thickness. Further, it is preferable that the sealing means is a seal tape comprising a seal layer having a thickness of 20 to 200 $\mu$m and a bonding layer or an adhesive layer having a thickness of 5 to 100 $\mu$m. In the present invention, the seal tape means comprises a seal layer and a bonding layer or a adhesive layer. In the sealing means such as the seal tape, the rupturing pressure is adjusted by the size of the gas discharge port and/or the thickness thereof, but the maximum internal pressure in the housing at the time of combustion of the gas generating means (hereinafter, refer to as "a combustion maximum internal pressure") and the combustion performance of the gas generating means are not adjusted.

Next, a description will be given of a gas generator including two igniters.

According to the present invention, as one solution, there is provided a gas generator for an air bag having, in the housing provided with a gas discharge port, ignition means actuated upon an impact, and gas generating means ignited and burnt by the ignition means and generate a combustion gas for inflating the air bag, wherein the ignition means includes two or more igniters activated upon an impact and the igniters are provided so as to be aligned to each other in an axial direction. Namely, the present invention provides a gas generator for an air bag comprising, in the housing provided with a gas discharge port, ignition means activated upon an impact, and gas generating means ignited and burnt by the ignition means and generate a combustion gas for inflating the air bag, wherein the ignition means has two igniters to be activated upon the impact and the igniters are provided integrally by resin.

Further, according to the present invention, there can be provided a gas generator for an air bag, wherein two or more igniters contained in the ignition means, as mentioned above, are installed and being fitted in a single initiator collar so as to be aligned to each other in the axial direction.

Still further, according to the present invention, there can be provided a gas generator for an air bag, wherein two or more igniters contained in the ignition means of the gas generator for the air bag, as mentioned above, are structured such that the igniters are integrated by a resin so as to be aligned to each other in the axial direction.

Furthermore, according to the present invention, there can be provided a gas generator for an air bag, wherein two or more igniters contained in the ignition means of the gas generator for the air bag, as mentioned above, are installed and being integrated by a resin in one initiator collar so as to be aligned to each other in the axial direction.

As mentioned above, in the air bag gas generator according to the present invention, since two or more igniters are provided so as to be aligned to each other in the axial direction, it is possible to draw out a lead wire for connection on the same plane in the same direction at a time of connecting the igniter to a control unit for the air bag apparatus.

Further, when two or more igniters are fitted into a single initiator collar and/or are integrated by a resin, a mounting operation to assemble the gas generator becomes easy.

Further, when two or more igniters are integrated by a resin in a single initiator collar, it is unnecessary to previously coincide an inner shape of the initiator collar with the outer shape of the igniter, and it is sufficient that an inner space of the initiator collar is at least larger than the size of the igniter. Further, when the igniters are integrated by the resin, a fixing member for the igniter is not required without regard to any mode of the gas generator.

According to the present invention, as an alternative solution, there is provided a gas generator for an air bag, having, in a housing provided with a gas discharge port, ignition means actuated upon an impact, and gas generating means ignited and burnt by the ignition means and generate combustion gas for inflating an air bag, wherein the ignition means includes two or more igniters activated upon an impact and the igniters are integrated by a resin.

According to the present invention, as a further alternative solution, there is provided a gas generator for an air bag having, in a housing provided with a gas discharge port, ignition means actuated upon an impact, and gas generating means ignited and burnt by the ignition means and generate a combustion gas for inflating an air bag, wherein the ignition means includes two or more igniters activated upon an impact, and the igniters are fitted into a single initiator collar.

As mentioned above, a gas generator having a simple structure and simple manufacturing steps can be provided by fixing two or more initiators by the igniter fixing member at the same time.

Further, according to the present invention, there can be provided a gas generator for an air bag in which two or more igniters contained in the ignition means of the above gas generator for the air bag are integrated by a resin in a single initiator collar.

Accordingly, when two or more igniters are fixed in a single initiator collar by the resin, it is unnecessary to previously coincide the inner shape of the initiator collar with the outer shape of the igniter, and it is sufficient that the inner space of the initiator collar is at least larger than the size of the igniter. Further, since the igniters are integrally fixed by the resin, a fixing member for the igniter is not required without regard to any mode of the gas generator.

In the gas generator according to the present invention, as the ignition means, an electric ignition type ignition means activated by an electric signal (or an activating signal) transmitted from an impact sensor or the like that detects an impact. The electric ignition type ignition means comprises an igniter activated on the basis of the electric signal transmitted from the electric type sensor which detects the impact exclusively by means of the electric mechanism such as a semiconductor type acceleration sensor, and a transfer charge ignited and burnt on activation of the igniter.

In the gas generator for the air bag according to the present invention, the elements other than the above solutions are not particularly limited, the same elements as those of a known gas generator for an air bag can be adopted, and any modification generally performed by those skilled in the art to the elements can be included.

Accordingly, the gas generator for the air bag according to the present invention can be structured to comprise two or more ignition means and two or more gas generating means (two or more combustion chambers and gas generating agents) which are independently ignited and burnt by the respective ignition means to generate a combustion gas for inflating the air bag.

Next, a description will be given of a gas generator including a combustion chamber and ignition means in an inner cylindrical member.

The gas generator for the air bag according to the present invention is a gas generator in which two combustion chambers are provided in the housing, and is characterized by an arrangement structure of two combustion chambers. It is possible to independently ignite and burn the gas generating means stored in the respective combustion chambers by different ignition means.

Namely, according to the present invention, there is provided a gas generator for an air bag, having, in a housing provided with a gas discharge port, ignition means actuated upon an impact, and gas generating means ignited and burnt by the ignition means and generate a combustion gas for inflating the air bag, wherein two combustion chambers storing the gas generating means are provided in the housing, a communicating hole which allows communication between the combustion chambers is provided, one of the two combustion chambers is provided in a side of the upper space of an inner cylindrical member disposed in the housing, the ignition means is provided in a side of the lower space of the inner cylindrical member, and the upper space and the lower space are defined by a partition wall.

Further, according to the present invention, there is provided a gas generator for an air bag, having, in a housing provided with a gas discharge port, ignition means activated upon an impact, and gas generating means ignited and burnt by the ignition means and generate a combustion gas for inflating the air bag, wherein, in the housing, two combustion chambers storing the gas generating means are concentrically provided so as to be adjacent to each other in the radial direction of the housing, the communicating hole which allows communication between the combustion chambers is provided, an inner combustion chamber of the two combustion chambers is provided in a side of the upper space of an inner cylindrical member disposed in the housing, the ignition means is provided in a side of the lower space of the inner cylindrical member, and the upper space and the lower space are defined by a partition wall.

Further, according to the present invention, there is provided a gas generator for an air bag having ignition means activated upon an impact, and gas generating means ignited and burnt by the ignition means and generate a combustion gas for inflating the air bag in a housing formed into a cylindrical shape having an axial core length longer than an outermost diameter, with a plurality of gas discharge ports on the peripheral wall thereof, wherein, in the housing, two combustion chambers storing the gas generating means are concentrically provided so as to be adjacent to each other in the axial direction and/or the radial direction of the housing, the communicating hole which allows communication between the combustion chambers is provided, an inner combustion chamber of the two combustion chambers is provided in a side of the upper space of an inner cylindrical member disposed in the housing, the ignition means is provided in a side of the lower space of the inner cylindrical member, and the upper space and the lower space are defined by a partition wall.

As mentioned above, the inner structure of the gas generator can be made simpler by arranging the inner combustion chamber and the ignition means in upper and lower portions in the axial direction in the space formed by the defining member.

Further, as mentioned above, by concentrically arranging the two combustion chambers in the housing, it is possible to make an inner structure of the gas generator simple and independently burn the gas generating agents in the respective combustion chambers.

The gas generator for the air bag according to the present invention includes the gas generator having the above structure and characterized by the arranging structure of one combustion chamber and the ignition means and a method of fixing two or more ignition means.

That is, according to the present invention, in the above gas generator for the air bag, there can be provided a gas generator for an air bag, wherein ignition means comprises two or more igniters activated upon an impact, and each igniter is provided in an initiator collar and fixed by an igniter fixing member which covers the upper surface of the initiator collar. Further, there can be provided a gas generator for an air bag, wherein the two or more igniters are provided in a single initiator collar.

As mentioned above, by fixing two or more igniters using the igniter fixing member at once, the structure and the manufacture becomes simple.

Further, according to the present invention, in the above gas generator for the air bag, there can be provided a gas generator for an air bag, wherein one of the two combustion chambers is provided outside the inner cylindrical member disposed in the housing, an inner space of the inner cylindrical member is defined by the other combustion chamber and an ignition means accommodating chamber in which the ignition means including the igniters is stored, by a partitioned circular member and a seal cup member engaged with the partitioned circular member. Further, there can be provided a gas generator for an air bag, wherein the partitioned circular member is engaged with a stepped notch portion provided on an inner peripheral surface of the inner cylindrical member. Still further, there can be provided a gas generator for an air bag, wherein a peripheral edge of the seal cup member is bent, and the bent portion of the peripheral edge is fitted into a groove provided on the inner peripheral surface of the inner cylindrical member.

Further, according to the present invention, in the above gas generator for the air bag, there can be provided a gas generator for an air bag, wherein the igniter contained in the ignition means is supported by the igniter fixing member which covers the upper surface of the initiator collar and fixed to the initiator collar, the seal cup member has an igniter receiving port extending to the igniter fixing member, an O-ring is arranged in a space constituted by the igniter fixing member, the igniter receiving port and the igniter, and the O-ring seals between the igniter fixing member and the igniter receiving port, between the igniter fixing member and the igniter, and between the igniter receiving port and the igniter.

Further, according to the present invention, in the above gas generator for the air bag, there can be provided a gas generator for an air bag, wherein an O-ring is interposed between a bent portion of the peripheral edge in the seal cup portion and the inner wall surface of the inner cylindrical member to which the bent portion is fitted.

As mentioned above, by using the seal cup member having a specific structure, it is unnecessary to interpose the O-ring in the fitting portion of the seal cup and the inner cylindrical member, and therefore, the diameter of the gas generator can be smaller. Further, since it is possible to maintain the ignition means in an airtight manner, a combustion of the transfer charge is uniformly performed in response to the activation of the igniter, and the internal pressure is increased by the combustion of the transfer charge, thereby expanding in the radial direction to press the inner wall surface of the inner cylindrical member to which the bent portion of the seal cup member is fitted, so that an air-tightness is further improved and a combustion of the transfer charge can be also uniformly performed.

Further, as mentioned above, by commonly using the igniter fixing member and the seal cup member together with the O-ring, it is possible to completely separate two or more igniters form each other.

Next, a description will be given of the gas generator which transmits an electric signal by a lead wire.

According to the present invention, there is provided a gas generator for an air bag, having ignition means actuated upon an impact, and gas generating means ignited and burnt by the ignition means and generate a combustion gas for inflating an air bag in a housing provided with a gas discharge port, wherein two combustion chambers storing the gas generating means are provided in the housing, the communicating hole which allows communication between the combustion chambers is provided, the ignition means comprises two or more igniters activated by an electric signal, a lead wire for transmitting the electric signal is connected to each igniter, and the lead wire is drawn out in the same direction on the same plane.

As the ignition means, electric ignition type ignition means activated by an electric signal (or an activating signal) transmitted from an impact sensor or the like for detecting the impact is used in the gas generator according to the present invention. The electric ignition type ignition means comprises an igniter which is actuated on the basis of the electric signal transmitted from the electric type sensor which detects an impact by an exclusively electric mechanism such as a semiconductor type acceleration sensor, and a transfer charge ignited and burnt in response to an activation of the igniter.

Further, in two or more igniters, it is preferable that the lead wires for transmitting the electric signal are connected via connectors and the connectors are arranged in parallel on the same plane.

Further, in two or more igniters, it is preferable that the lead wires for transmitting the electric signal are connected via the connectors and the lead wires are drawn out by the connectors in the same direction perpendicular to the axial direction of the housing.

Further, two or more igniters are preferably provided in a single initiator collar and aligning in the axial direction in order to facilitate mounting them.

Further, it is preferable that two combustion chambers storing the gas generating means are concentrically provided so as to be adjacent to each other in the radial direction of the housing and a communicating hole, which allows communication between the combustion chambers, is provided.

Further, according to the present invention, there is provided a gas generator for an air bag, having ignition means activated upon an impact, and gas generating means ignited and burnt by the ignition means and generate a combustion gas for inflating an air bag in a housing with a gas discharge port, wherein two combustion chambers storing the gas generating means are provided in the housing, a communicating hole which allows communication between the combustion chambers is provided. The ignition means comprises two or more igniters activated by an electric signal, a lead wire for transmitting the electric signal is connected to each igniter. A lead wire extending from one of the igniters extends substantially on an imaginary plane perpendicular to an axial direction of the housing and a lead wire extending from another of the igniters also extends substantially on the same plane.

The lead wires preferably extend 90 degrees or less, and more preferably 50 or 45 degrees or less with respect to one another, but can also be paralledl or extend in an opposite direction (180 degrees or less).

Further, in the gas generator for the air bag as mentioned above, there can be provided a gas generator for an air bag having ignition means activated upon an impact, and gas generating means ignited and burnt by the ignition means and generate a combustion gas, for inflating an air bag, in a housing provided with a plurality of gas discharge ports on a peripheral wall thereof and formed into a cylindrical shape having an axial core length longer than an outermost diameter, wherein, in the housing, two combustion chambers storing the gas generating means are concentrically provided so as to be adjacent to each other in the axial direction and/or the radial direction of the housing, and a communicating hole, which allows communication between the combustion chambers, is provided.

According to the present invention, two or more lead wires can be drawn out on the same plane and in the same direction by improving the mounting structure of the lead wire connected to two or more igniters, and therefore, it is possible to make an assembling process of the air bag apparatus using the gas generator for the air bag easy and also make the structure of the apparatus simple.

Next, a description will be given of a gas generator having an automatic ignition material.

A gas generator for an air bag according to the present invention corresponds to a gas generator having two combustion chambers in a housing, which can completely burn gas generating means left after the actuation of the gas generator. Accordingly, no inconvenience is affected at a time of later process, disposal or the like.

That is, according to the present invention, there is provided a gas generator for an air bag having ignition means activated upon an impact, and gas generating means ignited and burnt by the ignition means and generate a combustion gas, for inflating an air bag, in a housing provided with a gas discharge port, wherein, in the housing, two or more combustion chambers storing the gas generating means are defined, a communicating hole which allows communication between the combustion chambers is provided, and an automatic ignition material (AIM) ignited and burnt due to a transmitted heat is stored in one of the combustion chambers. For example, if the gas generating means stored in a plurality of combustion chambers are burnt at different timing at each combustion chamber, the automatic ignition material (AIM) is preferably stored in the combustion chamber where the gas generating means to be burnt at a delayed timing is stored. In this case, the automatic ignition material (AIM) can be ignited and burnt due to the transmission of the heat generated by combustion of the previously burnt gas generating agent. It is preferable that this automatic ignition material ignites the gas generating agent which is to be burnt at 100 milliseconds or more after the ignition means for igniting the gas generating means to be previously burnt is activated. Further, the automatic ignition material can be arranged so as to be combined with the igniter contained in the ignition means for igniting and burning the gas generating means to be burnt at a delayed timing (or possibly left after the actuation of the gas generator).

The gas generator which burns the gas generating means at the different timing at each combustion chamber can be realized, for example, by constituting the ignition means so as to include the transfer charge to be ignited and burnt by the activation of the igniter, dividing the transfer charge for each igniter so as to be independently ignited and burnt at each igniter, and igniting and burning the gas generating means stored in a plurality of combustion chambers with the flame by the combustion of the transfer charge in the different sections.

For example, in the gas generator in which two combustion chambers for storing the gas generating means are provided in the housing, the first gas generating means to be firstly burnt and the second gas generating means to be burnt at a later timing are arranged in each combustion chamber, and the first ignition means for igniting the first gas generating means and the second ignition means for igniting the second gas generating means are further provided, the automatic ignition material (AIM) is provided in the igniter contained in the second combustion chamber or the second ignition means. As the automatic ignition material (AIM), a material, which is ignited and burnt due to a heat generated by the combustion of the first gas generating means transmitted along the housing, is used.

In the case of forming two combustion chambers storing the gas generating means in the housing, two combustion chambers can be concentrically provided so as to be adjacent to each other in the radial direction of the housing and further a communication hole, which allows communication between the combustion chambers in the housing, can be provided.

The automatic ignition material (AIM), which can be used in the present invention, adopts a material which can be ignited and burnt at least due to a combustion heat of the (prior burning) gas generating means transmitted from the housing or the like (that is, a transfer heat). As such a material, there is, for example, a nitrocellulose.

However, these can, of course, vary on a kind of the used gas generating means, a heat transferring member which transmits the combustion heat (for example, the housing), a distance with respect to a portion where the firstly burning gas generating means is stored. Therefore, it is necessary to suitably select and adopt them according to the design.

DESCRIPTION OF PREFERRED EMBODIMENTS

A gas generator for an air bag according to the present invention will be described below with reference to the accompanying drawings.

Embodiment 1

Figure 1:
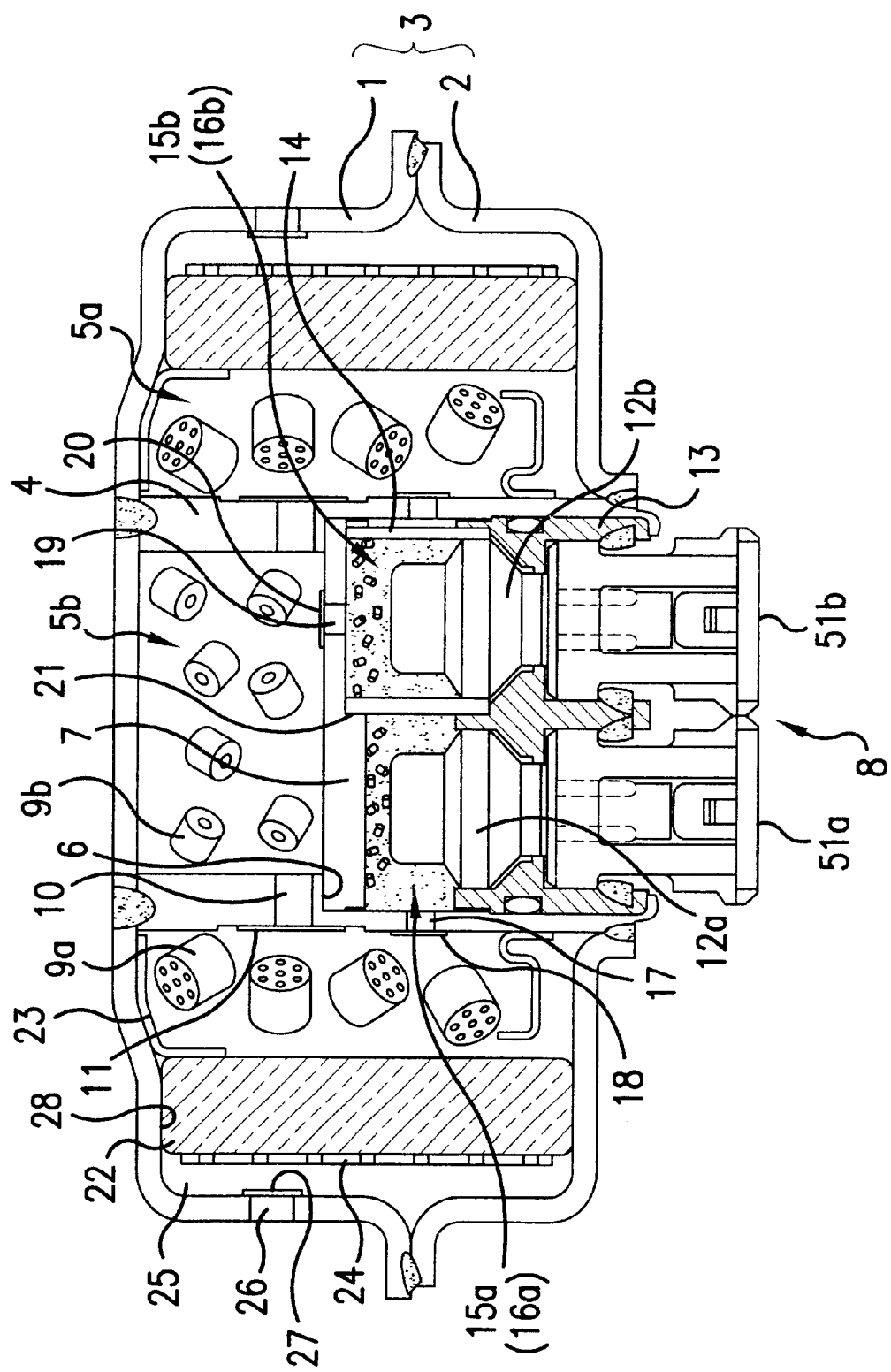
FIG. 1 is a vertical cross sectional view which shows an embodiment of a gas generator according to the present invention.

FIG. 1 is a vertical cross sectional view of a gas generator according to a first embodiment of the present invention. FIG. 1 shows a structure particularly suitable for a driver's side gas generator The gas generator comprises a housing 3 formed by joining a diffuser shell 1, provided with gas discharge ports, and a closure shell 2 to form an inner accommodating space. The gas generator is provided an inner cylindrical member 4 formed in a substantially cylindrical shape and arranged in the housing 3, thereby forming a first combustion chamber 5a outside the inner cylindrical member 4. Further, a stepped notch portion 6 is provided on an inside surface of the inner cylindrical member 4, and a partition wall 7, formed in a substantially flat circular shape, is arranged in the stepped notch portion 6. The partition wall 7 further partitions an inner portion of the inner cylinder into two chambers so as to form a second combustion chamber 5b in the diffuser shell side (in the upper space side) and an ignition means accommodating chamber 8 in the closure shell side (in the lower space side), respectively. As a result, in this gas generator, the first combustion chamber 5a and the second combustion chamber 5b are concentrically provided in the housing 3 and arranged adjacent to each other in the radial direction of the housing. Gas generating agents (9a, 9b), burnt by ignition means activated upon an impact, for generating combustion gas are stored in the first and second combustion chambers. The ignition meansis stored in the ignition means accommodating chamber 8. A through hole 10 is provided in the inner cylindrical member 4 which defines the first combustion chamber 5a and the second combustion chamber 5b, and the through hole 10 is closed by a seal tape 11. The seal tape 11 is ruptured when the gas generating agent 9b is burnt, and both combustion chambers can be communicated with each other by the through hole 10. This seal tape 11 needs to be adjusted on its material and a thickness so that the seal tape 11 is not ruptured due to the combustion of the gas generating agent 9a in the first combustion chamber 5a, but is ruptured when the gas generating agent 9b in the second combustion chamber 5b is burnt. In the present embodiment, a stainless seal tape having a thickness of 40 μm is used. Further, the through hole 10 does not function to control an internal pressure in the combustion chamber 5b since an opening area thereof is formed larger than a gas discharge port 26b.

Figure 2:
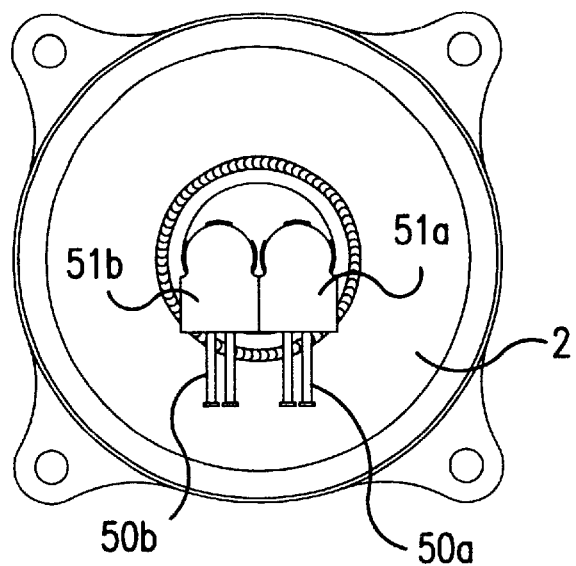
FIG. 2 is a back view of a gas generator according to the present embodiment.

The ignition means comprises two electric ignition type igniters 12a and 12b activated by an activating signal outputted on a basis of detection by a sensor, and the igniters 12a and 12b are provided parallel to each other in a single initiator collar 13 while exposing head portions thereof. As mentioned above, two igniters 12a and 12b are fixed to the initiator collar 13 so as to form a single member by providing the two igniters 12a and 12b in the single initiator collar 13, thereby facilitating an assembly to the gas generator. In particular, in the gas generator as illustrated in FIG. 1, since the initiator collar 13 is formed in a size capable of being inserted into the inner cylindrical member 4, the igniters are easily and securely fixed by crimping the lower end of the inner cylindrical member 4 to fix the initiator collar after inserting the initiator collar 13 provided with two igniters 12a and 12b into the inner cylinder 4. Further, when arranging two igniters (12a, 12b) in the initiator collar 13, the direction of each igniter can be easily controlled. As illustrated, two igniters are arranged eccentrically with respect to the center axis of the housing. In case of arranging the ignitersto align the direction of the igniters 12a and 12b, as shown in FIG. 2, lead wires 50 connecting the igniters (12a and 12b) to a control unit (not shown) can be drawn out in the same direction on the same plane. In FIG. 2, the lead wires 50 are connected to the igniters (12a, 12b) via connectors 51a, 51b and the connectors are provided in parallel on the same plane. By forming each connector in the shape of a L-letter, the lead wire for transmitting an electric signal (an activating signal) to the igniter can be provided in a direction perpendicular to the axial direction of the housing (that is, in the radial direction of the housing), and at that time, the lead wire connected to each igniter can be drawn out in the same direction.

In this embodiment, a substantially cylindrical separating cylinder 14 is arranged in a space between the initiator collar 13 and the partition wall 7 so as to surround one igniter 12b (hereinafter, refer to as "a second igniter"). A first transfer charge accommodating chamber 15a is defined in the outer side of the wall 7, and a second transfer charge accommodating chamber 15b is defined in the inner side of the wall 7. The igniter and the transfer charge, constituting the ignition means, are stored in each accommodating chambers. As a result, transfer charges (16a, 16b), constituting the ignition means together with the igniters, are securely partitioned into the respective igniters (12a, 12b). When the transfer charge 16a in the first transfer charge accommodating chamber 15a is burnt, a seal tape 18, closing the flame-transferring hole 17 provided on the cylindrical member 4, is ruptured, whereby the first transfer charge accommodating chamber 15a communicates with the first combustion chamber 5a. When the transfer charge 16b in the second transfer charge accommodating chamber 15b is burnt, a seal tape 20, closing the flame-transferring hole 19 provided on the partition wall 7, is ruptured, whereby the second transfer charge accommodating chamber 15b communicates with the second combustion chamber 5b. Accordingly, when this gas generator activates, a flame generated, when the first igniter 12a is ignited (activated), ignites and burns the transfer charge 16a in the accommodating chamber 15a and then, the flame in the accommodating chamber 15a passes through the flame-transferring hole 17 formed in the inner cylindrical member 4 and ignites and burns a gas generating agent 9a, having seven holes, stored in the first combustion chamber 5a positioned in the radial direction of the chamber 15a. Then, the second igniter 12b ignites and burns the second transfer charge 16b stored in the accommodating chamber 15b and the flame in the accommodation chamber 15b passes through the flame-transferring hole 19, provided in the axial direction of the accommodating chamber 15b, and ignites and burns a gas generating agent 9b, having a single hole, stored in the second combustion chamber 5b. The combustion gas generated in the second combustion chamber 9b passes through the through hole 10, provided in the diffuser shell side 1 of the inner cylindrical member 4, and flows into the first combustion chamber 5a.

Figure 3:
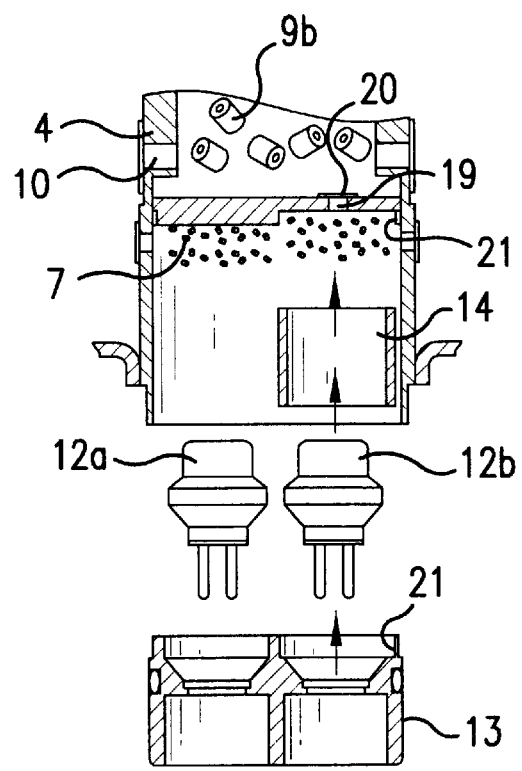
FIG. 3 is a partly enlarged view of a gas generator according to the present invention.

Particularly, in the gas generator shown in FIG. 1, in order to stabilize an actuation performance, there is a case where the second igniter 12b and the first igniter 12a are ignited simultaneously or the igniter 12b is not activated prior to the latter 12a. That is, the gas generating agent 9b stored in the second combustion chamber 5b is burnt at the same time with the gas generating agent 9a stored in the first combustion chamber 5a or at timing delayed from that of the combustion of the gas generating agent 9a. When the gas generating agent 9a is burnt prior to the second gas generating agent 9b, as mentioned above, the seal tape 11 is not ruptured by the combustion of the first gas generating agent 9a, but is ruptured only by the combustion of the second gas generating agent 9b. Further, in the gas generator shown in FIG. 1, the separating cylinder 14, arranged between the initiator collar 13 and the partition wall 7 is, as shown in a main portion enlarged view in FIG. 3, arranged such that hole portions 21, corresponding to an outer shape of the separating cylinder 14, are provided on the lower surface of the partition wall 7 and the upper surface of the initiator collar 13, and the upper end and the lower end of the separating cylinder 14 are fitted into the respective hole portions 21. By arranging the separating cylinder 14 in this manner, a flame of the transfer charge generated in one of the transfer charge combustion chambers does not directly burn the transfer charge in the other transfer charge accommodating chamber, and the gas generating agents stored in two combustion chambers are respectively ignited and burnt by the flame generated by the combustion of the transfer charges in the different chambers. Namely, in general, when the transfer charge burns in the separating cylinder 14 (that is, in the second transfer charge accommodating chamber 15b), a pressure of the gas generated by the combustion serves to expand the separating cylinder in the radial direction. However, by arranging the separating cylinder, as shown in FIG. 3, the upper and lower end portions of the separating cylinder are securely supported by the peripheral walls of the hole portions 21 where the respective portions are fitted, so that, in comparison with the case of simply interposing the separating cylinder between the partition wall 7 and the initiator collar 13, leaking of the combustion gas and the flame of the transfer charge can be prevented securely.

Further, a common coolant/filter 22 for purifying and cooling the combustion gas generated by the combustion of the gas generating agents (9a, 9b) is disposed in the housing 3. An inner peripheral surface of the coolant/filter 22 at the diffuser shell 1 side is covered with a short pass preventing member 23 so that the combustion gas does not pass between an end surface of the coolant/filter 22 and a ceiling portion inner surface 28 of the diffuser shell 1. An outer layer 24 for preventing the filter 22 from expanding outwardly due to passing of the combustion gas or the like is arranged on the outer side the coolant/filter 22. The outer layer 24 is, for example, formed by using a layered wire mesh body, and in addition, may be formed by using a porous cylindrical member having a plurality of through holes on a peripheral wall surface, or a belt-like suppressing layer obtained by forming a belt-like member with a predetermined width into an annular shape. A gap 25 is further formed on the outer side of the outer layer 24 so that the combustion gas can pass through the entire portion of the filter 22. A gas discharge port 26, formed in the diffuser shell 1, is closed by a seal tape 27 to stop an ambient air from entering. The seal tape 27 is ruptured at a time of discharging the gas. The seal tape 27 aims to protect the gas generating agent from a moisture in the atmosphere outside the gas generator, and does not have any influence on controlling the performances such as the combustion internal pressure.

In the gas generator constituted in the above manner, when the first igniter 12a, disposed in the ignition means accommodating chamber 8 and in the outer side of the separating cylinder 14, is activated, the transfer charge 16a, stored in the first transfer charge accommodating chamber 15a, is ignited and burnt, and the flame thereof passes through the flame-transferring hole 17 in the inner cylindrical member 4 and burns the porous cylindrical first gas generating agent 9a stored in the first combustion chamber 5a. When the second igniter 12b, surrounded by the separating cylinder 14, is activated at the same time or at a delayed timing with respect to the activation of the first igniter 12a, the transfer charge 16b, stored in the second transfer charge accommodating chamber 15b, is ignited and burnt, and the flame thereof ignites and burns the single-hole cylindrical second gas generating agent 9b stored in the second combustion chamber 5b. As a result, the ignition timings of two igniters 12a and 12b are adjusted. That is, an output performance (an actuation performance) of the gas generator can be optionally adjusted by activating the second igniter after the activation of the first igniter or simultaneously activating the first igniter and the second igniter. Therefore, under various circumstances, such as a speed of a vehicle and an environmental temperature at a time of collision, it is possible to make an inflation of the air bag in the air bag apparatus mentioned below most suitable. Particularly, in the gas generator shown FIG. 1, the respective combustion chambers (5a, 5b) are provided with gas generating agents (9a, 9b) having different shapes, . Namely, the porous cylindrical first gas generating agent 9a is disposed in the first combustion chamber 5a, and the single-hole cylindrical second gas generating agent 9b is disposed in the second combustion chamber 5b. Further, the amount of the gas generating agent stored in each combustion chamber (5a, 5b) is different. The gas generating agents 9a is 35 g and the amount of the gas generating agent 9b is 6 g. Consequently, in this gas generator, the output performance can be adjusted more precisely. Naturally, the shape, composition, composition ratio, amount, etc. of the gas generating agent may be changed to obtain the desired output performance .

The output performance of the gas generator, mentioned above, can be also confirmed, for example, according to a tank combustion test mentioned below.

Tank Combustion Test

A gas generator for the air bag is placed in a SUS (stainless steel) tank having an inner volume of 60 liter and is connected to an electric ignition circuit, provided outside the tank, after sealing the tank at a room temperature. By setting the time to zero (0) when an ignition electric circuit switch is turned on (an ignition electric current is applied), the pressure increase inside the tank is measured by a pressure transducer, independently placed in the tank, for a time period between 0 and 200 milliseconds. Based on the measured data, a tank pressure/time curve is generated by a computer, and a curve estimating the performance of the gas generator (hereinafter, refer to as "a tank curve") is obtained. After finishing the combustion, the gas in the tank is partly taken out and may be used for the analysis of gasses such as CO, NOx, etc.

Embodiment 2

Figure 4:
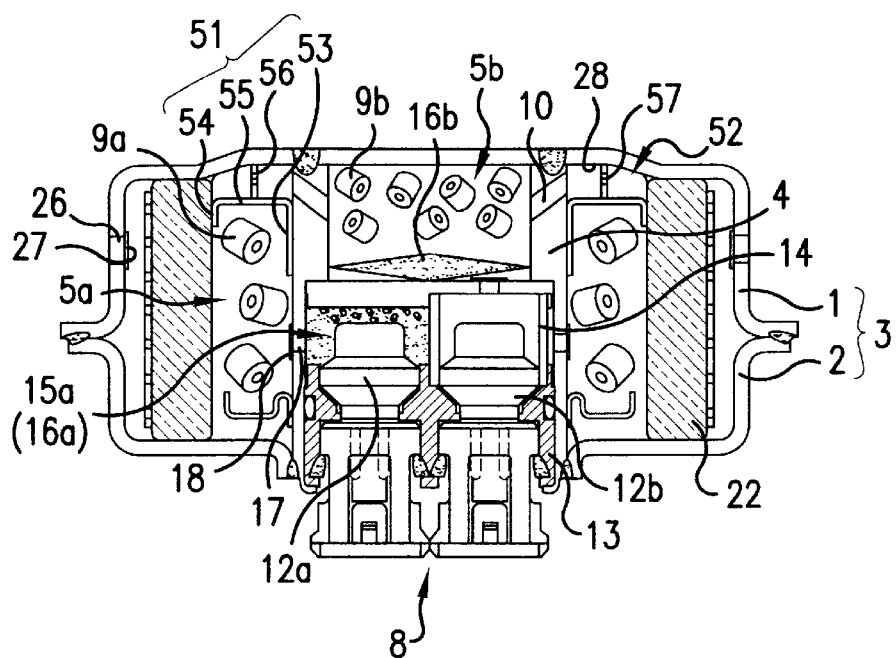
FIG. 4 is a vertical cross sectional view which shows another embodiment of a gas generator for an air bag according to the present invention.

FIG. 4 is a vertical cross sectional view which shows a second embodiment of a gas generator for an air bag according to the present invention. The gas generator, shown in this drawing, is also structured to be particularly suitable for the a driver side as in the case of the gas generator shown in FIG. 1. However, the gas generator shown in FIG. 4 is different from the gas generator shown in FIG. 1, in that a flow passage forming member 51 is arranged in the first combustion chamber 5a, and a flow passage 52, through which the combustion gas generated in the second combustion chamber 5b passes, is formed between the flow passage forming member 51 and the ceiling portion of an inner surface 28 of the diffuser shell 1.

The flow passage forming member 51 has an annular shape obtained by bending an inner periphery and an outer periphery of a circular member to form an inner peripheral wall 53 and an outer peripheral wall 54. A supporting wall 56 for forming a space with the ceiling portion of the inner surface 28 of the diffuser shell is integrally formed on a circular portion 55 connecting the both peripheral wall surfaces. The flow passage forming member 51 is attached to the inner cylindrical member 4 by the inner peripheral wall 53 making contact with the inner cylindrical member 4, and brings a supporting wall 56 in contact with the ceiling portion of the inner surface 28 of the diffuser shell, whereby a space is formed between the circular portion 55 and the ceiling portion of the inner surface 28 of the diffuser shell. Since multiple through holes 57 are formed on the supporting wall 56, the space functions as a gas flow passage 52. The gas flow passage 52 is in communication with the second combustion chamber 5b via the through hole 10 provided in the inner cylindrical member 4. Therefore, the combustion gas generated in the second combustion chamber 5b is discharged into the gas flow passage 52 from the through hole 10, passes through the coolant/filter 22 and discharged from the gas discharge port 26.

In the gas generator constituted in the above manner, the first combustion chamber 5a and the second combustion chamber 5b can be communicated with each other in the coolant/filter 22. However, the combustion gas generated by the combustion of the gas generating agent stored in either combustion chamber passes through the coolant/filter 22, and is discharged from the gas discharge port 26. Consequently, a flame generated by the gas generating agent, which is firstly ignited and burnt, does not ignite the gas generating agent stored in the other combustion chamber. The single-hole gas generating agent 9a stored in the first combustion chamber 5a is ignited and burnt only by the activation of the first igniter 12a, and the gas generating agent 9b in the second combustion chamber 5b is ignited and burnt only by the activation of the second igniter 12b.

Accordingly, in the gas generator FIG. 4, even in the case of significantly staggering the activation timing of two igniters 12a and 12b, the flame of the gas generating agent ignited by the firstly activated igniter does not burn the gas generating agent in the other combustion chamber, and thereby a stable tank curve can be obtained in the tank combustion test. This becomes further advantageous particularly in the case of activating the second igniter 12b at a predetermined time after activating the first igniter 12a. Namely, in the gas generator shown in FIG. 4, since the through hole 10 is not closed by a seal tape, if the flow passage forming member 51 is not used, there is a possibility that the combustion gas generated in the first combustion chamber 5a passes through the through hole 10 of the inner cylindrical member 4 and ignites and burns the gas generating agent 9b in the second combustion chamber 5b. However, by forming a different flow passage foreach combustion chamber (5a, 5b), as in the present embodiment, the combustion gas generated in the first combustion chamber 5a passes through the coolant/filter 22 and is discharged without igniting the gas generating agent 9b in the second combustion chamber 5b. As a result, the gas generating agent 9b, stored in the second combustion chamber 5a, can be optionally ignited and burnt only by activating the second igniter 12a. As stated in the foregoing, in the gas generator according to the present embodiment, the through hole 10 is not closed by a seal tape. But even if the hole 10 is closed by a seal tape, the gas generating agent can be further independently ignited and burnt in each combustion chamber. Accordingly, it is possible to make an output performance of the gas generator most suitable in accordance with a circumstance at a time of collision of the vehicle.

Here, in the gas generator shown in FIG. 4, the transfer charge 16b ignited by the second igniter 12b, is arranged in the second combustion chamber 5b, and not in the separating cylinder 14. By arranging the transfer charge 16b in this manner, the flame can uniformly burn the gas generating agent 9b in the second combustion chamber 5b when the transfer charge 16b is ignited and burnt by the activation of the second igniter 12b. Further, the transfer charge 16b cannot be directly burnt by the flame of the transfer charge 16a in the first transfer charge accommodating chamber 15a. In FIG. 4, with respect to the same elements as those in FIG. 1, the same reference numerals are used and a description thereof has been omitted.

Next, a description will be given of an actuation performance in the case of performing the above tank combustion test using the gas generator having the structure shown in FIG. 4, by referring to FIG. 5. In this test, the gas generating agents, having different shapes, are charged in the respective combustion chambers at different amounts. In the tank curve shown in FIG. 5, the gas generating agent 9a in the first combustion chamber 5a has a surface area at a unit weight of a gas generating agent smaller than that of the gas generating agent 9b in the second combustion chamber 5b, and proportions of the charging amount between the gas generating agents, i.e. a rate of the first gas generating agent to the second gas generating agent is 35/6.

Figure 5:
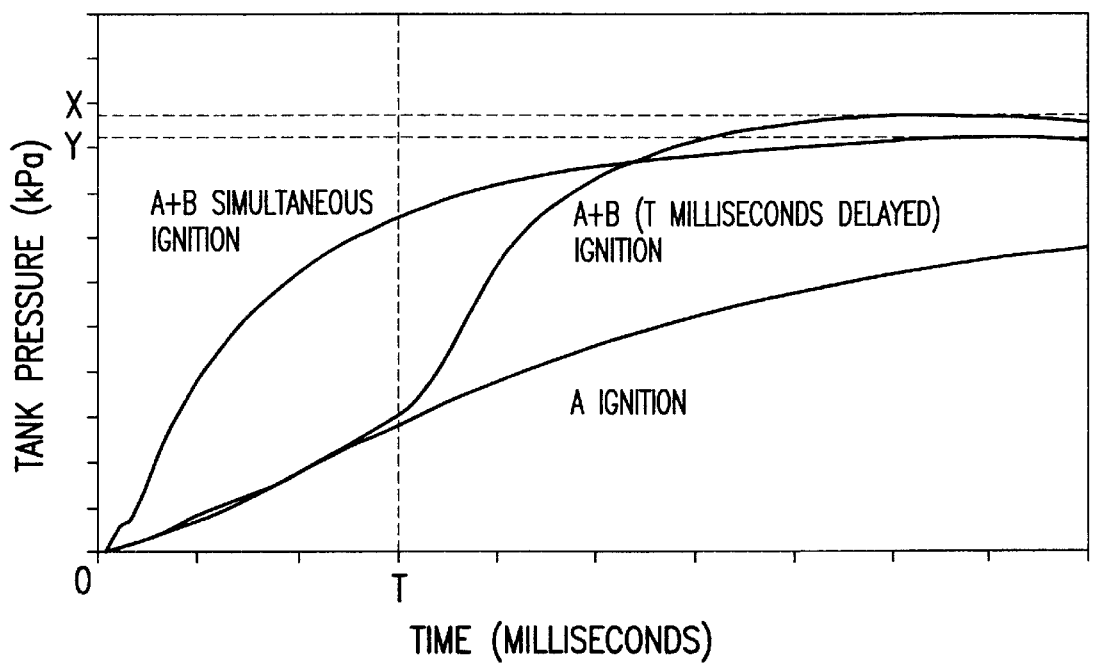
FIG. 5 is a graph which shows an operating output of a gas generator for an air bag according to the present invention.

In FIG. 5, "A ignition" means a tank curve obtained when only the gas generating agent 9a in the first combustion chamber 5a is burnt by activation of the first igniter 12a. This tank curve moves upward, drawing a gentle curve. This is because the gas generating agent 9a in the first combustion chamber 5a has a surface area at a unit weight of the gas generating agent smaller than that of the gas generating agent 9b in the second combustion chamber 5b, and does not burn at one time after ignition.

Further, "A+B (simultaneous) ignition" means a tank curve obtained when the first and second igniters (12a, 12b) are simultaneously activated to simultaneously burn the gas generating agents (9a, 9b) in the first and second combustion chambers 5a and 5b. In this tank curve, the tank pressure rapidly increases simultaneously when the activating signal is transmitted to both igniters (12a, 12b). This is because the second gas generating agent 9b in the second combustion chamber 5b having a larger surface area per a unit weight burns at a time at the same time of the ignition to discharge the combustion gas. Thereafter, the combustion gas is continuously generated by the gas generating agent 9a in the first combustion chamber 5a, so that the increased output curve (the tank curve) is maintained for a while.

Further, "A+B (T milliseconds delayed) ignition" means a tank curve obtained when the second igniter 12b is activated to burn the gas generating agent 9b in the second combustion chamber 5b at T milliseconds after the first igniter 12a to burn the first gas generating agent 9a in the first combustion chamber 5a is firstly activated. This tank curve is substantially the same as the tank curve of "A ignition" before T milliseconds, however, after the second igniter 12b is activated (i.e. after T milliseconds), the tank curve goes upward at a time. This is because an amount of the gas rapidly generated by the combustion of the gas generating agent 9b in the second combustion chamber 5b is added. Here, in the tank curve of "A+B (T millisecond delayed) ignition", the maximum output (X kPa) thereof is more than the maximum output (Y kPa) of the tank curve of "A+B (simultaneous) ignition". This is because the gas generating agents (9a, 9b) in both the combustion chambers (5a, 5b) are burnt at a time in the case of "A+B (simultaneous) ignition",however, on the other hand, the second gas generating agent 9b in the second combustion chamber 5b is ignited and burnt at a T milliseconds after the first gas generating agent 9b charged in the first combustion chamber 5a, so that the generated heat is continuously maintained at that degree.

As mentioned above, in the "A+B (T millisecond delayed) ignition" in FIG. 5, the second igniter 12b is activated T milliseconds after the first igniter 12a is activated. The delay timing can be set to an optional interval by adjusting the ignition circuit. Accordingly, a judging circuit judges a speed at a time of the collision of the vehicle or an attitude of an occupant (for example, a person with a sitting height is long or short or a person with an attitude of holding to the steering wheel), or the like at the time of the collision to set a suitable delay time and accurately activating the ignition means, whereby it is possible to inflate the air bag in an optimum inflating mode under various circumstances.

Embodiment 3

Figure 6:
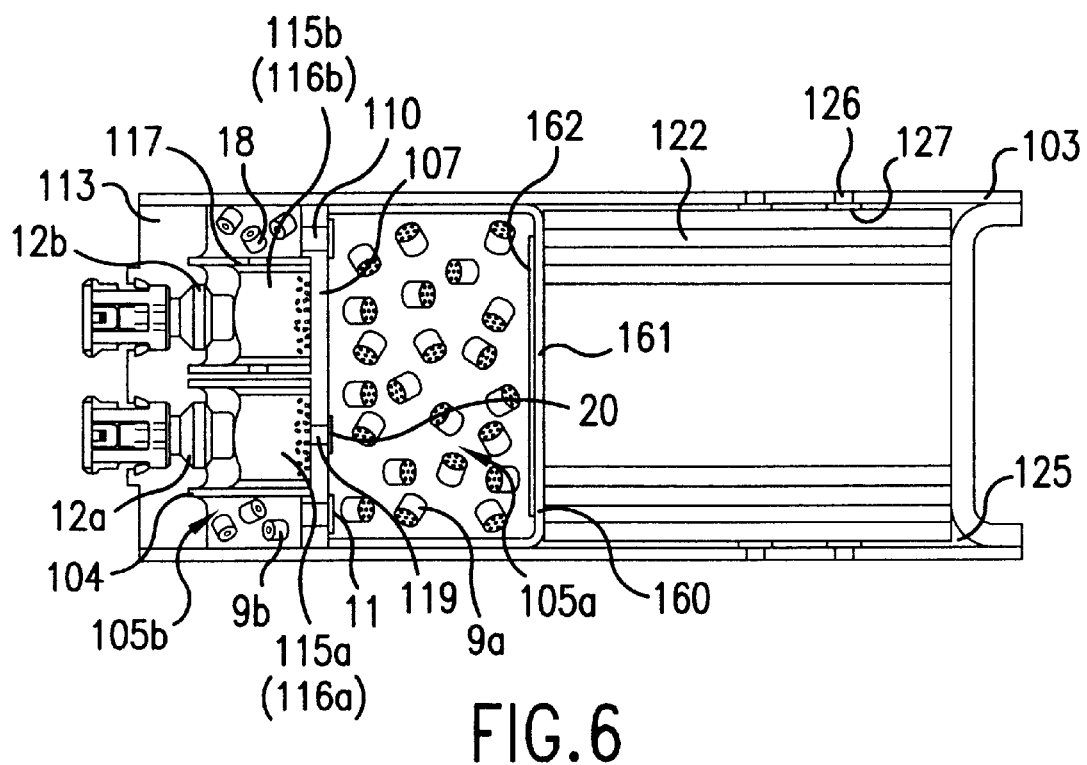
FIG. 6 is a vertical cross sectional view which shows the other embodiment of a gas generator for an air bag according to the present invention.

FIG. 6 is a vertical cross sectional view which shows another embodiment of a gas generator for an air bag according to the present invention. This gas generator is structured to be particularly suitable for being arranged in passenger side.

The gas generator shown in FIG. 6 has a cylindricalhousing 103, having an axial core length longer than an outermost diameter and having a plurality of gas discharge ports on a peripheral wall thereof. The gas generator also has ignition means actuated upon an impact, gas generating agents (9a, 9b) ignited and burnt by the ignition means and generate a combustion gas for inflating an air bag, and a coolant/filter 122 for cooling and/or purifying the combustion gas generated by the combustion of the gas generating agents. Two combustion chambers (105a, 105b), provided in the housing 103, are formed into a cylindrical combustion chamber 105a and an annular combustion chamber 105b, respectively, and concentrically provided so as to be adjacent to each other with respect to an axial direction of the housing 103. A communicating hole 110, which allows communication between the combustion chambers 105a and 105b, is provided.

The gas generator of the present embodiment is formed in a shape longer in the axial direction since the housing is formed in a long cylindrical shape in the axial direction. The gas generator formed in this shape can be a gas generator having a simple structure and easily manufactured while the output of the gas generator and the timing for increasing the output can be optionally adjusted by arranging two combustion chambers 105a and 105b in a combination of the cylindrical combustion chamber 105a and the annular combustion chamber 105b, as mentioned above, concentrically providing them so as to be adjacent to each other, and making both the combustion chambers communicate with each other.

The ignition means comprises two or more igniters activated upon an impact, and the respective igniters (12a, 12b) are provided in a single initiator collar 113 so as to be parallel to each other. Thereby, an assembly thereof can be easily performed. Further, the igniters (12a, 12b), fixed in the single initiator collar 113 and stored in the housing, are arranged eccentrically with respect to an axis of the housing.

Further, a coolant/filter 122, formed in a substantially cylindrical shape, is arranged in the housing 103 so as to oppose to a housing inner peripheral surface on which a plurality of gas discharge ports 126 are formed, and a predetermined gap 125 is obtained between the filter 122 and inner periphery of the housing 103. The first combustion chamber 105a is defined adjacent to a space in which the coolant/filter 122 is installed, and the ignition means including two igniters (12a, 12b) is concentrically arranged so as to be adjacent to the first combustion chamber 105a. Since the annular second combustion chamber 105b is defined in the radial direction of the ignition means, the first combustion chamber 105a and the second combustion chamber 105b are provided adjacent to each other in the axial direction of the housing 103. The different gas generating agents (9a, 9b) are respectively charged in the first and second combustion chambers. In the gas generator shown in FIG. 6, a porous cylindrical first gas generating agent 9a and a single-hole cylindrical second gas generating agent 9b are stored in the first combustion chamber 105a and the second combustion chamber 105b, respectively.

The above ignition means comprises transfer charges, which are ignited and burnt according to the activation of the igniters (12a, 12b) and ignites the gas generating agents (105a, 105b) by the flame thereof, and the transfer charges are partitioned for each igniter and independently ignited and burnt by each of the igniters. A space, where the transfer charge partitioned for each igniter is stored, is defined by a cylindrical member, a first transfer charge accommodating chamber 115a, where a first transfer charge 116a is stored communicates with the first combustion chamber 105a by a flame-transferring hole 119 provided in a partition wall 107 arranged between the ignition means and the first combustion chamber 105a., and a second transfer charge accommodating chamber 115b, where a second transfer charge 116b is stored communicates with the second combustion chamber 105b by a flame-transferring hole 117 formed on the cylinder member 104 which defines the accommodating chamber 115b. Then, the first combustion chamber 105a and the second combustion chamber 105b can communicate with each other by the through hole 110 when a seal tape 11 is ruptured due to the combustion of the gas generating agent 9b.

In the gas generator shown in FIG. 6, when the first igniter 12a is activated, the transfer charge 116a in the first transfer charge accommodating chamber 115a is ignited and burnt, and the flame thereof passes through the flame-transferring hole 119 in the partition wall member 107 and ignites and burns the gas generating agent 9a stored in the first combustion chamber 105a to generate combustion gas. This combustion gas is purified and cooled while passing through the coolant/filter 122 and is then discharged from the gas discharge port 126. On the other hand, when the second igniter 12b is actuated, the transfer charge 116b in the second transfer charge accommodating chamber. 115b is ignited and burnt, and the flame thereof ignites and burns the gas generating agent 9b in the second combustion chamber 105b. The combustion gas generated in the second combustion chamber 105b flows into the first combustion chamber 105a through the through hole 110 in the partition wall 107, purified and cooled while passing through the coolant/filter 122, and then, discharged from the gas discharge port 126. The combustion gas generated by the combustion of the first gas generating agent and the combustion gas generated by the combustion of the second combustion gas are both purified and cooled while passing through the same coolant/filter 122. Also in the present embodiment, the gas discharge port 126 is closed by a seal tape 127. This seal tape 127, which aims to protect the gas generating agent from a moisture in the atmosphere outside the gas generator, is ruptured by the combustion gas generated due to the combustion of the gas generating agent so as to discharge the combustion gas. Accordingly, the seal tape 127 does not control the combustion performance (the combustion internal pressure) of the gas generating agent. Further, the flame-transferring hole 119 and the flame-transferring hole 117 are closed by the seal tape 20 and the seal tape 18, respectively.

Further, a communicating hole 161 for communicating both chambers is provided in a sectioning member 160 which partitions the first combustion chamber 105b and the space where the coolant/filter 122 is installed. The combustion gas generated in the first and second combustion chambers (105a, 105b) reaches the space containing the coolant/filter 122 through the communicating hole 161. According to this embodiment, the communicating hole 161 having substantially the same size as an inner diameter of the coolant/filter 122 is formed in the sectioning member 160. Then, a wire mesh 162 is placed in the communicating hole 161 so that the gas generating agent 9a in the first combustion chamber 105a does not move into the space where the coolant/filter 122 is installed, at a time of the combustion. Any kinds of wire mesh can be used for this wire mesh 162 as long as it has a mesh size that can prevent the first gas generating agent 9a from moving during combustion and does not have a draft resistance large enough to control the combustion performance.

As mentioned above, also in the gas generator according to this embodiment, the gas generating agents (9a, 9b) stored in the respective combustion chambers (105a, 105b) are independently ignited and burnt by adjusting the activation timing of two igniters (12a, 12b), so that an output performance (the actuation performance) of the gas generator can be optionally adjusted. Consequently, in various circumstances such as the speed of the vehicle at the time of collision and an environmental temperature, it is possible to make it most suitable to inflate the air bag in the case of using an air bag apparatus mentioned below.

Figure 7:
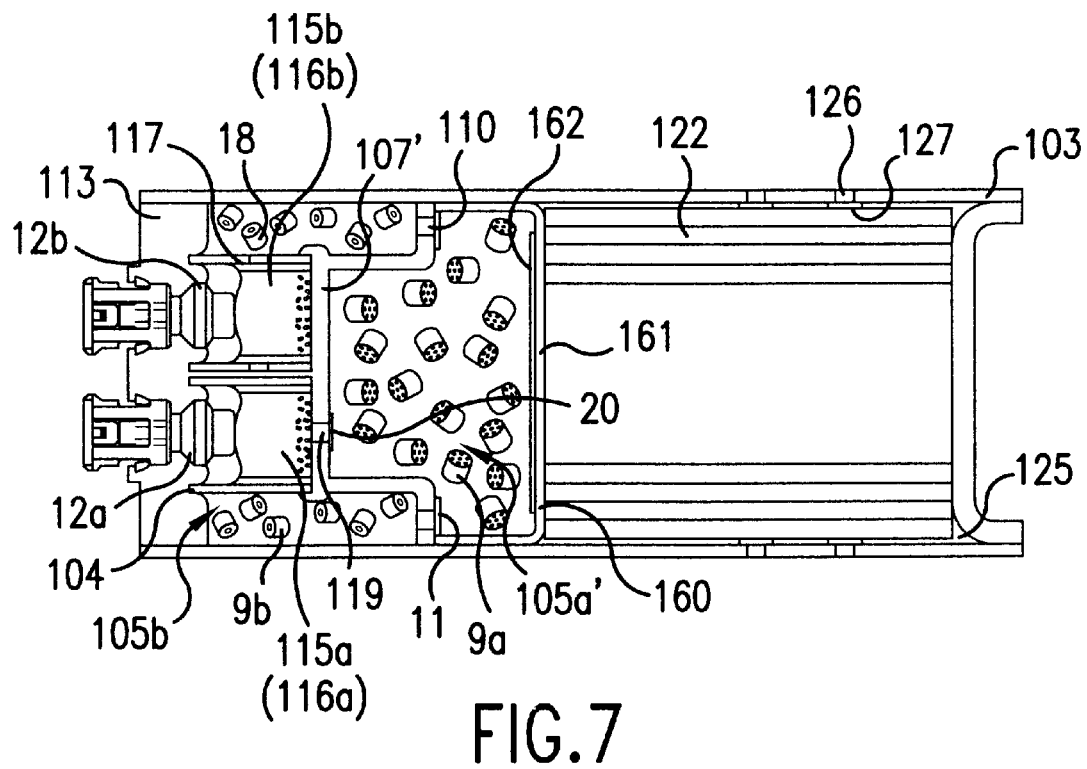
FIG. 7 is a vertical cross sectional view which shows further the other embodiment of a gas generator for an air bag according to the present invention.
Figure 8:
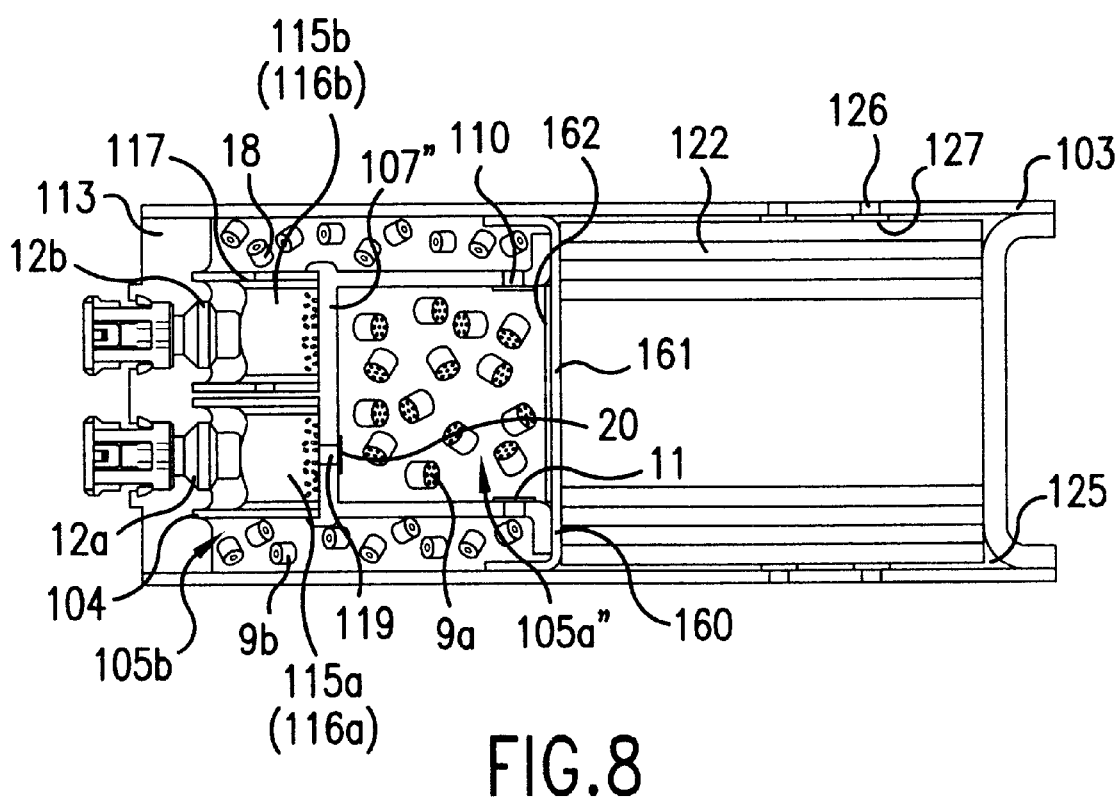
FIG. 8 is a vertical cross sectional view which shows further the other embodiment of a gas generator for an air bag according to the present invention.

In relation to the embodiment shown in FIG. 6, two combustion chambers provided in the housing can be provided so as to be adjacent to each other in the axial direction and the radial direction of the housing, as shown in FIG. 7. Concretely, in the gas generator shown in FIG. 7, a second combustion chamber 105b' is extended in the axial direction of the housing by bending the partition wall 107' which defines a first combustion chamber 105a' and ignition means and a second combustion chamber 105b' in the axial direction, and thereafter forming a end thereof into a flange shape and placing it in contact with an inner periphery of the housing. As a result, in the gas generator shown in FIG. 7, the second combustion chamber is extended in the axial direction, that is, extended to the first combustion chamber side, whereby the first combustion chamber and the second combustion chamber are adjacent to each other in the axial direction and the radial direction of the housing. Further, in this embodiment, in the case where a peripheral wall is provided with the partition wall 107" such that a flange shaped end of the partition wall extends to be in contact with the sectioning member 160, as shown in FIG. 8, a first combustion chamber 105a" and a second combustion chamber 105b" are adjacent to each other in the radial direction of the housing and concentrically provided. Consequently, the volume of the second combustion chamber can be increased to a degree not less than that of the gas generator shown in FIG. 7. Particularly, since the gas generators shown in FIGS. 7 and 8 can increase the volume of the second combustion chamber, they are convenient in the case of using a lot of second gas generating agent. Further, naturally, also in the gas generators shown in FIGS. 7 and 8, in the same manner as the above gas generator shown in FIG. 6, there can be obtained a gas generator for an air bag which can optionally adjust the output performance (the actuation performance) of the gas generator while it has a simple and compact structure. In the gas generators shown in FIGS. 7 and 8, the same reference numerals are used for the same elements shown in FIG. 6, and a description thereof has been omitted.

Embodiment 4

Figure 9:
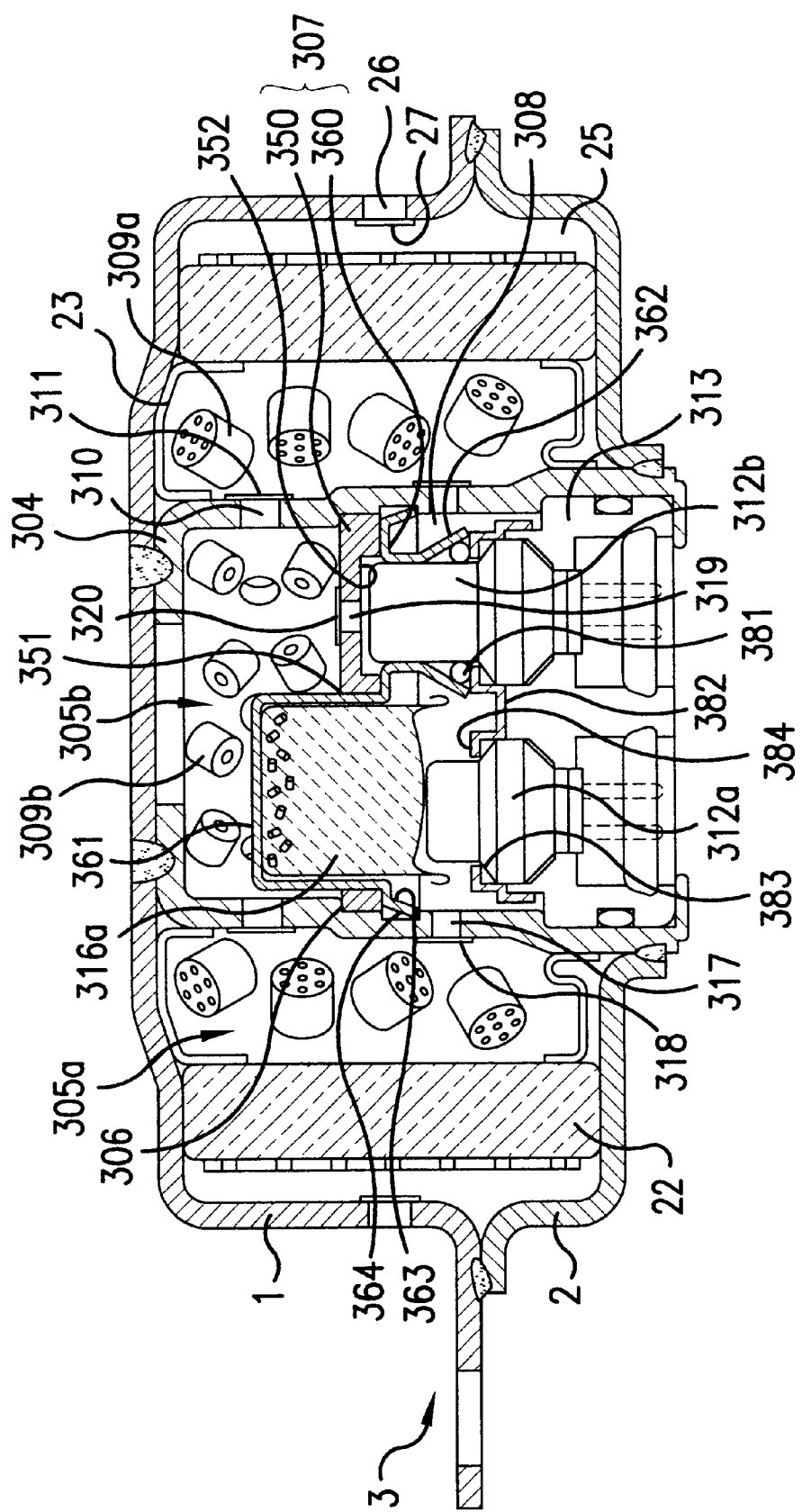
FIG. 9 is a vertical cross sectional view which shows further the other embodiment of a gas generator for an air bag according to the present invention.

FIG. 9 is a vertical cross sectional view which shows another embodiment of a gas generator for an air bag according to the present invention. The gas generator shown in this drawing is structured to be particularly suitable for arranging in a driver side in the same manner as to that of the gas generator shown in FIGS. 1 and 4.

Figure 10:
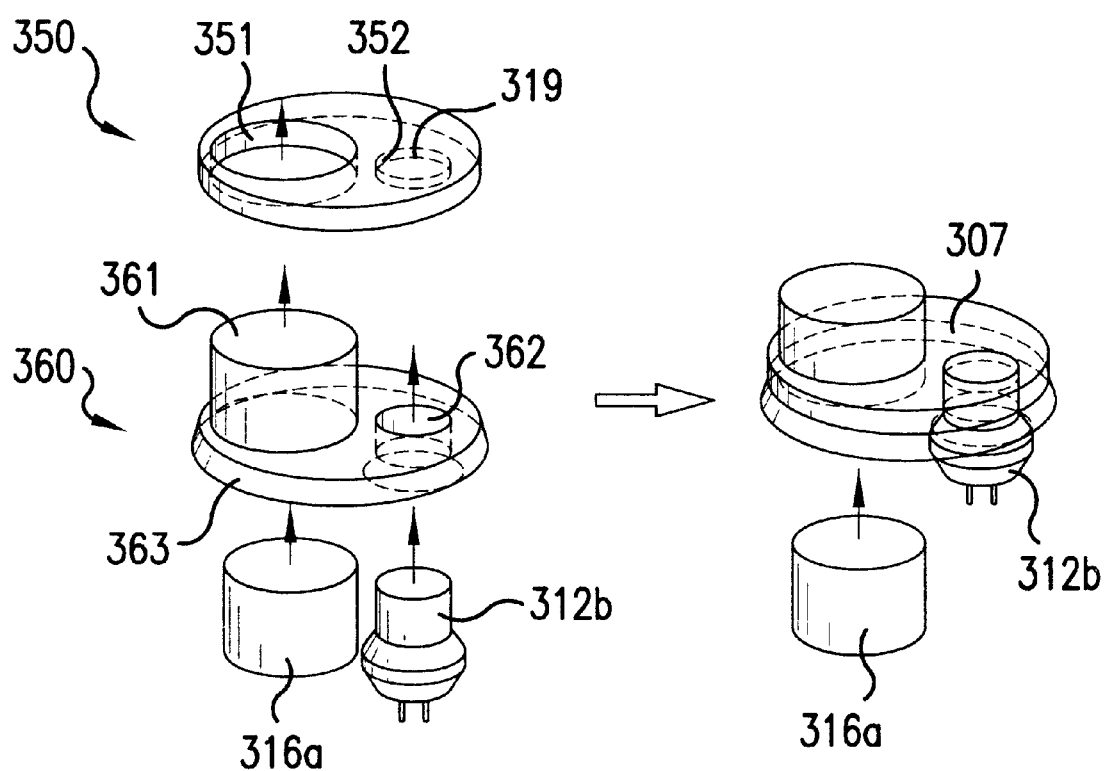
FIG. 10 is an exploded perspective view of a main portion which shows a partition wall.

Also in the gas generator shown in this drawing, a first combustion chamber 305a and a second combustion chamber 305b are partitioned by an inner cylindrical member 304, and provided in the housing 3 to be concentrically adjacent to each other. A stepped notch portion 306 is provided in an inner peripheral surface of the inner cylindrical member 304 at a predetermined height, and a partition wall 307, which defines the second combustion chamber 305b and an ignition means accommodating chamber 308, is arranged in the stepped notch portion 306. In this embodiment, the partition wall 307 is, as shown in an exploded perspective view in FIG. 10, constituted by a sectioning circular member 350 engaged with the stepped notch portion 306 formed in the inner cylindrical member 304 and a seal cup member 360 engaged with the sectioning circular member 350. The sectioning circular member 350 is formed in a substantially flat circular shape, and has an opening portion 351, to which a transfer charge accommodating portion 361 of a seal cup member 360 mentioned below is attached, a circular hole portion 352, obtained by scraping out a bottom surface in a circular shape and storing an upper portion of an igniter 312b, and a second flame-transferring hole 319, extending and pierced through a substantially center of the circular hole portion 352. Further, the seal cup member 360 has a cylindrical transfer charge accommodating portion 361 fitted into the opening portion 351 of the sectioning circular member 350, and protrudes into the second combustion chamber 305b, and a cylindrical igniter receiving port 362, formed at a position opposing to the circular hole portion 352 of the sectioning circular member 350 and extending to a side opposite to the transfer charge accommodating portion 361. A first transfer charge 316a is stored inside the transfer charge accommodating portion 361, and a second igniter 312b is inwardly fitted to the igniter receiving port 362. The sectioning circular member 350 and the seal cup member 360 are engaged with each other by fitting the transfer charge accommodating portion 361 of the seal cup member 360 into the opening portion 351 of the sectioning circular member 350, and an upper portion of the second igniter 312b inwardly fitted to the igniter receiving port 362 exposes into the circular hole portion 352 of the sectioning circular member 350.

The partition wall 307, constituted by the sectioning circular member 350 and the seal cup member 360, is, as shown in FIG. 9, engaged with the stepped notch portion 306 formed on the inner peripheral surface of the inner cylindrical member 304. That is, the peripheral edge of the sectioning circular member 350 is supported by the stepped notch portion 306, and the seal cup member 360 is supported in contact by the sectioning circular member 350. Further, the peripheral edge of the seal cup member 360 is formed by being in the same direction as that of the igniter receiving port 362, and a bent portion 363 is fitted into a groove 364 provided on the inner peripheral surface of the inner cylindrical member 304. Accordingly, the sectioning circular member 350 is supported by the seal cup member 360 and is prevented from moving in the axial direction of the housing 3. Further, the partition wall 307 (i.e. the seal cup member 360) and the inner cylindrical member 304 are engaged with each other with no gap by fitting the bent portion 363 in the peripheral edge of the seal cup member 360 into the groove 364 on the inner peripheral surface of the inner cylindrical member 304. Accordingly, in the inner cylindrical member 304, the ignition means accommodating chamber 308, provided in the closure shell side 2 and the second combustion chamber 305b provided in the diffuser shell side 1, are securely partitioned by an ignition means sealing structure comprising the combination of the seal cup member 360 and the groove 364.

The igniter receiving port 362, formed in the seal cup member 360, is structured such that a skirt portion thereof spreads like a fan, and an O-ring 381 is arranged in an inner side thereof, that is, between the seal cup member 360 and the second igniter 312b stored in the storing port 362. The O-ring 381 seals the space between the receiving port 362 and the second igniter 312b. Since the O-ring 381 is also in press-contact with an igniter fixing member 382 mentioned below, the second igniter 312b is arranged in a space defined by the circular hole portion 352 of the sectioning circular member, the igniter receiving port 362 of the seal cup member, the O-ring 381, and the igniter fixing member 382. When the seal tape 320, closing the second flame-transferring hole 319 formed in the circular hole portion 352 of the sectioning circular member 350, is ruptured by the activation of the second igniter 312b, the inner portion of the defined space communicates with the second combustion chamber 305b. Then, the first igniter 312a and the second igniter 312b are securely separated by a seal structure comprising the skirt portion of the igniter receiving port 362, the O-ring 381, and the igniter fixing member 382 (hereinafter, referred as "an igniter seal structure"). Accordingly, the flame generated by the activation of any igniter does not directly flow into the space where the other igniter is stored.

Further, in the present embodiment, two igniters 312a and 312b are fixed to a single initiator collar 313 in order to secure an easiness for arranging in the housing. Particularly, in the present embodiment, two igniters 312a and 312b are supported by the igniter fixing member 382 engaged with the initiator collar 313, and are fixed to the initiator collar 313. The igniter fixing member 382 is formed in a shape that covers an upper surface of the initiator collar 313, and has a hole portion 384 passing through the upper portion of each igniter and supporting a shoulder portion 383. Two igniters 312a and 312b, arranged in the initiator collar 313, are fixed to the igniter fixing member 382 outwardly fitted to the initiator collar 313. By using the above igniter fixing member 382, two igniters 312a and 312b can be easily assembled to the initiator collar 313. In the gas generator shown in this embodiment, the first igniter 312a and the second igniter 312b are formed in different sizes, and the outputs thereof are different. However, igniters having the same output may be used.

In actuation of the gas generator shown in the present embodiment, the flame generated due to the activation of the first igniter 312a ignites and burns the first transfer charge 316a as arranged above. The flame generated by the combustion of the first transfer charge 316a neither flows into the space where the second igniter 312b is stored, due to the igniter seal structure, nor flows into the second combustion chamber 305b due to the ignition means seal structure constituted by the bent portion 363 of the seal cup member 360 and the groove 364 of the inner cylindrical member 304. Accordingly, the flame generated by the combustion of the first transfer charge 316a exclusively flows into the first combustion chamber 305a through the first flame-transferring hole 317 formed on the peripheral wall of the inner cylindrical member 304, and ignites and burns a first gas generating agent 309a so as to generate the combustion gas. The flame generated by the activation of the second igniter 312b exclusively flows into the second combustion chamber 305b through the second flame-transferring hole 319 formed on the circular hole portion 352 of the sectioning circular member 350, and ignites and burns a second gas generating agent 309b so as to generate the combustion gas. Particularly, in the gas generator according to this embodiment, the second transfer charge is not arranged and the second gas generating agent 309a is directly ignited and burnt by the flame generated by the activation of the second igniter 312b.

Then, the combustion gas generated by the combustion of the first gas generating agent 309a and the second gas generating agent 309b is thereafter purified and cooled while passing through the common coolant/filter 22, passes through the gap 25 and is discharged from the gas discharge port 26. The seal tapes 318 and 320 for closing the first and second flame-transferring holes are ruptured when the flame of the igniter and the combustion gas of the transfer charge pass therethrough, and the seal tape 27 for closing the gas discharge port 26 is ruptured when the combustion gas passes therethrough.

Figure 11A:
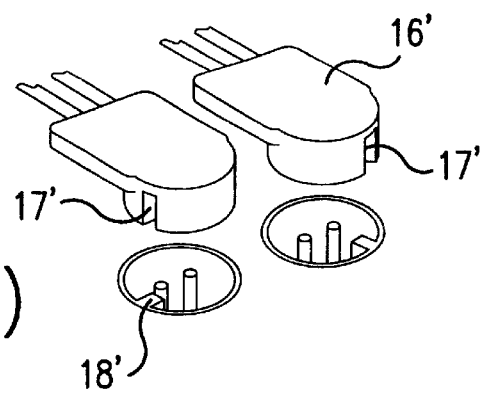
FIG. 11 is an exploded perspective view of a main portion which shows positioning means.
Figure 11B:
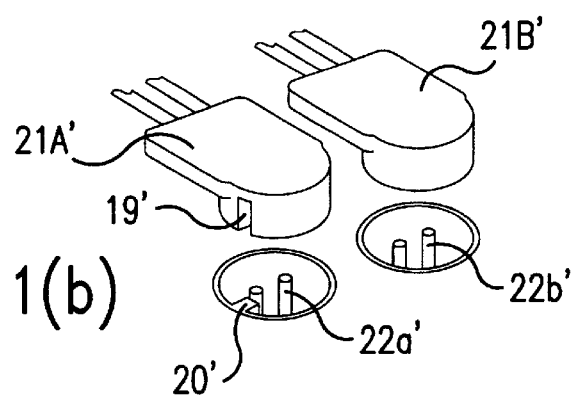
Figure 11C:
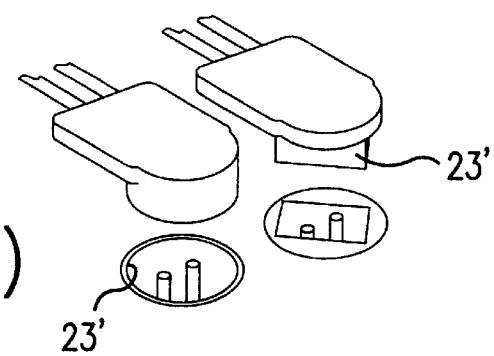
Figure 11D:
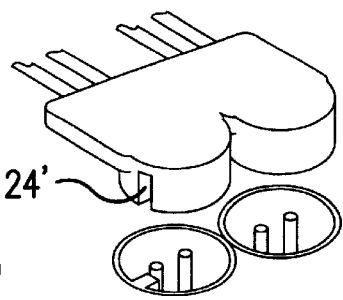

As mentioned above, in the case of adjusting the ignition timing of the gas generating agents 309a and 309b, that is, the actuation performance of the gas generator by staggering the activation timing of the respective igniters 312a and 312b, positioning means is formed in a portion where the igniters 312a and 312b are arranged, so that a lead wire 15' connected to each igniter is specified. This kind of positioning means can be achieved by using a different type of connector 16' for each igniter, for example, as shown in a main portion exploded perspective view in FIGS. 11a to 11d. In the positioning means shown in FIG. 11a, the structure is made such that a positioning groove (or projection) 17' is formed in a connector and a forming position of a projection (or groove) 18' corresponding to the positioning groove (or projection) 17' is different at each igniter. Namely, the position of the groove (or projection) 17' of each connector is changed so that the connector can not be mounted regularly being interfered with each other if the connector 16' is not mounted in a normal direction when mounting the connector 16' to the gas generator. In the positioning means shown in FIG. 11b, a positioning groove (or projection) 19' is provided only in one connector 21'. Namely, a connector 21A' provided with the groove (or projection) 19' can be engaged with an igniter 22' in a side that a projection (or groove) 20' is not provided. However, a connector 21B', provided with no groove (or projection) 19', can not be engaged with an igniter 22a' in a side that the projection (or groove) 20' is provided. As a result, an error on connecting the connector 21' can be easily found at the time of assembling. In FIG. 11c, a shape of a connecting and engaging portion 23' in each connector is different from each other. Still, in FIG. 11d, two connectors are joined to one and a positioning groove (or projection) 24' is further formed. As this positioning means, in addition, it is possible to suitably use means for preventing the connectors from being erroneously connected.

Figure 12:
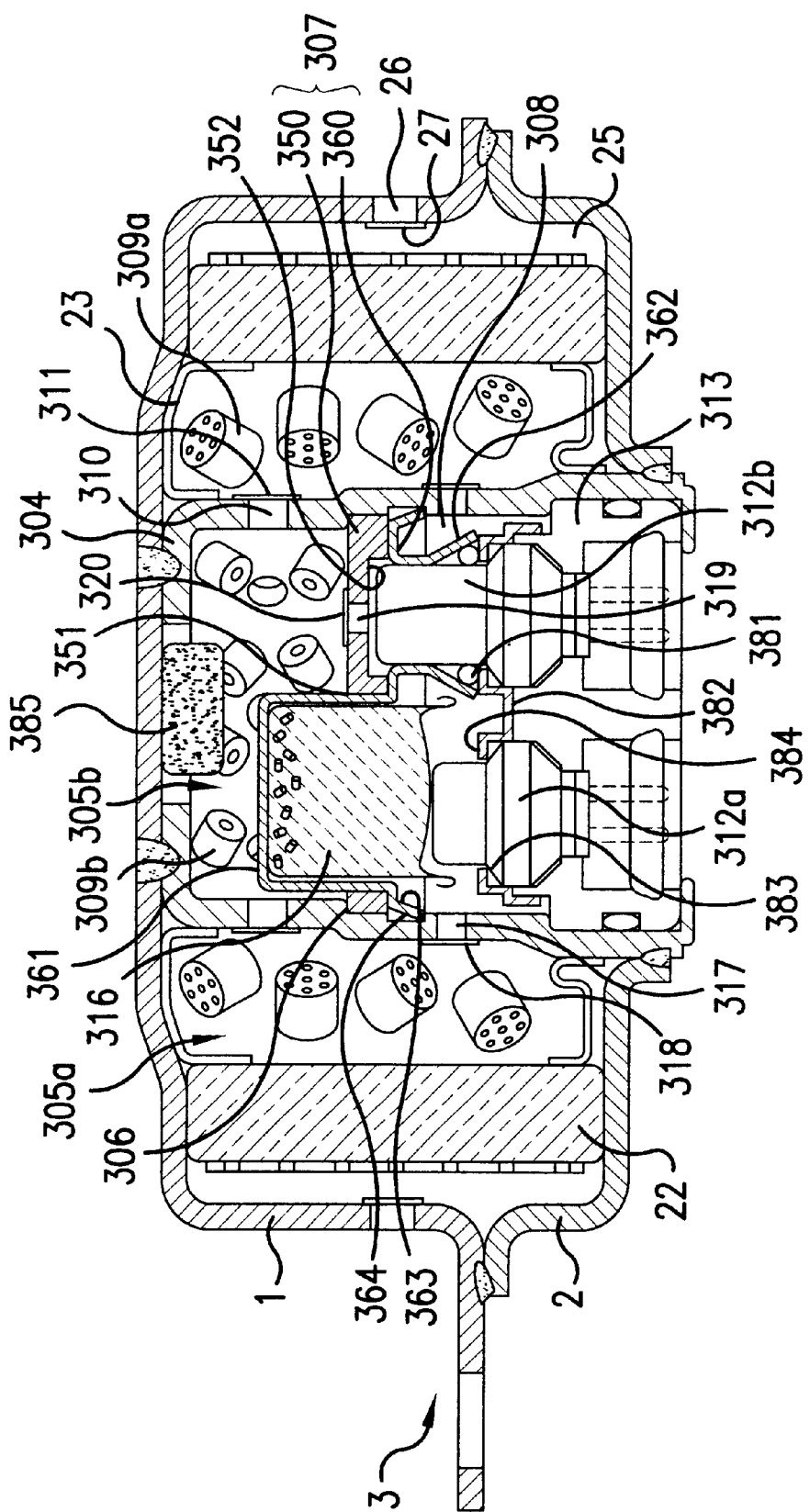
FIG. 12 is a vertical cross sectional view which shows further the other embodiment of a gas generator for an air bag according to the present invention.

Also in the gas generator shown in this embodiment, the first gas generating agent 309a and the second gas generating agent 309b are independently ignited and burnt due to the activation of the first igniter 312a and the second igniter 312b, respectively. However, there is a case where only the first igniter 312a is energized so as to be ignited, thereby igniting and burning only the gas generating agent 309a in the first combustion chamber 305a. Namely, this corresponds to a case where the second gas generating agent 309b and the second igniter 312b are not burnt but remained. In this case, since an inconvenience is caused at the time of the later process, disposal and the like, it is preferable to burn the gas generating agent 309b in the second combustion chamber 305b at a further delayed timing (for example, 100 milliseconds or more, or the like) in comparison with a normal delayed ignition timing (for example, 10 to 40 milliseconds, or the like) for activating the second igniter 312b, after the actuation of the gas generator (only the first igniter 312a). Then, as shown in FIG. 12, an automatic igniting material 385, which is to be ignited and burnt due to a transmission of a combustion heat of the first gas generating agent 309a, can be provided in the second combustion chamber 305b. In this case, the ignition of the second gas generating agent 309b by the automatic igniting material 385 is performed after a sufficient time more than the normal predetermined delayed time in the case of activating the second igniter 312b has passed (i.e. an interval between activation of each igniter) after the activation of the first igniter 312a. That is, this is different from the matter of delaying the combustion of the second gas generating agent 309b (i.e., delaying the activation of the second igniter 312b) for the purpose of adjusting the actuation performance of the gas generator. The second gas generating agent 309b is not ignited and burnt by the automatic igniting agent 385 while optionally delaying the activation current to the second igniter 312b to adjust the actuation performance of the gas generator. In this case, the automatic igniting material 385 may be arranged in combination with the second igniter.

Figure 13:
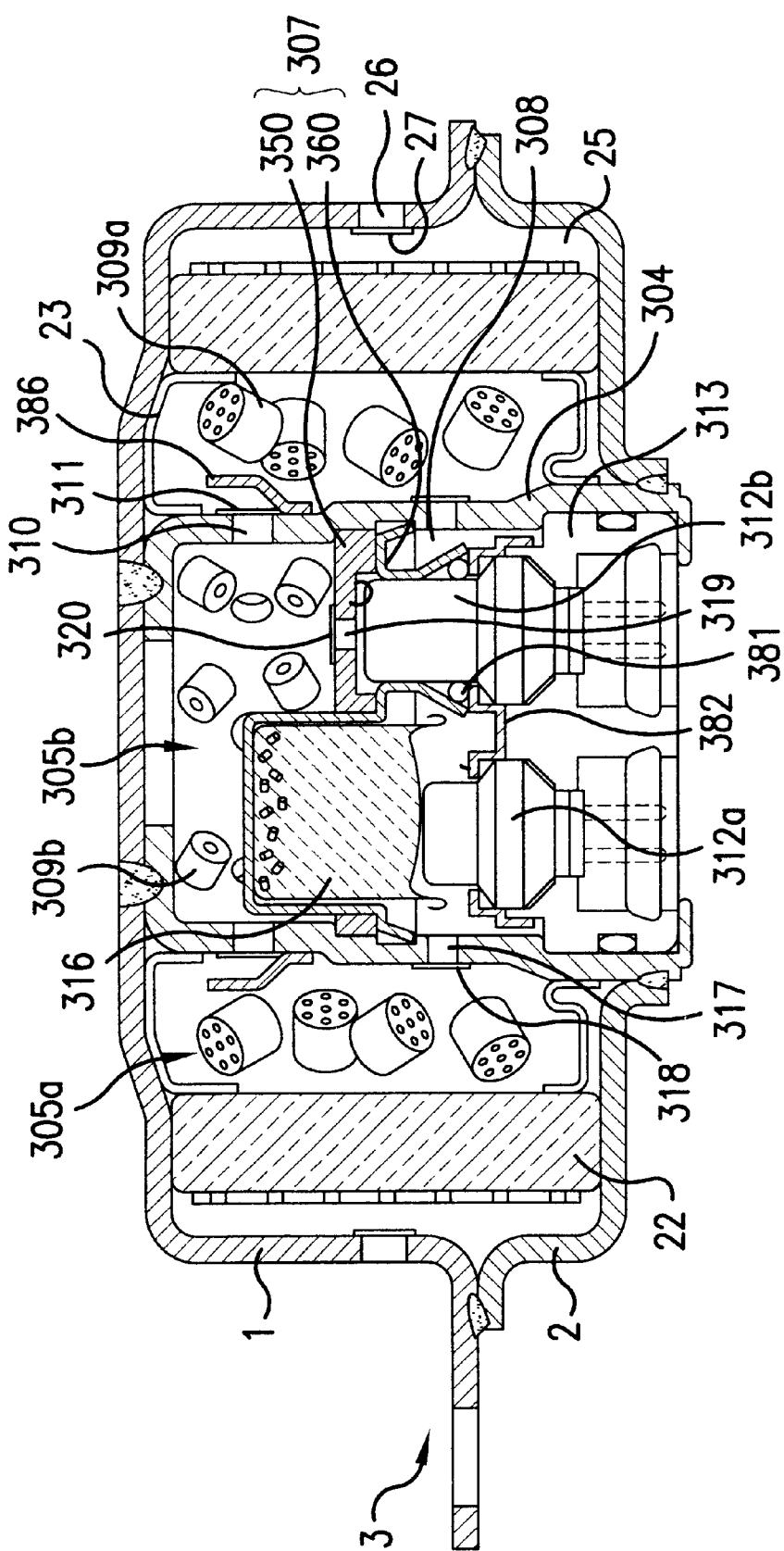
FIG. 13 is a vertical cross sectional view which shows further the other embodiment of a gas generator for an air bag according to the present invention.

The first combustion chamber 305a and the second combustion chamber 305b are defined by the inner cylindrical member 304. A through hole 310 is provided in this inner cylindrical member 304, and the through hole 310 is closed by a stainless plate 311. The stainless plate 311 is bonded to the inner cylindrical member 304 by an adhesive member such as an adhesive material, opens the through hole 310 exclusively by the combustion of the second gas generating agent 309b, but does not open by the combustion of the first gas generating agent 309a. The through hole 310 is closed by the stainless plate 311 in this manner because the flame of the first gas generating agent 309a is prevented from flowing into the second combustion chamber 305b through the through hole 310 so as to burn the second gas generating agent 309b. Accordingly, as long as this function can be secured, in addition to the structure of closing the through hole by the stainless plate 311, the above can be realized by welding, bonding or heat-sealing a rupturing plate which is to be broken, peeled, burnt out or taken out due to a pressure generated by the combustion of the second gas generating agent, to the inner cylindrical member so as to close the through hole 310, or by providing a notch on a peripheral wall of the inner cylindrical member 304, or by forming the peripheral wall of the inner cylindrical member 304 so as to partly have a thin thickness. Further, as shown in FIG. 13, a shielding plate 386 formed in a substantially ring shape may be arranged so as to cover the through hole 310 provided in the inner cylindrical member 304. Particularly, in the aspect of the gas generator shown in FIG. 13, the seal tape closing the through hole 310 is protected by the shielding plate 386 even when the combustion gas is generated by the combustion of the first gas generating agent 309a, and therefore, the seal tape is not broken by the combustion of the first gas generating agent 309a. As mentioned above, also in the present embodiment, the through hole 310 of the inner cylindrical member 304 is exclusively opened only by the combustion of the second gas generating agent 309b but is not opened by the combustion of the first gas generating agent 309a. Accordingly, the combustion gas firstly generated in the first combustion chamber 305a does not flow into the second combustion chamber 305b and the gas generating agent 309b in the second combustion chamber 305b is ignited and burnt by the activation of the second igniter 312b (in some cases, the combustion of the automatic igniting material 385). The combustion gas generated by the combustion of the second gas generating agent 309b passes inside the first combustion chamber 305a through the through hole 310 opened by the combustion thereof, and, thereafter, is purified and cooled by the coolant/filter 22 so as to be discharged from the gas discharge port 26. In FIGS. 9 to 13, the same reference numerals are used to the same elements as those in FIG. 1 and a description thereof has been omitted.

Embodiment 5

Figure 14:
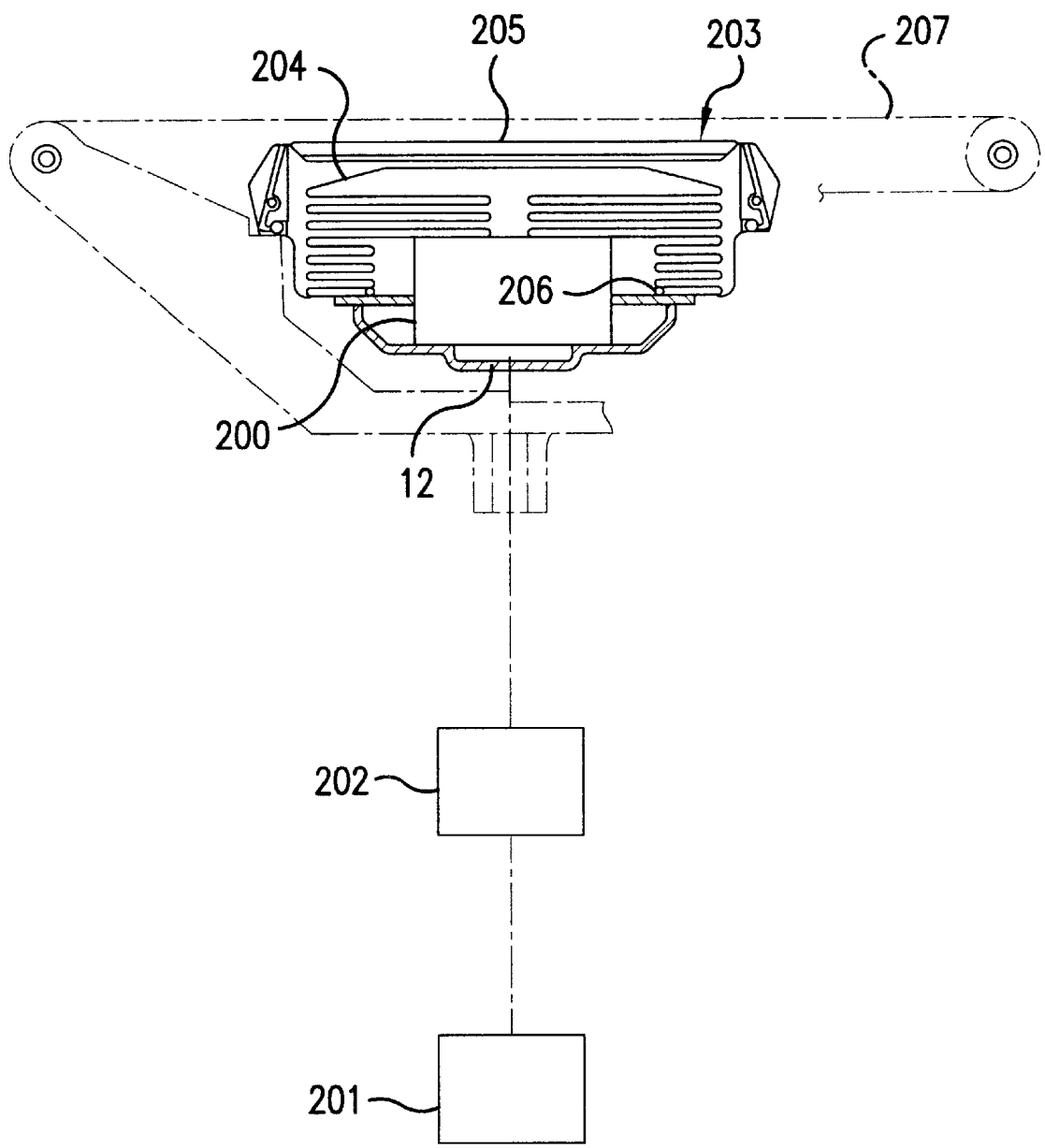
FIG. 14 is a schematic view of an air bag apparatus according to the present invention.

FIG. 14 shows an embodiment of an air bag apparatus according to the present invention which comprises the electric ignition type ignition means.

The air bag apparatus comprises a gas generator 200, an impact sensor 201, a control unit 202, a module case 203, and an air bag 204. As for the gas generator 200, the gas generator described with reference to FIG. 1 is used and the actuation performance thereof is adjusted so as to apply small an impact as possible to the occupant at the initial stage of the actuation of the gas generator.

The impact sensor 201 can be, for example, constituted by a semiconductor type acceleration sensor. This semiconductor type acceleration sensor is structured such that four semiconductor strain gauges are formed on a silicone base plate which is bent when the acceleration is applied, and these semiconductor strain gauges are bridge-connected. When the acceleration is applied, the beam defects and a strain is produced on the surface. Due to the strain, a resistance of the semiconductor strain gauge is changed, and the resistance change is detected as a voltage signal in proportion to the acceleration.

The control unit 202 is provided with an ignition decision circuit, and the signals from the semiconductor type acceleration sensor is inputted to the ignition decision circuit. The control unit 202 starts calculation at a time when the impact signal from the sensor 201 exceeds a certain value, and when the calculated result exceeds a certain value, it outputs an activating signal to the igniter 12 of the gas generator 200. The control unit 202 and the igniter 12 of the gas generator 200 are connected by a lead wire taken out in the same direction on the same plane via the connector connected to the igniter 12.

The module case 203 is formed, for example, of a polyurethane, and includes a module cover 205. The air bag 204 and the gas generator 200 are stored in the module case 203 so as to be constituted as a pad module. This pad module is generally mounted on a steering wheel 207 in the case of being mounted to a driver side of an automobile.

The air bag 204 is formed of a nylon (for example, a nylon 66), a polyester or the like, and a bag port 206 thereof surrounds the gas discharge port of the gas generator and is fixed to a flange portion of the gas generator in a folded state.

When the semiconductor type acceleration sensor 201 detects an impact at a time of a collision of an automobile, a he signal is transmitted to the control unit 202, and the control unit 202 starts calculation at a time when the impact signal from the sensor exceeds a certain value. When the calculated result exceeds a certain value, it outputs the activating signal to the igniter 12 of the gas generator 200. Accordingly, the igniter 12 is activated so as to ignite the gas generating agent, and the gas generating agent burns and generates the gas. The gas is discharged into the air bag 204, whereby the air bag breaks the module cover 205 to inflate, thereby forming a cushion for absorbing an impact between the steering wheel 207 and the occupant.

A description will be given below of embodiments of a gas generator including two or more combustion chambers, two igniters, two different gas generating means, an igniter having a lead wire, a combustion chamber and ignition means in an inner cylindrical member, and an automatic igniting material.

Embodiment 6

In the embodiment 1 mentioned above, the porous cylindrical first gas generating agent 9a having seven holes may be stored in the first combustion chamber 5a, and the single-hole cylindrical second gas generating agent 9b may be stored in the second combustion chamber 5b. As the single-hole cylindrical gas generating agent, for example, the agent having an inner diameter of 0.5 to 1.5 mm, preferably 0.8 mm, an outer diameter of 2 to 3 mm, preferably 2.4 mm, and a length of 2 to 6 mm, preferably 4 mm is used. Further, as the seven-hole cylindrical gas generating agent, for example, the agent having an inner diameter of 0.6 to 0.7 mm, an outer diameter of 5 to 5.3 mm, and a length of 5 mm is used. As mentioned above, by respectively storing the gas generating agents having different shapes and different burning rates in each combustion chamber, it is possible to also change a generating pattern of the combustion gas after the gas generating agents stored in the respective chambers start combustion. An adjustment of the generating pattern of the combustion gas, after the respective gas generating agents start combustion in this manner, can be additionally performed by changing the composition and the composition ratio or the amount thereof.

Figure 22:
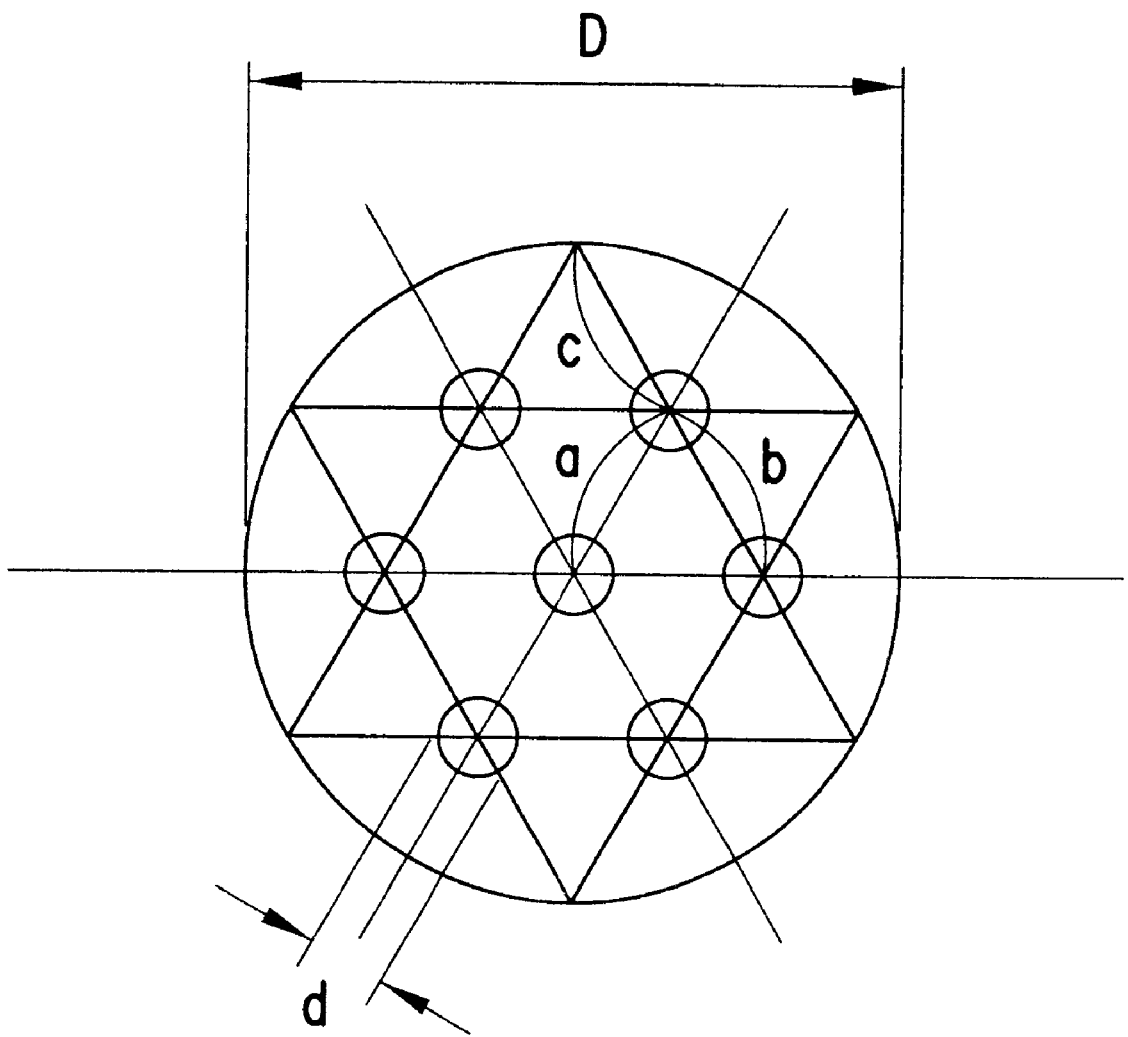
FIG. 22 is a schematic view which shows a method of measuring a thickness in a porous cylindrical gas generating agent.

As the second gas generating agent, in the gas generating agent formed in a porous cylindrical shape, a thickness thereof is specified by a method shown in FIG. 22.

Namely, as shown in FIG. 22, in the case of forming seven through holes in the cylindrical formed body having a circular cross section, a center of one hole among the through holes is arranged at a center of the circle of the formed body, and the other six holes are arranged in the periphery of the central hole. In FIG. 22, a distance (b) between the centers of respective two holes arranged in the periphery, and a distance (c) between the center of these two holes and an outer end of the formed body are respectively equal to each other, and further, a distance (a) between the center of the central hole and the center of each holes arranged in the periphery are respectively equal to each other. It is preferable that a regular triangle comprising (a), (b), and (a), and a regular triangle comprising (b), (c), and (c) become substantially the same as each other. Six regular triangles are arranged from one central hole, and a center of the peripheral six holes is arranged at an apex of the regular triangle. That is, in the gas generating agent mentioned above, the distance of (a)(b) and (a) corresponds to the thickness of the gas generating agent, more preferably, it is preferable that these thickness (i.e. (a) (b) and (a)) are equal to each other.

As the other embodiment of the formed body, the central hole can be surrounded by peripheral eighteen holes. The number of holes and the arranging structure can be made advantageous in the same manner as mentioned above. The number of the holes and the arranging structure can be determined according to a cooperation between an easiness for producing the gas generating agent, a producing cost and a performance, and is not particularly limited.

Embodiment 7

Further, in the embodiment shown in FIG. 4, the different types of gas generating agents are used in the first combustion chamber and the second combustion chamber. As mentioned above, by using the different types of gas generating agent at each combustion chamber, in the same manner as the embodiment 1, the generating pattern of the combustion gas can be changed even after the gas generating agent stored in each of the chambers starts combustion, so that a inflating pattern of the air bag can be optionally adjusted.

Embodiment 8

In FIG. 6, even in the gas generator defining two combustion chambers in the housing, when using the different types of gas generating agents in the respective combustion chambers, it is possible to change the generating pattern of the combustion gas after the gas generating agent stored in each chamber starts burning, so that a inflating pattern of the air bag optionally can be adjusted.

Embodiment 9

In FIG. 9, the different types of gas generating agents are used in two combustion chambers partitioned and formed in the housing, in the same manner as the embodiment 1. Consequently, even after the gas generating agent stored in each chamber starts burning, the generating pattern of the combustion gas can be changed and therefore, an inflating pattern of the air bag can be optionally adjusted.

Embodiment 10

Figure 15:
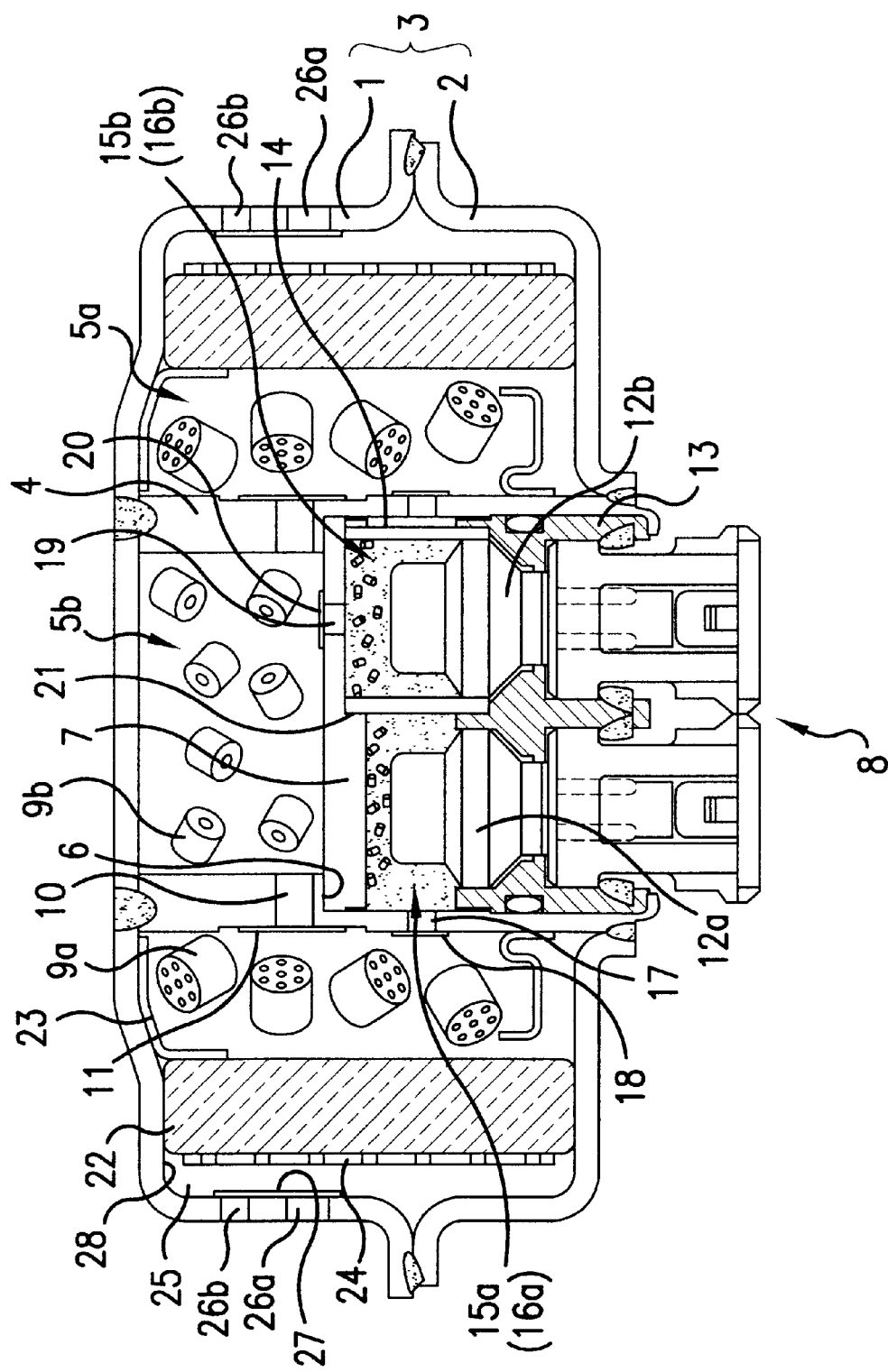
FIG. 15 is a vertical cross sectional view which shows further the other embodiment of a gas generator according to the present invention.

FIG. 15 shows a vertical cross sectional view of another embodiment of a gas generator for an air bag according to the present invention.

In particular, the gas generator for the air bag shown in this embodiment is characterized by a combination of gas discharge ports formed in the housing, and sealing means, such as a seal tape, for closing the gas discharge ports, in the gas generator shown in the embodiment 1.

The gas generator has, in a housing 3 formed by joining a diffuser shell 1, provided with a gas discharge port, and a closure shell 2 which forms an inner storing space together with the diffuser shell, and an inner cylindrical member 4 having a substantially cylindrical shape to define a first combustion chamber on the outer side thereof. Further, a stepped notch portion is provided inside the inner cylindrical member. A partition wall having a substantially flat circular shape is arranged in the stepped notch portion, and the partition wall further divides an inner portion of the inner cylinder into two chambers to form a second combustion chamber and an ignition means accommodating chamber 8 in the diffuser shell side and in the closure shell side, respectively. As a result, in this gas generator, the first combustion chamber Sa and the second combustion chamber 5b are concentrically provided in the housing 3 and arranged adjacent to each other in the radial direction of the housing. Gas generating agents (9a, 9b), which are burnt by ignition means activated upon an impact to generate combustion gas, are stored in the first and second combustion chambers, and the ignition means activated upon an impact is stored in the ignition means accommodating chamber 8.

Also in this embodiment, the different types of gas generating agents are used in the first combustion chamber and the second combustion chamber, so that the inflating pattern of the air bag can be made most suitable.

A through hole 10 is provided in the inner cylindrical member 4 which defines the first combustion chamber 5a and the second combustion chamber 5b, and the through hole is closed by a seal tape 11. Since the seal tape 11 is ruptured when the gas generating agent is burnt, both combustion chambers can communicate with each other by the through hole 10. A material and a thickness of the seal tape 11 should be adjusted so that the seal tape is ruptured only when the gas generating agent 9b in the second combustion chamber 5b is burnt. In the present embodiment, a stainless seal tape having a thickness of 40 μm is used. Further, the through hole 10 does not have a function of controlling an internal pressure in the combustion chamber 5b since an opening area thereof is made larger than a gas discharge port 26b.

The ignition means comprises two electric ignition type igniters (12a, 12b) activated by an activating signal output on the basis of detection by the sensor, and the igniters are provided in parallel to each other in a single initiator collar 13 as to expose head portions thereof. As mentioned above, two igniters become a single member by being fixed to the initiator collar 13 by providing two igniters 12a and 12b in the single initiator collar 13, and thereby can be mounted to the gas generator easily. In particular, in the gas generator shown in this embodiment, the initiator collar 13 is set to a size capable of being inserted into the inner cylindrical member 4. Accordingly the igniter can be easily and securely fixed by crimping a lower end of the inner cylindrical member 4 to fix the initiator collar after inserting the initiator collar 13 provided with two igniters (12a, 12b) into the inner cylinder 4. When arranging two igniters 12a and 12b in the initiator collar 13, the direction of each igniter can be easily restricted.

In this embodiment, a substantially cylindrical separating cylinder 14 is arranged in a space between the initiator collar 13 and the partition wall 7 to surround one igniter 12b (hereinafter, refer to as "a second igniter"), a first transfer charge accommodating chamber 15a and a second transfer charge accommodating chamber 15b are respectively defined in an outer side thereof and an inner side thereof, and the igniter and the transfer charge constituting the ignition means together with the igniters are stored in the respective accommodating chambers. As a result, transfer charges 16a and 16b, constituting the ignition means together with the igniters, are securely partitioned into the respective igniters (12a, 12b). A seal tape 18, closing a flame-transferring hole 17 formed in the inner cylindrical member 4, is ruptured when the transfer charge 16a stored in the first transfer charge accommodating chamber 15a is burnt, whereby the first transfer charge accommodating chamber 15a communicates with the first combustion chamber 5a. Further, a seal tape 20, closing a flame-transferring hole 19 formed in the partition wall 7, is ruptured when the transfer charge 16b stored in the second transfer charge accommodating chamber 15b is burnt, whereby the second transfer charge accommodating chamber 15b communicates with the second combustion chamber 5b. Accordingly, the gas generator is actuated such that a flame, when the first igniter 12a is ignited (activated), ignites and burns the transfer charge 16a stored in the accommodating chamber 15a and the flame passes through the flame-transferring hole 17 formed in the inner cylindrical member 4, and ignites and burns a gas generating agent 9a with seven holes stored in the first combustion chamber 5a positioned in the radial direction of the accommodating chamber 15a. The second igniter 12b ignites and burns the second transfer charge 16b stored in the accommodating chamber 15b and the flame thereof passes through the flame-transferring hole 19 provided in the axial direction of the accommodating chamber 15b, and ignites and burns a gas generating agent 9b with a single hole stored in the second combustion chamber 5b disposed on an extension thereof. The combustion gas generated in the second combustion chamber 9b passes through the through hole 10, provided in the diffuser shell side 1 of the inner cylindrical member 4, and flows into the first combustion chamber 5a. Particularly, in the gas generator shown in FIG. 15, the separating cylinder 14 arranged between the initiator collar and the partition wall 7 is arranged such that a hole portion 21, corresponding to an outer shape of the separating cylinder 14, is provided on the lower surface of the partition wall 7 and the upper surface of the initiator collar 13, and the upper end and the lower end of the separating cylinder 14 are fitted into the respective hole portions.

By arranging the separating cylinder 14 in this manner, a flame of the transfer charge generated in one transfer charge combustion chamber does not directly burn the transfer charge in the other transfer charge accommodating chamber, and the gas generating agents stored in two combustion chambers are respectively ignited and burnt by the flame generated by the combustion of the transfer charges in the different sections. That is, generally, when the transfer charge burns in the separating cylinder 14 (i.e. in the second transfer charge accommodating chamber), a pressure of the gas generated by the combustion serves to expand the separating cylinder in the radial direction, and, by arranging the separating cylinder, the upper and lower end portions of the separating cylinder are securely supported by the peripheral walls of the hole portions where the respective portions are fitted, so that, in comparison with the case of simply interposing the separating cylinder between the partition wall and the initiator collar, leaking of the combustion gas and the flame of the transfer charge can be more securely prevented.

Further, a coolant/filter 22 for purifying and cooling the combustion gas generated by the combustion of the gas generating agents (9a, 9b) is arranged in the housing 3. An inner peripheral surface of the coolant/filter 22 in the diffuser shell side 1 is covered with a short pass prevention member 23 so that the combustion gas does not pass between an end surface of the coolant/filter 22 and an inner surface 28 of the ceiling portion of the diffuser shell 1. An outer layer 24, for suppressing the filter 22 from outwardly expanding due to passing of the combustion gas or the like, is arranged on the outer side of the coolant/filter 22. The outer layer 24 is, for example, formed by a layered wire mesh body, and in addition, may be formed by a porous cylindrical member having a plurality of through holes on a peripheral wall surface or a belt-like restriction layer obtained by forming a belt-like member with a predetermined width in an annular shape. A gap 25 is formed on the outer side of the outer layer 24 so that the combustion gas can pass through the entire portion of the filter 22.

The gas generator according to the present invention is characterized by the structure of the gas discharge port formed in the diffuser shell 1 and/or the seal tape for closing this. Two kinds of gas discharge ports 26a and 26b, having different diameters, are provided in the peripheral wall portion of the diffuser shell of the gas generator shown in FIG. 15, and the numbers of two kinds of gas discharge ports can be made equal to each other. In this case, the diameter of the gas discharge port 26a is greater than the diameter of the gas discharge port 26b, and the numbers of the respective holes are the same and therefore, the total opening area of the gas discharge port 26a is greater than that of the gas discharge port 26b. In this embodiment, the diameter of the gas discharge port 26a is 3.0 mm$\phi$, the number of holes thereof is 10, and the diameter of the gas discharge port 26b is 2 mm$\phi$ and the number of holes thereof is 6. In order to protect the gas generating agent from the influence of the environment such as the humidity outside the housing, the seal tape 27 is adhered to the gas discharge ports 26a and 26b from the inner peripheral surface of the peripheral wall portion of the diffuser shell 1. The seal tape 27 has a width sufficient for simultaneously closing two kinds of gas discharge ports arranged in the axial direction of the gas generator. It is preferable that there is 2 to 3 mm width between the upper end or the lower end of each gas discharge port 26a and 26b, and the upper end or the lower end of the seal tape, and it is preferable to use the seal tape comprising an aluminum seal layer having a thickness of 20 $\mu$m to 200 $\mu$m and a bonding layer having a thickness of 5 to 100 $\mu$m or an adhesive layer. However, as long as the desired effect can be obtained, the kind and structure of the seal tape are not particularly limited. In the present embodiment, the seal tape, having a thickness of the aluminum layer of 50 $\mu$m and a thickness of the bonding layer or the adhesive layer of 50 $\mu$m, is used. In the present embodiment, the respective gas discharge ports 26a and 26b are arranged in the axial direction of the housing of the gas generator. However, in order to obtain the effect of the present invention, for example, the respective gas discharge ports may be alternately arranged in the peripheral wall portion of the diffuser shell in a circumferential manner. Due to the combination of the gas discharge port and the seal tape mentioned above, the pressure for breaking the seal tape is adjusted at two stages.

In this structure, at the time of actuating the gas generator, for example, when the igniter for igniting the single-hole gas generating agent in the combustion chamber 5b is actuated 30 milliseconds after actuation of the igniter for igniting the seven-hole gas generating agent in the combustion chamber 5a, the opening area (the diameter and the number of the hole) of the gas discharge port 26a is correlated with the combustion surface area of the gas generating agent in the combustion chamber 5a, and the opening area (the diameter and the number of the hole) of the gas discharge port 26b is correlated with the combustion surface area of the gas generating agent in the combustion chamber 5b. Conventionally, since a single diameter of gas discharge is used, the opening area can be only correlated with the surface area of the gas generating agent in the combustion chamber 5a or the surface area of all the gas generating agent in the combustion chambers 5a and 5b. In this case, the former is an optimum condition when the gas generating agent in the combustion chamber 5a burns. However, when the gas generating agent in the combustion chamber 5b or the combustion chambers 5a and 5b continuously burns, the combustion pressure becomes too high, so that the gas generator may have an excessive output. Further, in the latter case, when the gas generating agent only in the combustion chamber 5a firstly burns, the output becomes too gentle on the contrary, so that it is difficult to obtain a sufficient restraining performance at the beginning of inflation of the air bag.

According to the present invention, since two kinds of gas discharge ports having different opening areas are provided, as shown in the present embodiment, to correlate with the surface area of the gas generating agent in each combustion chamber, it is possible to inflate the air bag in an optimum manner regardless of the timing of the ignition of the gas generating agent. In this case, there are two kinds of opening areas in the gas discharge port. However, by further increasing the kinds and adjusting the rupturing pressure of the seal tape at multiple stages, the difference of the output performance due to the environmental temperature can be suppressed.

In the gas generator constituted in the above manner, when the first igniter 12a arranged in the ignition means accommodating chamber 8 and outside the separating cylinder 14 is actuated, the transfer charge 16a stored in the first transfer charge accommodating chamber 15a is ignited and burnt, and the flame passes through the frame-transferring hole 17 in the inner cylindrical member 4 and burns the porous cylindrical first gas generating agent 9a having seven holes stored in the first combustion chamber 5a. When the second igniter 12b, surrounded by the separating cylinder 14, is actuated, the transfer charge 16b stored in the second transfer charge accommodating chamber 15b is ignited and burnt, and the flame thereof ignites and burns the single-hole cylindrical second gas generating agent 9b stored in the second combustion chamber 5b. Consequently, it is possible to adjust the ignition timing of the igniters 12a and 12b by activating the second igniter after the activation of the first igniter or simultaneously activating the first and second igniters. Therefore, an output performance (an actuation performance) of the gas generator can be optionally adjusted, so that, under various kinds of circumstances, such as a speed of a vehicle and an environmental temperature at a time of collision, an inflation of the air bag in the below air bag apparatus can be most suitable. Particularly, in the gas generator shown in this embodiment, the gas generating agents (9a, 9b) having different shapes are used for the respective combustion chambers (5a, 5b), and the porous cylindrical first gas generating agent 9a and the single-hole cylindrical second gas generating agent 9b are respectively stored in the first combustion chamber 5a and the second combustion chamber 5b. Further, the amount of the gas generating agent stored in each combustion chamber (5a, 5b) is different, and the gas generating agents 9a and 9b at an amount of 35 g and 6 g are respectively stored in the first combustion chamber 5a and the second combustion chamber 5b. As a result, in this gas generator, the output performance can be more precisely adjusted. It is, of course, possible to suitably change the shape, composition, composition ratio, amount, and the like of the gas generating agent for obtaining a desired output performance.

According to the present invention, due to the use combination of two or more igniters and two or more kinds of gas discharge ports as mentioned above, the internal pressure at a time of operating the gas generator can be equalized and the combustion performance can be stabilized.

Figure 16:
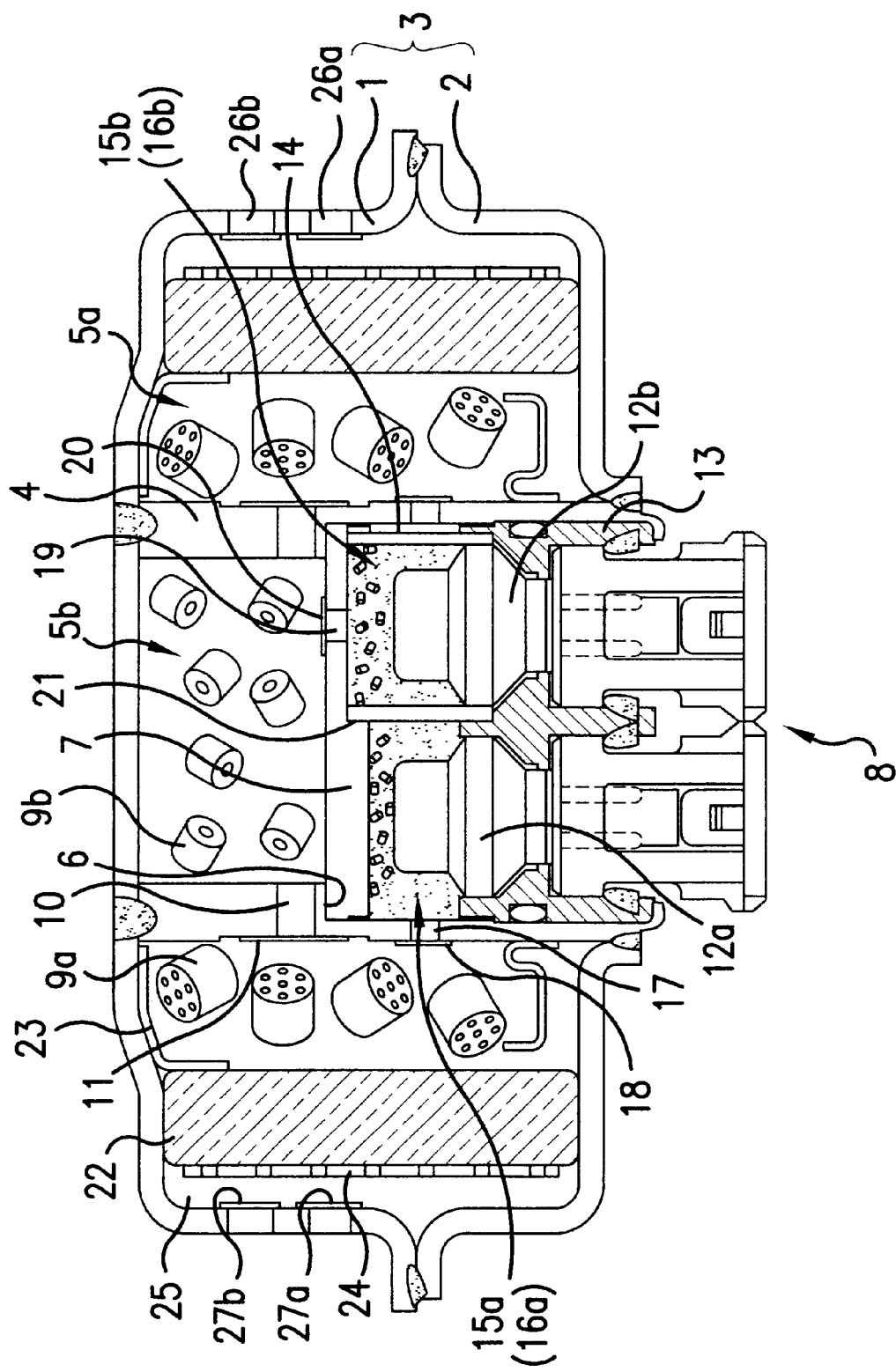
FIG. 16 is a vertical cross sectional view which shows further the other embodiment of a gas generator according to the present invention.

A gas generator shown in FIG. 16 has the same structure as that shown in FIG. 15 except for the structure of the gas discharge port provided in the diffuser shell of the housing and the seal tape closing it. The same reference numerals are used for the same elements as those shown in FIG. 15, and a description thereof has been omitted. FIG. 16 corresponds to an embodiment structured such that the opening area (the diameter and the number of the holes) of the respective gas discharge port is the same. However, the thickness of the seal tape is changed, in order to adjust the rupturing pressure of the seal tape at two stages. In this case, the gas discharge port 26a and the gas discharge port 26b are vertically arranged in the axial direction of the housing, and the thickness of the seal tape 27b for closing the gas discharge port 26b is made thicker than the thickness of the seal tape 27a for closing the gas discharge port 26a. However, the thickness of the seal tape is restricted for adjusting the output performance (the operating performance) of the gas generator, and the internal pressure of the housing, at the time of burning the gas generating agent, is adjusted by the opening area of the gas discharge port. Namely, the seal tape does not influence the maximum combustion internal pressure. The opening areas (the diameters and the numbers of the holes) of the gas discharge ports 26a and 26b are all the same. In this case, for example, the opening area of the gas discharge port 26a and the thickness of the seal tape 27a are adjusted so that the seal tape 27a for closing the gas discharge port 26a is all ruptured when the gas generating agent 9a in the combustion chamber 5a is burnt. When the gas generating agent 9b in the combustion chamber 5b subsequently burns, or when the gas generating agents 9a and 9b in the combustion chambers 5a and 5b simultaneously burn, a higher combustion internal pressure is generated. In this case, the thicker seal tape 27b is adhered to the gas discharge port 26b so that the seal tapes 27a and 27b for covering all the gas discharge ports 26a and 26b are ruptured. That is, since the seal tape 27a on the gas discharge port 26a is adjusted to a thickness which is ruptured by the combustion of the gas generating agent 9a in the combustion chamber 5a, the seal tape 27b on the gas discharge port 26b does not need to be ruptured. Accordingly, since the surface area of the gas generating agent in the combustion chamber 5a is correlated with the opening area only of the gas discharge port 26a, the gas generating agent provides an optimum combustion. Further, thereafter, when the gas generating agent 9b in the combustion chamber 5b burns at a delayed timing, or when the gas generating agents 9a and 9b in both of the combustion chambers simultaneously burn, a higher combustion pressure is generated, so that even the seal tape 27b on the gas discharge port 26b can be ruptured, and an increase of the internal pressure can be restricted, and then, optimally inflation of the air bag without regard to the ignition timing is realized. Also in this case, as mentioned with respect to FIG. 15, a material and a structure of the seal tape, the way of arranging the gas discharge port, etc. do not correspond to a limiting element for obtaining the aimed effect, but an optional specification can be adopted. Additionally, by changing the thickness at multiple stages, a gas generator, less influenced by the environmental temperature, etc., can be obtained in the same manner.

In the two embodiments shown in FIGS. 15 and 16, only the opening area of the gas discharge port or only the thickness of the seal tape is modified in some way. However, it is possible to modify both of them.

Embodiment 11

Figure 17:
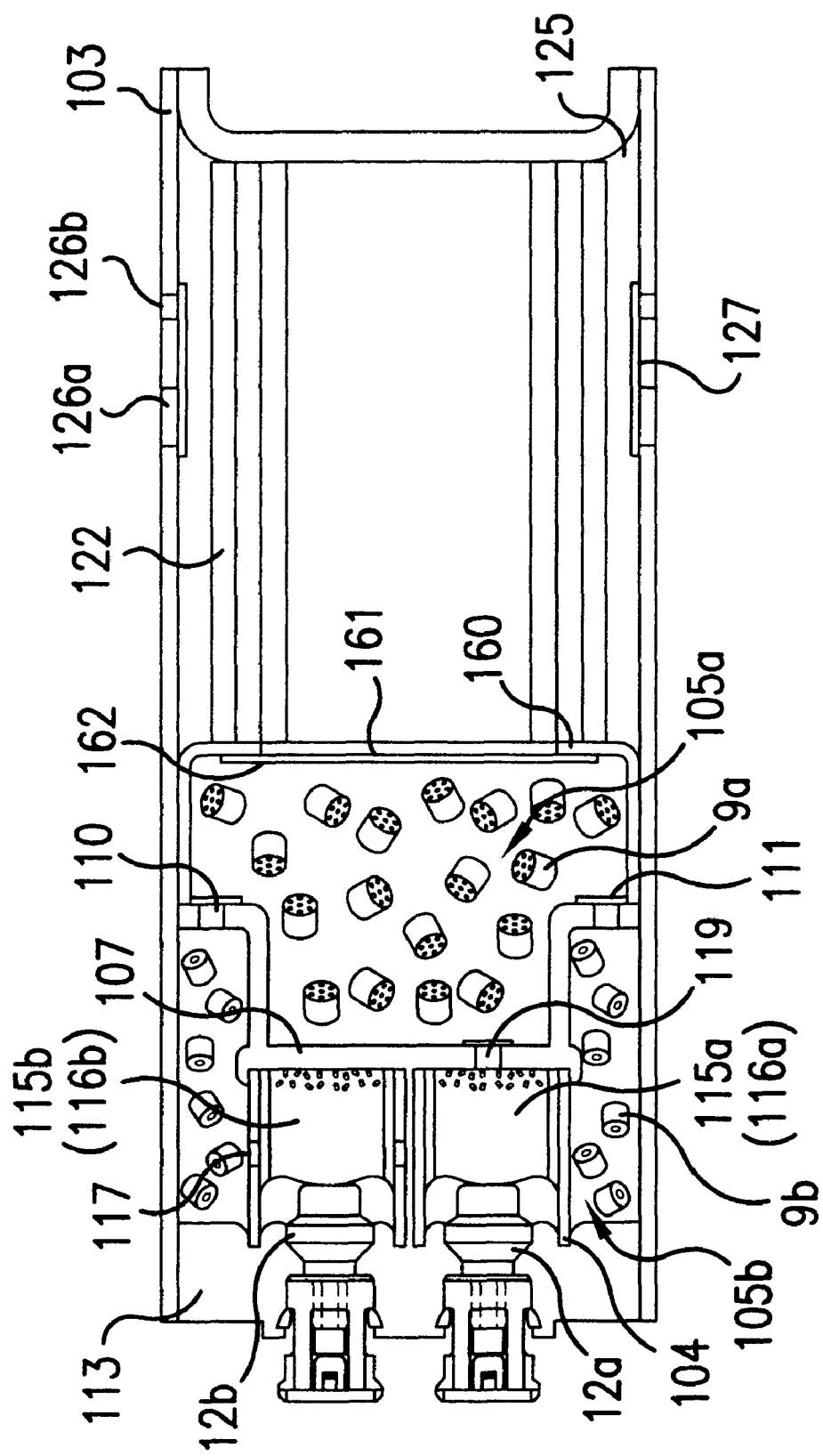
FIG. 17 is a vertical cross sectional view which shows further the other embodiment of a gas generator for an air bag according to the present invention.

FIG. 17 shows a vertical cross sectional view of another embodiment of a gas generator for an air bag according to the present invention. The gas generator is structured such as to be particularly suitable for being arranged in a passenger side of a vehicle The gas generator shown in this embodiment has, in a housing 103, provided with a plurality of gas discharge ports on a peripheral wall thereof, in a cylindrical shape having an axial core length longer than an outermost diameter, ignition means activated upon an impact, gas generating agents (9a, 9b) ignited and burnt by the ignition means and generate a combustion gas for inflating the air bag, and a coolant/filter 122 for cooling and/or purifying the combustion gas generated by the combustion of the gas generating agents. Two combustion chambers (105a, 105b) are concentrically provided in the housing 103 so as to be adjacent to each other in the axial direction of the housing 103, and a communicating hole 110, which allows communication between the combustion chambers 105a and 105b, is provided.

The gas generator, shown in the present embodiment, has a long shape in the axial direction since the housing is formed into a long cylindrical shape in the axial direction. In the gas generator formed into this shape, there can be provided a gas generator having a simple structure and easily manufactured while the output of the gas generator and the timing for increasing the output can be optionally adjusted by concentrically providing two combustion chambers 105a and 105b so as to be adjacent to each other and making both the combustion chambers communicate with each other.

Since the ignition means comprises two or more igniters activated upon an impact and the respective igniters (12a, 12b) are provided in one initiator collar 113 so as to be parallel to each other, an assembly thereof becomes easy .

Further, in the housing 103, a coolant/filter 122, formed in a substantially cylindrical shape, is arranged so as to oppose the inner peripheral surface of the housing on which a plurality of gas discharge ports 126a and 126b are formed, and a predetermined gap 125 is secured between the filter 122 and the inner periphery of the housing. The first combustion chamber 105a is defined so as to be adjacent to a space where the coolant/filter 122 is stored, and the ignition means comprising two igniters (12a, 12b) is concentrically arranged so as to be adjacent to the first combustion chamber 105a. Further, the annular second combustion chamber 105b is defined in the radial direction of the ignition means, and therefore, the first combustion chamber 105a and the second combustion chamber 105b are provided so as to be adjacent to each other in the axial direction of the housing 103. The different gas generating agents (9a, 9b) are respectively charged in the first and second combustion chambers, and in the gas generator of this embodiment, the porous cylindrical first gas generating agent 9a and the single-hole cylindrical second gas generating agent 9b are respectively stored in the first combustion chamber 105a and the second combustion chamber 105b. Accordingly, the operating performance of the gas generator can be made most suitable.

The above ignition means comprises a transfer charge ignited and burnt by activation of igniters (12a, 12b) and ignites the gas generating agents (105a, 105b) by the flame thereof, and the transfer charge is partitioned for each igniter and is independently ignited and burnt by each igniter. A space, where the transfer charge of each igniter is stored, is defined by a cylindrical member, a first transfer charge accommodating chamber 115a, where a first transfer charge 116a is stored, is communicated with the first combustion chamber 105a by a flame-transferring hole 119 on a partition wall 107 arranged between the ignition means and the first combustion chamber 105a, and a second transfer charge accommodating chamber 115b, where a second transfer charge 116b is stored, is communicated with the second combustion chamber 105b by a flame-transferring hole 117 formed on the cylinder member 104 which defines the accommodating chamber 115b. The first combustion chamber 105a and the second combustion chamber 105b are communicated with each other by the through hole 110 formed on the partition wall 107.

In the gas generator of this embodiment, when the first igniter 12a is activated, the transfer charge 116a in the first transfer charge accommodating chamber 115a is ignited and burnt, and the flame thereof passes through the flame-transferring hole 119 in the partition wall member 107 and ignites and burns the gas generating agent 9a, arranged in the first combustion chamber 105a, so as to generate the combustion gas. The combustion gas is purified and cooled while passing through the coolant/filter 122 and is discharged from a gas discharge port. On the other hand, when the second igniter 12b is activated, the transfer charge 116b in the second transfer charge accommodating chamber 115b is ignited and burnt, and the flame thereof ignites and burns the gas generating agent 9b in the second combustion chamber 105b. The combustion gas generated in the second combustion chamber 105b passes inside the first combustion chamber 105a through the through hole 110 of the partition wall 107, is purified and cooled while passing through the coolant/filter 122 and is discharged from the gas discharge port. Further, also in the gas generator of this embodiment, the through hole 110 communicating the first combustion chamber with the second combustion chamber is closed by a seal tape 111 which is exclusively ruptured by the combustion of the gas generating agent in the second combustion chamber. Besides, also in the present embodiment, in the same manner as the gas generator in FIG. 14, the gas discharge ports comprises a large diameter gas discharge port 126a and a small diameter gas discharge port 126b, and these ports are closed by a seal tape 127. Namely, in the embodiment shown in FIG. 16, it is possible to control the rupturing pressure of the seal tape by making the thickness of the seal tape constant and setting the opening area of the gas discharge port to two kinds as shown in FIG. 14, and thereby the optimum output can be always adjusted most suitably regardless of the combustion timing of the combustion chambers 105a and 105b and the gas generating agents 9a and 9b. The gas discharge port is disposed in the peripheral wall portion of the cylindrical housing, and the surface area of the gas generating agent 9a in the combustion chamber 105a is correlated with the gas discharge port 126a, and the surface area of gas generating agent 9b in the combustion chamber 105b is correlated with the opening area of the gas discharge port 126b. Since the actuation principle is the same as that of FIG. 15, a detailed description has been omitted.

Further, a communicating hole 161, communicating both chambers, is provided in a sectioning member 160, which defines the first combustion chamber 105a and the space where the coolant/filter 122 is stored. The combustion gas generated in the first and second combustion chambers (105a, 105b) reaches the storing space for the coolant/filter 122 through the communicating hole 161. According to this embodiment, a communicating hole 161, having substantially the same size as an inner diameter of the coolant/filter 122, is formed in the sectioning member 160. Then, a wire mesh 162 is placed in the communicating hole 161 so that the gas generating agent 9a in the first combustion chamber 105a does not move to a side of the space where the coolant/filter 122 is stored, at the combustion. Any kind of wire mesh can be used as this wire mesh 162 as long as it has a mesh size sufficient to prevent movement of the first gas generating agent 9a during the combustion, but does not have a draft resistance large enough to control the combustion performance.

As mentioned above, also in the gas generator according to this embodiment, the gas generating agents (9a, 9b), stored in the respective combustion chambers (105a, 105b), are independently ignited and burnt by adjusting the activation timing of two igniters (12a, 12b), so that the output performance (the actuation performance) of the gas generator can be optionally adjusted. As a result, in various circumstances such as the speed of the vehicle at a time of collision, an environmental temperature, and the like, it is possible to make it most suitable to inflate the air bag in case of an air bag apparatus mentioned below.

In FIG. 17, two combustion chambers, provided in the housing, are provided to be adjacent to each other in the axial direction and the radial direction of the housing. Concretely, in the gas generator shown in FIG. 17, a second combustion chamber 105b is extended in the axial direction of the housing by bending a first combustion chamber 105a and a partition wall 107 which defines ignition means and a second combustion chamber 105b in the axial direction, thereafter forming an end thereof into a flange shape and placing it in contact with an inner periphery of the housing. As a result, in the gas generator shown in FIG. 17, the second combustion chamber is extended in the axial direction, that is, extended to a side of the first combustion chamber, whereby the first combustion chamber and the second combustion chamber are adjacent to each other in the axial direction and the radial direction of the housing. Since the gas generators, shown in FIG. 17, can increase the volume of the second combustion chamber, they are convenient in the case of using a lot of second gas generating agents.

Figure 18:
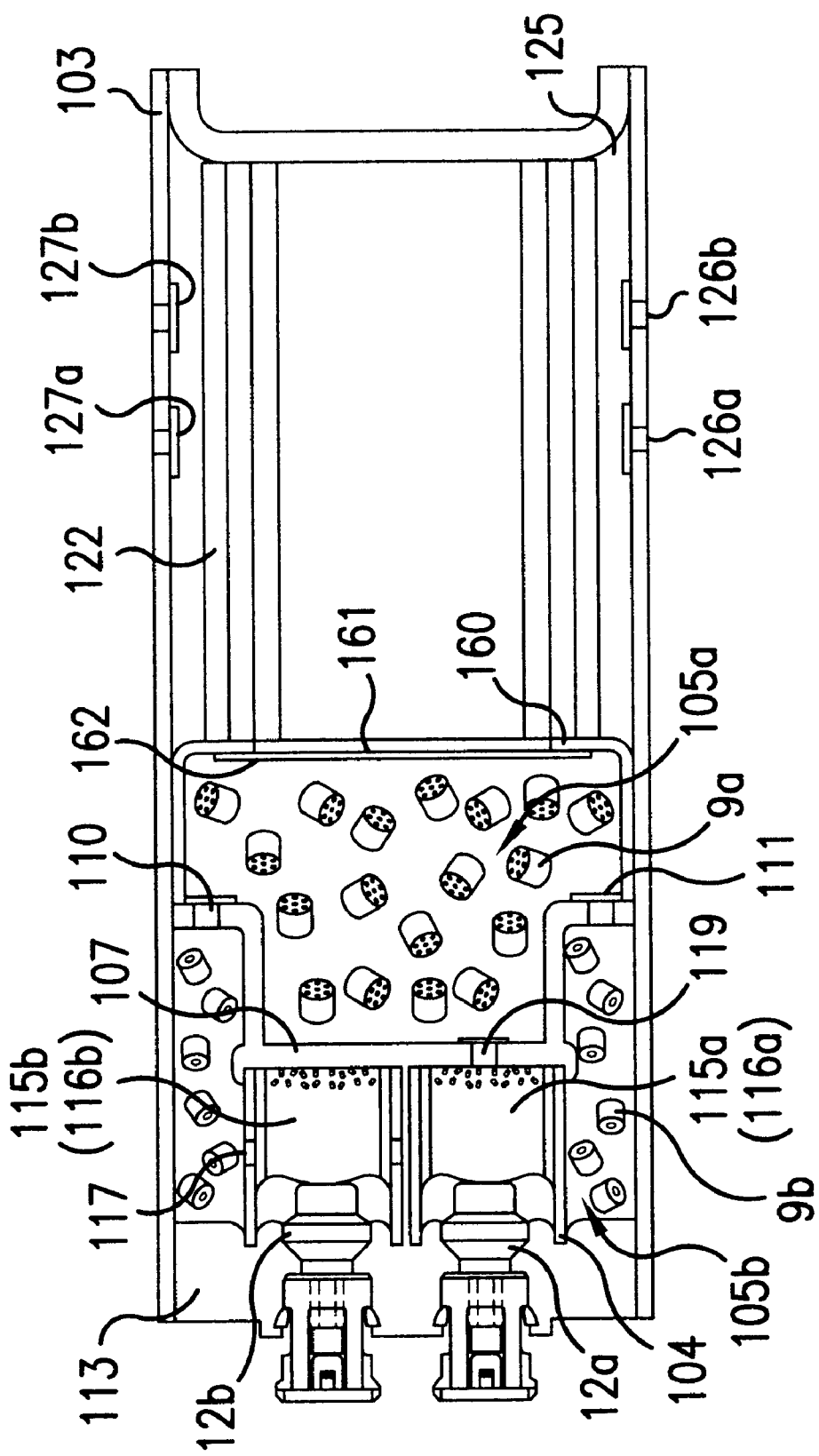
FIG. 18 is a vertical cross sectional view which shows further the other embodiment of a gas generator for an air bag according to the present invention.

FIG. 18 is a cross sectional view of a gas generator, which mainly restrains an occupant sitting in a passenger side of a vehicle in the same manner as that shown in FIG. 17, and shows an embodiment structured such as to make the opening area in each of the gas discharge ports constant, as shown in FIG. 16, but changing the thickness of the seal tape to adjust the rupturing pressure. Namely, the gas discharge port 126a and the gas discharge port 126b are vertically arranged in the axial direction of the housing, and with respect to the thickness of the seal tape 127a for closing the gas discharge port 126a, the thickness of the seal tape 127b for closing the gas discharge port 126b is made larger. The opening areas (the diameters and the numbers of the holes) of the gas discharge ports 126a and 126b are the same. In the actuation of the gas generator shown in FIG. 18, the same reference numerals are used as the same elements as those shown in FIG. 3, and a description thereof has been omitted. Since the structure and the operation of the gas discharge port and the seal tape are the same as FIG. 16, the description of the operation thereof will has been omitted.

In the case of the gas generator for restraining the occupant sitting in a passenger side of a vehicle, as shown in FIGS. 17 and 18, in the same manner, it is possible to perform more particular adjustments to avoid being influenced by the ambient temperature and the like by further increasing the kind of the opening of the gas discharge port and further increasing the kind of the thickness of the seal tape. Naturally, the opening area in the discharge port and the thickness of the seal tape may be simultaneously combined.

Embodiment 12

Figure 19:
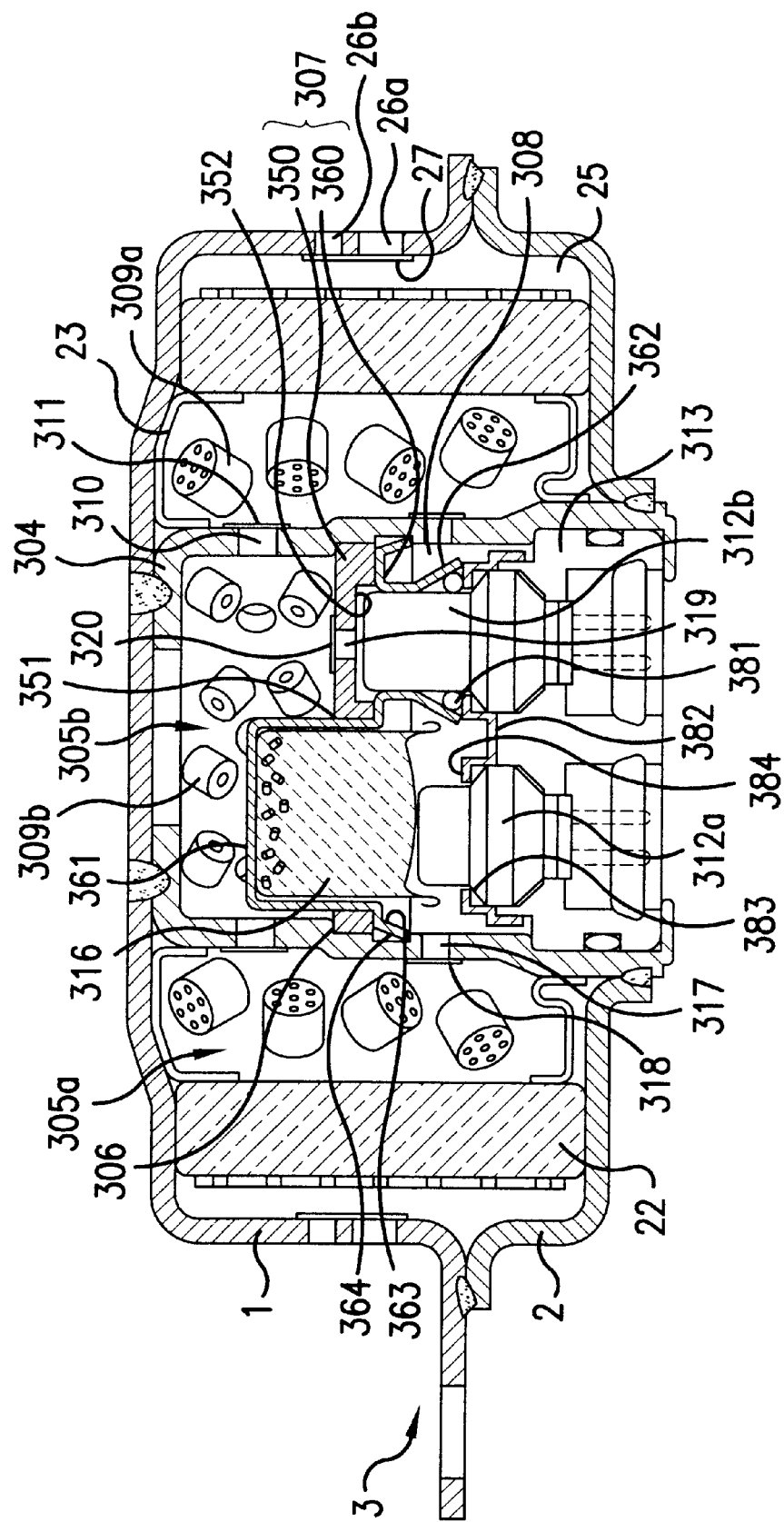
FIG. 19 is a vertical cross sectional view which shows further the other embodiment of a gas generator according to the present invention.

FIG. 19 is a vertical cross sectional view of a gas generator for an air bag according to another embodiment of the present invention. The gas generator shown in this embodiment also has a structure particularly suitable for a driver side of a vehicle in the same manner as that of the gas generator shown in FIGS. 15 and 16.

The gas generator shown in FIG. 19 has the same structure as that shown in FIG. 15 except for the structure of the partition wall which partitions the inner portion of the inner cylindrical member into the second combustion chamber and the ignition means accommodating chamber, and accordingly, the same reference numerals are used for the same elements as those in FIG. 15 and a description thereof has been omitted.

Particularly, the gas generator shown in this embodiment is structured such that a substantially flat circular partition wall 307, which defines the inner side of the inner cylindrical member into the second combustion chamber, and the ignition means accommodating chamber comprises, as shown in an exploded perspective view in FIG. 2 mentioned above, a sectioning circular member 350 engaged with the stepped notch portion 306 of the inner cylindrical member 304 and a seal cup member 360 engaged with the sectioning circular member 350.

The partition wall 307, comprising the sectioning circular member 350 and the seal cup member 360, are, as shown in FIG. 19, engaged with the stepped notch portion 306 formed on the inner peripheral surface of the inner cylindrical member 304. That is, the peripheral edge of the sectioning circular member 350 is supported by the stepped notch portion 306, and the seal cup member 360 is supported in contact with the sectioning circular member 350. Further, the peripheral edge of the seal cup member 360 is formed by being bent in the same direction as that of the igniter receiving port 362, and the bent portion 363 is fitted into a groove 364 provided on the inner peripheral surface of the inner cylindrical member 304. Accordingly, the sectioning circular member 350 is supported by the seal cup member 360 and is prevented from moving in the axial direction of the housing 3. Further, the partition wall 307 (i.e. the seal cup member 360) and the inner cylindrical member 304 are engaged with each other without a gap by fitting the bent portion 363 in the peripheral edge of the seal cup member 360 into the groove 364 on the inner peripheral surface of the inner cylindrical member 304. Consequently, in the inner cylindrical member 304, the ignition means accommodating chamber 308, provided in the closure shell side 2 and the second combustion chamber 305b provided in the diffuser shell side 1, are securely partitioned by an ignition means sealing structure comprising a combination of the seal cup member 360 and the groove 364.

The igniter receiving port 362 formed in the seal cup member 360 is structured such that a skirt portion thereof spreads like a fan, and an O-ring 381 is arranged in an inner side thereof, that is, between this and the second igniter 312b stored in the storing port 362, and sealing between the storing port 362 and the second igniter 312b is performed. Since the O-ring 381 is also press-contacted to an igniter fixing member 382 which fixes two igniters (312a, 312b) to a single initiator collar 313, the second igniter 312b is arranged in a space defined by the circular hole portion 352 of the sectioning circular member, the igniter receiving port 362 of the seal cup member, the O-ring 381, and the igniter fixing member 382. When the seal tape 320, closing the second flame-transferring hole 319 formed in the circular hole portion 352 of the sectioning circular member 350, is ruptured by activation of the second igniter 312b, the inner portion of the defined space communicates with the second combustion chamber 305b. The first igniter 312a and the second igniter 312b are securely separated by a seal structure comprising the skirt portion of the igniter receiving port 362, the O-ring 381, and the igniter fixing member 382 (hereinafter, refer to as "an igniter seal structure"). Accordingly, the flame generated by the activation of one igniter does not directly flow into the space where the other igniter is stored. The igniter fixing member 382 is formed in a shape which covers the upper surface of the initiator collar 313, and has a hole portion 384 passing through the upper portion of each igniter and supporting a shoulder portion 383. Two igniters 312a and 312b, arranged in the initiator collar 313, are fixed to the igniter fixing member 382 outwardly fitted to the initiator collar 313. By using the above igniter fixing member 382, two igniters 312a and 312b are easily assembled to the initiator collar 313. Besides, in the gas generator shown in this embodiment, the first igniter 312a and the second igniter 312b are formed in different sizes and have the different outputs. However, the igniters having the same output may be used.

Also in the gas generator shown in this embodiment, in the same manner as the gas generator shown in FIG. 15, a plurality of gas discharge ports 26a and 26b, formed in the housing, are adjusted to have two or more opening diameters and/or opening areas. Therefore, a difference of the housing maximum internal pressure can be suppressed at the activation of each ignition means, and the internal pressure at the actuation of the gas generator is equalized, which provides a gas generator for an air bag having a stable combustion performance. Also in the gas generator according to this embodiment, in the same manner as the gas generator shown in FIG. 16, the difference of the housing maximum internal pressure can be suppressed at the activation of each ignition means by making the opening area of each of the gas discharge ports constant and changing the thickness of the sealing means such as the seal tape 27 to adjust the rupturing pressure. Further, naturally, a control of the opening diameter and/or the opening area of the gas discharge port as well as a control of the thickness of the sealing means can be also performed at the same time.

Embodiment 13

Figure 20C:
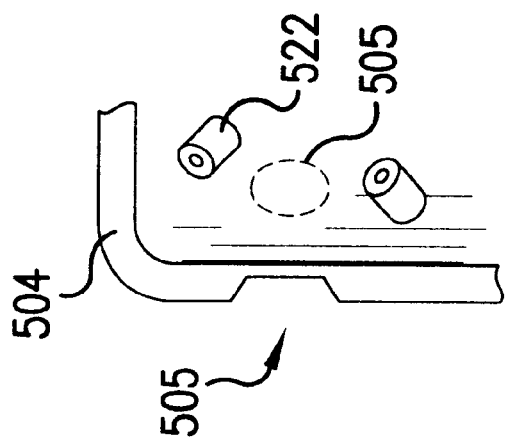
FIG. 20 is a cross sectional view of a main portion which shows an opening portion.
Figure 20B:
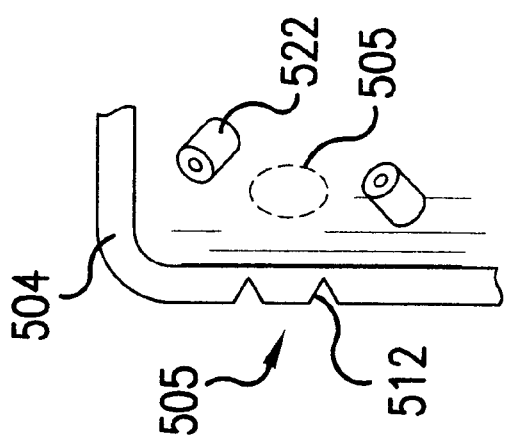
Figure 20A:
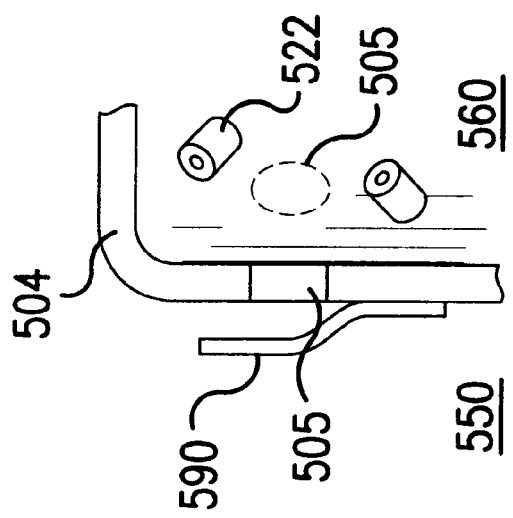
Figure 21:
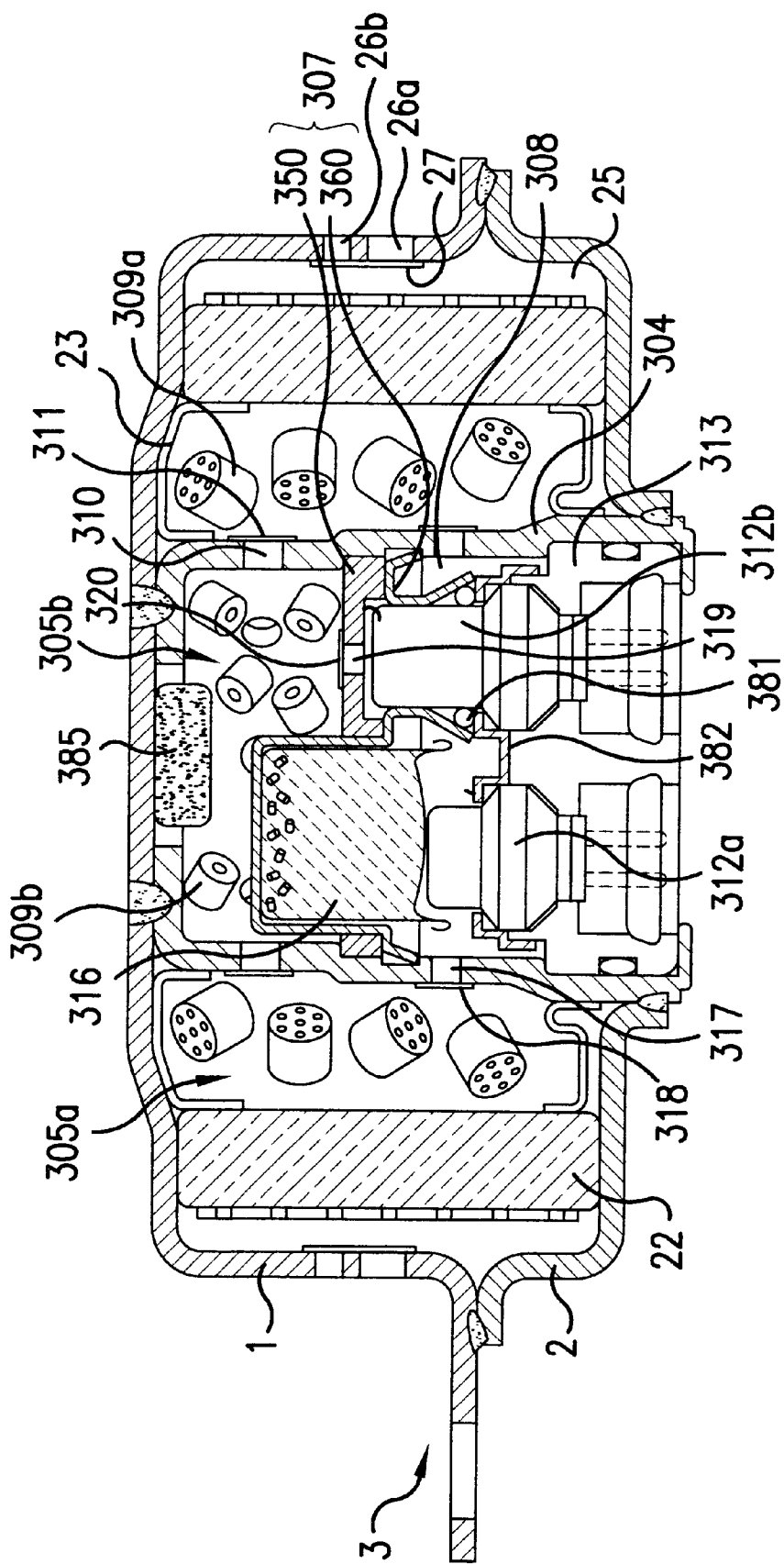
FIG. 21 is a vertical cross sectional view showing an embodiment in which an automatic ignition material is arranged.

In the gas generator for the air bag shown in embodiments 10 to 12 mentioned above, it is possible to additionally provide optional structures as shown in FIGS. 20 and 21.

Embodiment with Respect to a Through Hole of Combustion Chambers

FIG. 20 shows another embodiment of an opening portion, which is opened by the combustion of the second gas generating agent to communicate the first combustion chamber with the second combustion chamber.

That is, FIG. 20a shows an aspect structured such that an opening portion 505, formed on a partition wall 504 (including an inner shell) which defines a first combustion chamber 550 and a second combustion chamber 560, is covered from an outer side, with a suitably formed shutting plate 590 obtained, for example, by forming a belt-like member into an annular shape, and thereby a combustion flame of the first gas generating agent is not directly contacted. Reference numeral 522 denotes a second gas generating agent. FIG. 20b shows an aspect structured such as to form a notch 512 on a peripheral wall of the partition wall 504 to form the opening portion 505. Further, FIG. 20c shows an aspect structured such that a thickness of the peripheral wall of the partition wall 504 is made partly thin to form the opening portion 505.

Accordingly, in the gas generator shown in the above embodiments 10 to 12, the opening portion, which communicates the first combustion chamber with the second combustion chamber, may be formed in the aspect shown in FIG. 20 to communicate the first combustion chamber with the second combustion chamber.

Embodiment with Respect to Structure of Positioning an Igniter and a Cable

Also in the above embodiments 10 to 12, the positioning structure between two igniters and the cable, connected to transmit the activating signal to each igniter, can be adopted as shown in FIG. 3.

As mentioned above, in the gas generator shown in the above embodiments 10 to 12, when the positioning means, which locates the cable 15 connected to each igniter as specified, is provided, a gas generator for an air bag, which can securely perform an adjustment of the actuation of the gas generator, can be realized.

The lead wire connected to each igniter can be, as shown in FIG. 3, taken out in the same direction on the same plane. Particularly, as shown in this drawing, it is preferable to connect each lead wire via the connector and arrange the connectors on the same plane in parallel. The connectors preferably draw out each of the lead wires in a direction perpendicular to an axial direction of the housing and also in the same direction.

Embodiment with Respect to an Automatic Igniting Material (AIM)

FIG. 21 shows a gas generator for an air bag, in which an automatic igniting material (AIM) 385 ignited due to a combustion heat of the first gas generating agent 309a transmitted from the housing 1 or the like, is stored in the second combustion chamber. The gas generator, shown in this embodiment, burns, indirectly, the second gas generating agent 309b stored in the second combustion chamber 305b, due to the combustion of the first gas generating agent, which is left unburnt after the actuation of the gas generator when only the first gas generating agent 309a is burnt. This embodiment will be described with reference to the gas generator for the air bag shown in the above embodiment 12.

Also, in the gas generator for the air bag shown in the embodiment 12, the first gas generating agent 309a and the second gas generating agent 309b are generally ignited and burnt independently by the respective activation of the first igniter 312a and the second igniter 312b. Sometimes, only the first igniter is ignited by a current and only the first gas generating agent 309a in the first combustion chamber 305a is ignited and burnt. Namely, the second gas generating agent 309b and the second igniter 312b are left unburnt. Since such a case causes a disadvantage at the time of later operation, disposal, and the like, after the actuation of the gas generator (only the first igniter 312a), it is preferable to burn the gas generating agent 309b in the second combustion chamber 305b at a further delayed timing (for example, 100 milliseconds or more) than the normal delayed ignition timing (for example, 10 to 40 milliseconds) for activating the second igniter 312b. Accordingly, as shown in FIG. 21, the automatic igniting agent 385 ignited and burnt due to the conduction of the combustion heat of the first gas generating agent 309a is arranged in the second combustion chamber 305b. In this case, the ignition of the second gas generating agent 309b by the automatic igniting material 385 is performed at a further delayed time than the predetermined delayed time (that is, an activating interval between the igniters) when normally activating the second igniter 312b after the activation of the first igniter 312a. Namely, it is different from the case of delaying the combustion of the second gas generating agent 309b (i.e. delaying the activation of the second igniter 312b) for the purpose of adjusting the operating performance of the gas generator. The second gas generating agent 309b is not ignited and burnt by the automatic igniting material 385 during optionally delaying the operating current to the second igniter 312b in order to adjust the operating performance of the gas generator, either. Besides, the automatic igniting material 385 can be arranged in combination with the second igniter.

This embodiment is particularly described on the basis of the gas generator shown in the above embodiment 12. However, in the gas generator shown in the embodiments 10, 11 and 13, the automatic igniting material can also be arranged in the second combustion chamber. In this case, even when the second gas generating agent is left unburnt after the actuation of the gas generator, the second gas generating agent can be burnt due to the conduction of heat generated by the combustion of the first gas generating agent.

Embodiment 14

FIG. 14 shows an embodiment of an air bag apparatus according to the present invention in the case of constructing the air bag apparatus in such a manner as to include a gas generator using the electric ignition type ignition means.

The air bag apparatus comprises a gas generator 200, an impact sensor 201, a control unit 202, a module case 203, and an air bag 204. In the gas generator 200, the gas generator, described with reference to FIG. 1, is used and the actuation performance thereof is adjusted to apply small an impact as possible to the occupant at the initial stage of the actuation of the gas generator.

The impact sensor 201 comprises, for example, a semiconductor type acceleration sensor. This semiconductor type acceleration sensor is structured such that four semiconductor strain gauges are formed on a silicone base plate to be bent when the acceleration is applied, and these semiconductor strain gauges are bridge-connected. When the acceleration is applied, the beam defects and a strain is produced on the surface. Due to the strain, a resistance of the semiconductor strain gauge is changed, and the structure is made such that the resistance change can be detected as a voltage signal in proportion to the acceleration.

The control unit 202 is provided with an ignition decision circuit, and the structure is made such that the signals from the semiconductor type acceleration sensor is inputted to the ignition decision circuit. The control unit 202 starts calculation at a time when the impact signal from the sensor 201 exceeds a certain value, and when the calculated result exceeds a certain value, it outputs an activating signal to the igniter 12 of the gas generator 200.

The module case 203 is formed, for example, of a polyurethane, and includes a module cover 205. The air bag 204 and the gas generator 200 are stored in the module case 203 so as to be constituted as a pad module. This pad module is generally mounted on a steering wheel 207 when being mounted on a driver side of an automobile.

The air bag 204 is formed of a nylon (for example, a nylon 66), a polyester or the like, and structured such that a bag port 206 thereof surrounds the gas discharge port of the gas generator and is fixed to a flange portion of the gas generator in a folded state.

When the semiconductor type acceleration sensor 201 detects an impact at a time of a collision of an automobile, the signal is transmitted to the control unit 202, and the control unit 202 starts calculation at a time when the impact signal from the sensor exceeds a certain value. When the calculated result exceeds a certain value, it outputs the activating signal to the igniter 12 of the gas generator 200. Accordingly, the igniter 12 is activated to ignite the gas generating agent, and the gas generating agent burns and generates the gas. The gas is discharged into the air bag 204, whereby the air bag breaks the module cover 205 to inflate, thereby forming a cushion absorbing an impact between the steering wheel 207 and the occupant.

Embodiment 15

In FIG. 1, the ignition means comprises two electric ignition type igniters (12a, 12b), which are activated by an activating signal outputted on the basis of detection by the sensor, and the igniters are fixed to a single initiator collar 13 by fitting in parallel to each other so as to align in the axial direction, and mounted thereto in a state of exposing head portions thereof.

A method of mounting the igniters 12a and 12b using the initiator collar 13, mentioned above, is performed as follows. As shown in FIG. 2, at first the igniters 12a and 12b are fitted into the initiator collar 13 so as to be integrated, thereafter, the initiator collar 13 is inserted into the inner cylindrical member 4 of the gas generator. At this time, in order to separate the igniter 12a from the igniter 12b, the igniter 12b is inserted into the separating cylinder 14. Thereafter, by crimping the lower end of the inner cylindrical member 4 to fix the initiator collar 13, it is possible to easily and securely fix two igniters.

Further, when fixing two igniters (12a, 12b) in the initiator collar 13, a direction of each igniter can be controlled. In FIG. 1, two igniters are arranged eccentrically with respect to the center axis of the housing. In the case of arranging to align the direction of each igniter (12a, 12b), as shown in a back view in FIG. 2, a lead wire 50, which connects the igniters (12a, 12b) to a control unit (not shown), can be drawn out in the same direction and on the same plane. In FIG. 2, the lead wire 50 is connected to each igniter (12a,12b) via each connector 51a and 51b and the connector is provided on the same plane while being arranged in parallel. By connecting these two connectors to form a like L-letter, the lead wire, which transmits an electric signal (an activating signal) to the igniter, can be drawn out in a direction perpendicular to an axial direction of the housing (i.e. the radial direction of the housing), and the lead wire, connected to each igniter, can be also drawn out in the same direction at that time.

Embodiment 16

Figure 23:
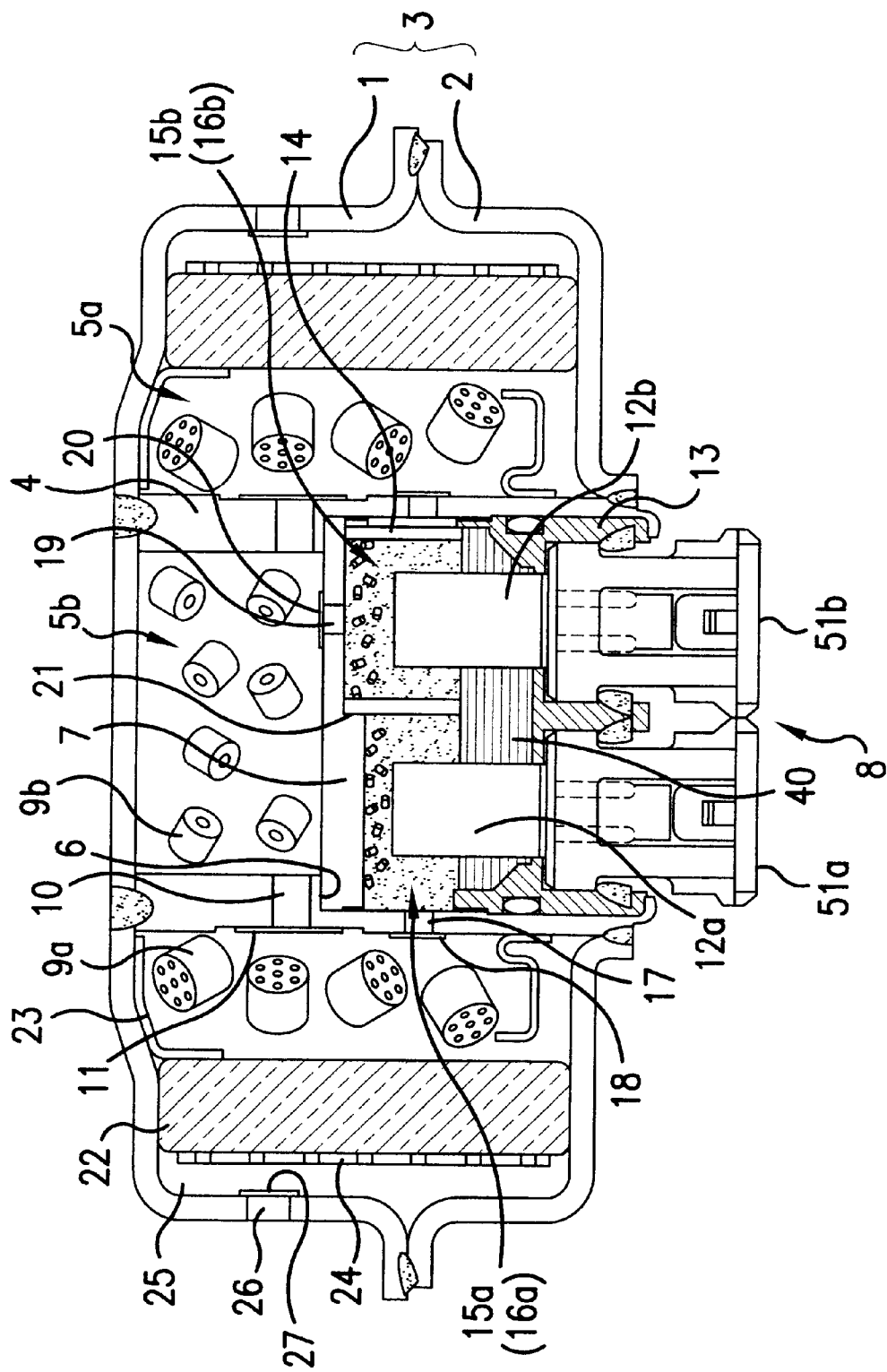
FIG. 23 is a vertical cross sectional view which shows an embodiment of a gas generator according to the present invention.

FIG. 23 is a vertical cross sectional view of an embodiment of a gas generator for an air bag according to the present invention, which is different from the gas generator for an air bag shown in FIG. 1 only in a mounting portion of the igniter.

The ignition means comprises two electric ignition type igniters (12a, 12b), which are activated by an activating signal outputted on the basis of detection by the sensor, and the igniters are fixed integrally in a single initiator collar 13 in parallel as well as aligned to each other in the axial direction by a resin, and mounted in a state of exposing head portions thereof.

Figure 24:
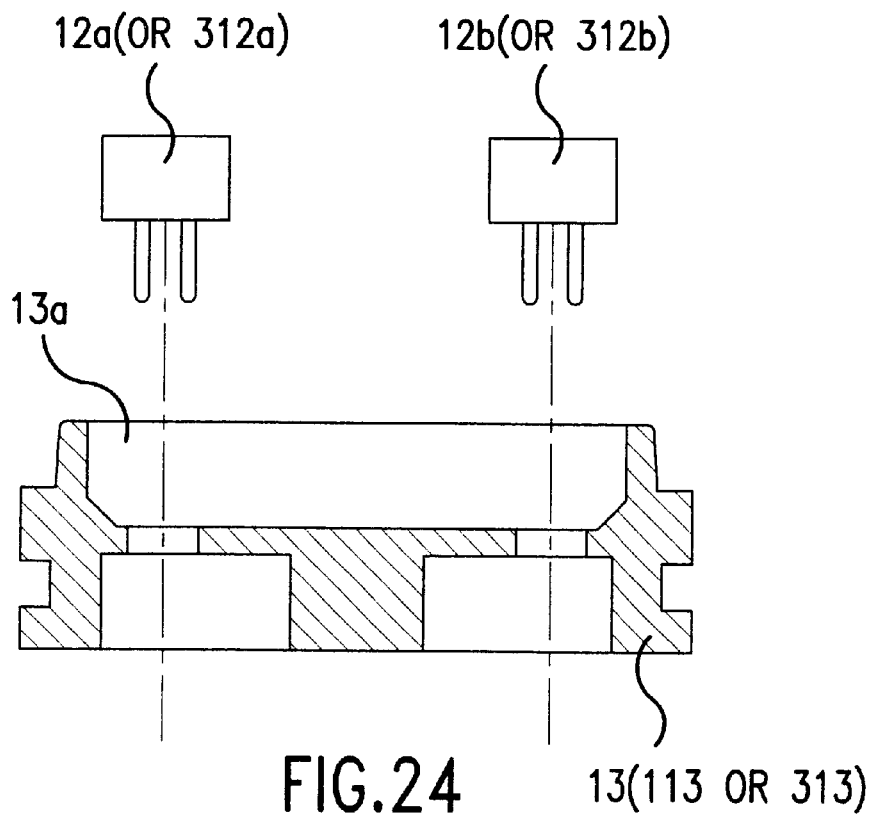
FIG. 24 is a view for explaining a method of mounting an igniter to an initiator collar shown in FIG. 23.
Figure 25:
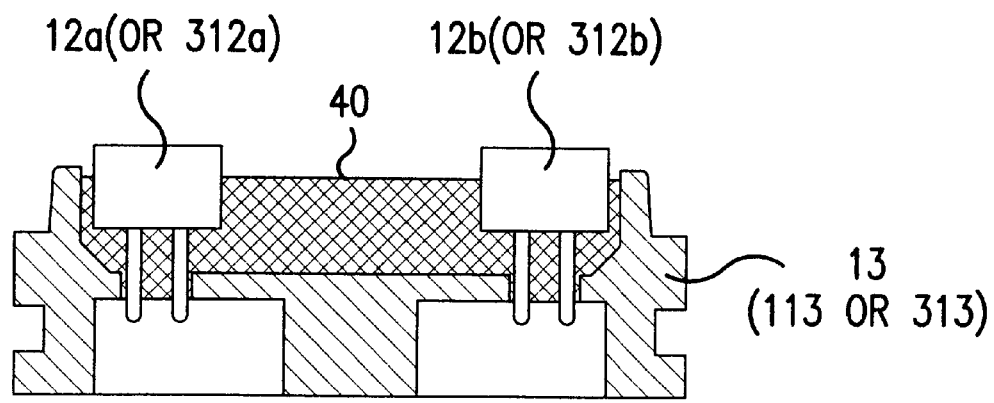
FIG. 25 is a view for explaining a method of mounting the igniter to the initiator collar shown in FIG. 23.

The structure, in which two igniters 12a and 12b are integrally fixed to a single initiator collar 13 by a resin 40, can be, for example, produced according to the following method. At first, as shown in FIG. 24, a single initiator collar 13 having a recess space 13a in an inner portion is prepared, the igniters 12a and 12b are inserted into the recess space 13a, and thereafter, as shown in FIG. 25, the resin 40 is inserted into the recess space 13a so as to be hardened.

The initiator collar 13 has a shape and a size corresponding to the mounting portion of the housing 3, and the recess space 13a is at least larger than the igniters 12a and 12b and does not necessarily correspond to the outer shape of the igniters 12a and 12b.

The resin 40 is a thermoplastic resin or a thermosetting resin and can employ a room temperature hardening type or a heat hardening type, and a hardening agent, a hardening promoting agent or the like may be mixed thereto as required.

As mentioned above, by integrally providing two igniters (12a, 12b) in a single initiator collar 13, two igniters are fixed to the initiator collar 13 to form a single member, therefore, it is easy to assemble to the gas generator. Particularly, in the gas generator shown in FIG. 23, it is possible to easily and securely fix the igniter by crimping the lower end of the inner cylindrical member 4 after inserting the initiator collar 13 having two integrated igniters (12a, 12b) into the inner cylindrical member 4 to fix the initiator collar 13.

Further, as well as FIGS. 1 and 2, when arranging two igniters (12a, 12b) in the initiator collar 13, the direction of each igniter can be easily controlled.

Besides, in the gas generator shown in FIG. 23, the separating cylinder 14, arranged between the initiator collar 13 and the partition wall 7, is disposed in such a manner as to provide the hole portion 21 corresponding to the outer shape of the separating cylinder 14 on the lower surface of the partition wall 7 or the upper surface (the surface of the hardened resin 40) of the initiator collar 13 and fit the upper end or the lower end of the separating cylinder 14 into the respective hole portions.

The above ignition means is, as described with respect to FIGS. 23, 24 and 25, structured such as to include two or more igniters activated upon an impact, and each igniter (12a, 12b) is fixed in a single initiator collar 113 by the resin 40. Further, each igniter (12a, 12b), which is mounted in a single initiator collar 113 and stored in the housing, is slightly eccentric with respect to the axis of the housing.

Figure 26:
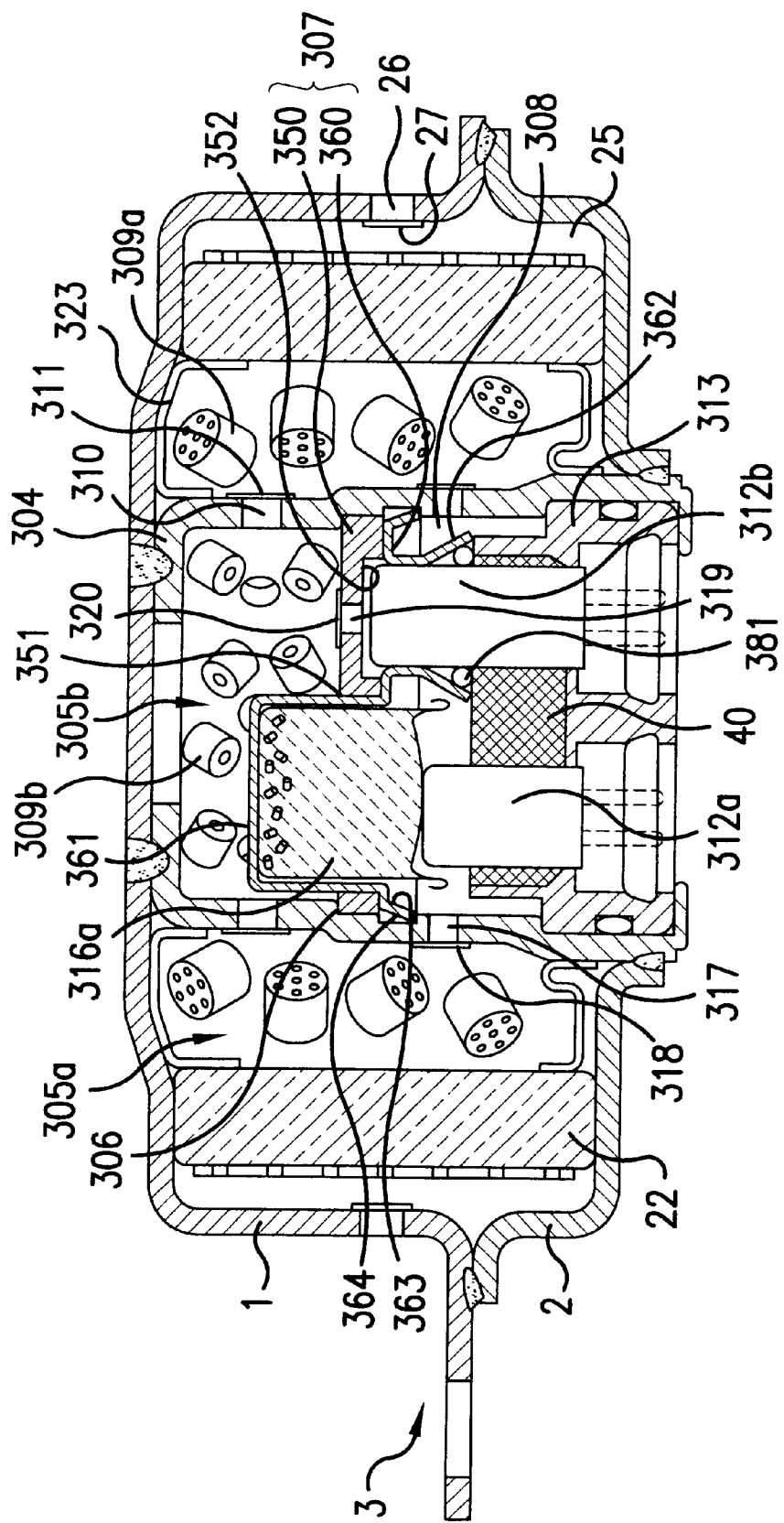
FIG. 26 is a vertical cross sectional view which shows further the other embodiment of a gas generator for an air bag according to the present invention.

In the present embodiment, the ignition means comprises, as described with respect to FIGS. 23 to 25, two or more igniters actuated upon an impact, and each igniter (312a, 312b) is fixed in a single initiator collar 313 by the resin 40. In the embodiment shown in FIG. 26, since the igniters are fixed by the resin 40, it is not necessary to particularly dispose the igniter fixing member. Still, in the gas generator shown in this embodiment, the first igniter 312a and the second igniter 312b are formed in different sizes, and have different operating outputs. However, the igniter having the same operating output may be used.

Embodiment 17

In the gas generator shown in FIG. 9, two combustion chambers and an ignition means accommodating chamber are arranged in the housing 3 formed by joining the diffuser shell 1, having the gas discharge port, and the closure shell 2 forming the inner storing space together with the diffuser shell.

The first combustion chamber 305a is constituted by the housing 3 and the substantially cylindrical inner cylindrical member 304 arranged in the inner portion thereof. Further, the second combustion chamber 305b and the ignition means accommodating chamber 308 are formed respectively in the side of the diffuser shell 1 and the side of the closure shell 2 by arranging the substantially flat circular partition wall 307 in the stepped notch portion provided inside the inner cylindrical member 304, and further separating the inner portion of the cylinder member 304 into two chambers. Accordingly, in this gas generator, the first combustion chamber 305a and the second combustion chamber 305b are concentrically provided in the housing 3 to be adjacent in the radial direction of the housing 3.

In the first and second combustion chambers 305a and 305b, the gas generating agents (309a, 309b), which is burnt by the ignition means activated upon an impact to generate a combustion gas, is stored, and in the ignition means accommodating chamber 308, the ignition means activated upon an impact is stored.

A through hole 310 is provided in the inner cylindrical member 304, which defines the first combustion chamber 305a and the second combustion chamber 305b, and this through hole is closed by the seal tape 311. Since this seal tape 311 is ruptured when the gas generating agent is burnt, both the combustion chambers are communicated with each other by the through hole 310. The material and the thickness of the seal tape 311 is adjusted to be ruptured only when the gas generating agent 309b in the second combustion chamber 305b burns. In this embodiment, a stainless seal tape having a thickness of 40 μm is used. The through hole 310 has the opening area greater than that of the gas discharge port 26, and does not function to control the internal pressure in the combustion chamber 305b.

The ignition means is structured such that the igniter and the transfer charge are stored in the ignition means accommodating chamber.

The ignition means accommodating chamber 308 is formed by arranging the first igniter 312a and the second igniter 312b in such a manner as to be surrounded by the initiator collar 313, the inner cylindrical member 304, and the substantially flat circular partition wall 307. Besides, the substantially flat circular partition wall 307 is, as shown in an exploded perspective view shown in FIG. 10, constituted by the sectioning circular member 350, engaged with the stepped notch portion 306 of the inner cylindrical member 304, and the seal cup member 360, engaged with the sectioning circular member 350.

Two electric igniting type igniters 312a and 312b are provided in a single initiator collar 313 provided in parallel to each other so as to expose the head portion thereof. By providing the igniters 312a and 312b in a single initiator collar 313 in the manner mentioned above, two igniters are fixed to the initiator collar 313 to form a single member, whereby it is easy to assemble to the gas generator. Particularly, in the gas generator shown in FIG. 9, by setting the initiator collar 313 to a size capable of being inserted into the inner cylindrical member 304, two igniters can be easily and securely fixed by crimping the lower end of the inner cylindrical member 304 after inserting the initiator collar 313 having two igniters 312a and 312b into the inner cylinder 304, so as to fix the initiator collar 313. Further, when arranging two igniters in the initiator collar 313, the direction of each igniter can be easily controlled.

The sectioning circular member 350 that constitutes the partition wall 307 is formed into a substantially flat circular shape and has an opening portion 351 that inwardly fits the transfer charge accommodating chamber 361 of the seal cup member 360, a circular hole portion 352 formed by cutting out the bottom surface in a circular shape and stores the upper portion of the igniter 312b, and a second flame-transferring hole 319, which is pierced through the substantially center of the circular hole portion 352.

The seal cup member 360 has the cylindrical transfer charge accommodating chamber 361 fitted into an opening portion 351 of the sectioning circular member 350 so as to be projected into the second combustion chamber 305b, and the cylindrical igniter receiving port 362 formed at a position opposing the circular hole portion 352 of the sectioning circular member 350 and extends in the side opposite to the transfer charge accommodating chamber 361.

A transfer charge 316a is stored inside the transfer charge accommodating portion 361, and a second igniter 312b is inwardly fitted to the igniter receiving port 362. The sectioning circular member 350 and the seal cup member 360 are engaged with each other by fitting the transfer charge accommodating portion 361 of the seal cup member 360 into the opening portion 351 of the sectioning circular member 350, and an upper portion of the second igniter 312b, inwardly fitted to the igniter receiving port 362, exposes into the circular hole portion 352 of the sectioning circular member 350.

The partition wall 307 constituted by the sectioning circular member 350 and the seal cup member 360 are, as shown in FIG. 9, engaged with the stepped notch portion 306 formed on the inner peripheral surface of the inner cylindrical member 304. That is, the peripheral edge of the sectioning circular member 350 is supported by the stepped notch portion 306, and the seal cup member 360 is supported in contact with the sectioning circular member 350.

Further, the peripheral edge of the seal cup member 360 is formed by being bent in the same direction as that of the igniter receiving port 362, and a bent portion 363 is fitted into a groove 364 provided on the inner peripheral surface of the inner cylindrical member 304. Accordingly, the sectioning circular member 350 is supported by the seal cup member 360 and is prevented from moving in the axial direction of the housing 3. Further, the partition wall 307 (that is, the seal cup member 360) and the inner cylindrical member 304 are engaged with each other without a gap by fitting the bent portion 363 in the peripheral edge of the seal cup member 360 into the groove 364 on the inner peripheral surface of the inner cylindrical member 304.

Accordingly, in the inner cylindrical member 304, the ignition means accommodating chamber 308, provided in the side of the closure shell 2, and the second combustion chamber 305b, provided in the side of the diffuser shell 1, are securely partitioned by an ignition means sealing structure comprising a combination of the seal cup member 360 and the groove 364.

The igniter receiving port 362 formed in the above seal cup member 360 is structured such that a skirt portion thereof spreads like a fan, and an O-ring 381 is arranged in the inner side thereof, that is, between this and the second igniter 312b stored in the receiving port 362, in order to seal between the storing port 362 and the second igniter 312b.

Further, since the O-ring 381 is also press-contacted to an igniter fixing member 382 which fixes two igniters 312a and 312b to the single initiator collar 313, the second igniter 312b is disposed in a space defined by the circular hole portion 352 of the sectioning circular member, the igniter receiving port 362 of the seal cup member, the O-ring 381, and the igniter fixing member 382.

Accordingly, two igniters 312a and 312b, arranged in the initiator collar 313, are fixed to the igniter fixing member 382 outwardly fitted to the initiator collar 313. By using the above igniter fixing member 382, two igniters 312a and 312b can be easily assembled to the initiator collar 313. Besides, in the gas generator shown in this embodiment, the first igniter 312a and the second igniter 312b are formed in different sizes, and have different outputs, and additionally, it is possible to use the igniters having the same output.

The seal tape 320, closing the second flame-transferring hole 319 formed in the circular hole portion 352 of the sectioning circular member 350, is ruptured by the activation of the second igniter 312b, whereby the inner portion of the defined space in this manner communicates with the second combustion chamber 305b. The first igniter 312a and the second igniter 312b are securely separated by a seal structure comprising the skirt portion of the igniter receiving port 362, the O-ring 381, and the igniter fixing member 382 (hereinafter, referred as "an igniter seal structure"). Accordingly, the flame generated by activation of one igniter does not directly flow into the space where the other igniter is stored.

A coolant/filter 22 for purifying and cooling the combustion gas generated by the combustion of the gas generating agents (309a, 309b) is disposed in the housing 3. An inner peripheral surface of the coolant/filter 22 in the side of the diffuser shell 1 is covered by a short pass preventing member 23 so that the combustion gas does not pass between an end surface of the coolant/filter 22 and the inner portion of a ceiling portion of the diffuser shell 1. An outer layer 24 for preventing the coolant/filter 22 from outwardly expanding due to passage of the combustion gas or the like is arranged on the outer side of the coolant/filter 22. This outer layer 24 is, for example, formed by a layered wire mesh body, and in addition, may be formed by a porous cylindrical member having a plurality of through holes on a peripheral wall surface, or a belt-like restriction layer obtained by forming a belt-like member with a predetermined width into an annular shape. A gap 25 is formed on the outer side of the outer layer 24 so that the combustion gas can pass through the entire portion of the filter 22.

Embodiment 18

When igniters 12a and 12b, shown in FIG. 1, are arranged to align in the same direction, as shown in a back view of the gas generator according to the present embodiment shown in FIG. 2, the lead wires 50a and 50b, which connect the igniters 12a and 12b to the control unit (not shown), are taken out in the same direction on the same plane. In FIG. 2, the lead wires 50a and 50b are connected to the respective igniters 12a and 12b via the respective connectors 51a and 51b, and the connectors 51a and 51b are provided on the same plane in parallel. By forming the connectors 51a and 51b in a L-letter shape, the lead wires 50a and 50b, which transmit the electric signal (the activating signal) to the igniter, can be taken out in a direction perpendicular to an axial direction of the housing (that is, the radial direction of the housing), (in this case, an angle at which the center lines of the lead wires 50a and 50b connected to two igniters 12a and 12b cross to each other is set to 0 degree), and at that time, the lead wires 50a and 50b connected to the respective igniters are taken out in the same direction.

Embodiment 19

In the case of arranging the igniters (12a, 12b) as shown in FIG. 8 to align in the same direction, in the same manner as shown in FIG. 2, the lead wires 50a and 50b, which connect the igniters 12a and 12b to the control unit (not shown), are drawn out in the same direction on the same plane. In FIG. 2, the lead wires 50a and 50b are connected to the respective igniters 12a and 12b via the respective connectors 51a and 51b, and the connectors 51a and 51b are provided on the same plane in parallel. By forming the connectors 51a and 51b in a L-letter shape, the lead wires 50a and 50b, which transmit the electric signal (the activating signal) to the igniter can be drawn out in a direction perpendicular to an axial direction of the housing (i.e. the radial direction of the housing), and at that time, the lead wires 50a and 50b connected to the respective igniters can be drawn out in the same direction.

Embodiment 20

In the igniters 312a and 312b shown in FIG. 7, as shown in a back view of the embodiment 18 in FIG. 2, it is possible to take out the lead wires 50a and 50b, which connect the igniter to the control unit (not shown), in the same direction on the same plane. The lead wires 50a and 50b are connected to the respective igniters via the respective connectors 51a and 51b, and the connectors 51a and 51b are provided on the same plane in parallel. By forming the connectors 51a and 51b in a L-letter shape, the lead wires 50a and 50b, which transmit the electric signal (the activating signal) to the igniter, can be taken out in a direction perpendicular to an axial direction of the housing (i.e. the radial direction of the housing), and at that time, the lead wires 50a and 50b connected to the respective igniters can be taken out in the same direction.

Embodiment 21

In FIG. 13, the control unit 202 and the igniter 12 of the gas generator 200 are connected by the lead wires, which are taken out in the same direction on the same plane via the connector connected to the igniter 12.

Embodiment 22

An ignition timing of the automatic ignition material, shown in FIG. 12, is determined according to a heat conductivity of a heat transmitting material (for example, the housing) for transmitting a combustion heat of the first gas generating agent, a distance, and the like. In this embodiment, a non-azide gas generating agent is used as the gas generating agent, and the housing and/or the inner cylindrical member correspond to the heat transmitting material for transmitting the combustion heat of the firstly burnt gas generating agent. The automatic igniting material is preferably arranged near each shell in the second combustion chamber, and further, is preferably in contact with the shell.

The automatic igniting material can be arranged in the second combustion chamber by means of bonding, inserting only the automatic igniting material into the independent container to place the container in the second combustion chamber, etc. It is preferable to be arranged to be contact with the heat transmitting material.

Accordingly, in the gas generator, in which the automatic igniting material is arranged in the manner mentioned above, even when only the first gas generating agent 309a is burnt and the second gas generating agent 309b arranged in the second combustion chamber 305b is left unburnt after the actuation of the gas generator, the second agent can be indirectly burnt due to the combustion of the first gas generating agent 309a, so that it is possible to perform the later operation and the disposal without trouble after the actuation of the gas generator.

In FIG. 12, reference numeral 23 denotes a short pass preventing member, which prevents the combustion gas from passing between the end surface of the coolant/filter and the inner surface of the ceiling portion of the diffuser shell.

What is claimed is:

1. A gas generator for an air bag, comprising:
 a housing having a combustion chamber for containing gas generating agents therein;
 a first igniter attached to said housing for igniting the gas generating agents stored in said combustion chamber, said first igniter having a first electric terminal and a first connector receiving portion having a first external appearance;
 a second igniter attached to said housing for igniting the gas generating agents stored in said combustion chamber, said second igniter having a second electric terminal and a second connector receiving portion having a second external appearance different from the first external appearance;
 a first connector having a first connecting portion that engages the first connector receiving portion, the first connecting portion having a third external appearance that corresponds to the first external appearance, the first connector also having a first lead wire extending therefrom, said first lead wire extending substantially on an imaginary plane perpendicular to the axial direction of said housing when said first connector is electrically connected to said first electric terminal; and
 a second connector having a second connecting portion that engages the second connector receiving portion, the second connecting portion having a fourth external appearance that corresponds to the second external appearance, the second connector also having a second lead wire extending therefrom, said second lead wire also extending substantially on the imaginary plane perpendicular to the axial direction of said housing when said second connector is electrically connected to said second electric terminal.

2. A gas generator for an air bag according to claim 1, wherein said first igniter and said second igniter are attached to a single initiator collar, and said first igniter and said second igniter are arranged eccentrically with respect to a center axis of the housing.

3. A gas generator for an air bag according to claim 1, wherein said housing includes a first end wall substantially perpendicular to the axial direction of said housing, and said first igniter and said second igniter are provided on said first end wall.

4. A gas generator for an air bag according to claim 3, wherein said first igniter and said second igniter are provided on said first end wall such that the first electric terminal and the second electric terminal extend in an axial direction of said housing and the first lead wire and the second lead wire extends in the same direction on the imaginary plane by connecting said first connector and said second connector with the first connector receiving portion and the second connector receiving portion.

5. A gas generator for an air bag according to claim 1, wherein the first connector and said second connectors are formed integrally.

6. A gas generator for an air bag according to claim 1, wherein said first lead wire is parallel to said second lead wire.

7. A gas generator for an air bag according to claim 6, wherein said first connector and said second connector have the third external appearance and the fourth external appearance, respectively, such that the first lead wire and the second lead wire extend in the same direction by selectively connecting said first connector and said second connector with the first connector receiving portion and the second connector receiving portion, respectively.

8. A gas generator for an air bag according to claim 1, wherein said combustion chamber includes a first combustion chamber and a second combustion chamber, and the first igniter and the second igniter are attached to said housing to ignite gas generating agents stored in said first combustion chamber and said second combustion chamber, respectively.

9. A gas generator for an air bag according to claim 8, wherein said first and second combustion chambers are provided concentrically with respect to a center axis of said housing and adjacent to each other in a radial direction of the housing.

10. A gas generator for an air bag according to claim 8, wherein the housing is cylindrical in shape, having an axial core length longer than an outermost diameter thereof, and having a plurality of gas discharge ports on a peripheral wall thereof, wherein, said first combustion chamber and said second combustion chamber are concentrically provided adjacent to each other in one of axial and radial directions of the housing, and provided with a communicating hole which allows fluid communication between said first combustion chamber and said second combustion chamber.

11. A gas generator for an air bag according to claim 8, wherein said housing includes a communication hole that allows a fluid communication between said first combustion chamber and said second combustion chamber.

12. The gas generator for an airbag according to claim 1, wherein said first connector has a shape formed in an outer circumference thereof corresponding to a shape of an inner circumference of the first connector receiving portion, and said second connector has a shape formed in an outer circumference thereof corresponding to a shape of an inner circumference of the second connector receiving portion.

13. A gas generator for an air bag, comprising:

a housing having a combustion chamber for containing gas generating agents therein;

a first igniter attached to said housing for igniting the gas generating agents stored in said combustion chamber, said first igniter having a first electric terminal;

a second igniter attached to said housing for igniting the gas generating agents stored in said combustion chamber, said second igniter having a second electric terminal;

a first connector having a first lead wire extending therefrom, said first lead wire extending substantially on an imaginary plane perpendicular to the axial direction of said housing when said first connector is electrically connected to said first electric terminal; and a second connector having a second lead wire extending therefrom, said second lead wire also extending substantially on the imaginary plane perpendicular to the axial direction of said housing when said second connector is electrically connected to said second electric terminal, wherein said combustion chamber includes a first combustion chamber and a second combustion chamber, and the first igniter and the second igniter are attached to said housing to ignite gas generating agents stored in said first combustion chamber and said second combustion chamber, respectively, and wherein the housing is cylindrical in shape, having an axial core length longer than an outermost diameter thereof, and having a plurality of gas discharge ports on a peripheral wall thereof, wherein, said first combustion chamber and said second combustion chamber are concentrically provided adjacent to each other in one of axial and radial directions of the housing, and provided with a communicating hole which allows fluid communication between said first combustion chamber and said second combustion chamber.

14. A gas generator for an air bag, comprising:

a housing having a combustion chamber for containing gas generating agents therein;

a first igniter attached to said housing for igniting the gas generating agents stored in said combustion chamber, said first igniter having a first electric terminal and a first connector receiving portion having a first external appearance; and a second igniter attached to said housing for igniting the gas generating agents stored in said combustion chamber, said second igniter having a second electric terminal and a second connector receiving portion having a second external appearance different from the first external appearance.

* * * * *